(12) United States Patent
Ihara et al.

(10) Patent No.: US 9,543,613 B2
(45) Date of Patent: Jan. 10, 2017

(54) SECONDARY BATTERY WITH ELECTROLYTIC SOLUTION INCLUDING A METHYLENE CYCLIC CARBONATE, BATTERY PACK, ELECTRIC VEHICLE, ENERGY STORAGE SYSTEM, ELECTRIC POWER TOOL, AND ELECTRONIC UNIT INCLUDING THE SAME

(75) Inventors: Masayuki Ihara, Fukushima (JP); Tadahiko Kubota, Kanagawa (JP)

(73) Assignee: SONY CORPORATION, Tokyo (JP)

(*) Notice: Subject to any disclaimer, the term of this patent is extended or adjusted under 35 U.S.C. 154(b) by 747 days.

(21) Appl. No.: 13/602,961

(22) Filed: Sep. 4, 2012

(65) Prior Publication Data
US 2013/0059178 A1    Mar. 7, 2013

(30) Foreign Application Priority Data

Sep. 5, 2011  (JP) ................................. 2011-193145
Sep. 30, 2011  (JP) ................................. 2011-218316

(51) Int. Cl.
*H01M 6/12*     (2006.01)
*H01M 10/052*   (2010.01)
(Continued)

(52) U.S. Cl.
CPC ....... *H01M 10/052* (2013.01); *H01M 10/0567* (2013.01); *H01M 2/0207* (2013.01);
(Continued)

(58) Field of Classification Search
CPC ................. H01M 2300/0025; H01M 10/052; H01M 10/0564; H01M 10/0567; H01M 2/0207; H01M 2/0217; H01M 10/48; H01M 2300/0037; H01M 10/0568; Y02T 10/7011; Y02E 60/122
(Continued)

(56) References Cited

U.S. PATENT DOCUMENTS 8,865,350 B2 *   10/2014   Yamada et al. ............. 429/231.8
2007/0173090 A1 *  7/2007   Johnson et al. ............. 439/157
(Continued)

FOREIGN PATENT DOCUMENTS

JP    2000-058122      2/2000
JP    2000058122 A  *  2/2000
JP    2010-533359     10/2010

*Primary Examiner* — Gary Harris
(74) *Attorney, Agent, or Firm* — Chip Law Group

(57) ABSTRACT

A secondary battery includes: a cathode, an anode, and a nonaqueous electrolytic solution in a package member having a flat surface, in which the nonaqueous electrolytic solution includes a methylene cyclic carbonate represented by an expression (1):

[Chemical Expression 1]

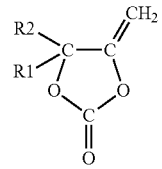

(1)

where R1 and R2 each are a hydrogen group, a halogen group, a monovalent hydrocarbon group, a monovalent halogenated hydrocarbon group, an oxygen-containing monovalent hydrocarbon group, or an oxygen-containing monovalent halogenated hydrocarbon group, and R1 and R2 may be bonded to each other.

16 Claims, 8 Drawing Sheets

(51) Int. Cl.
*H01M 10/0567* (2010.01)
*H01M 2/02* (2006.01)
*H01M 10/0568* (2010.01)
*H01M 10/48* (2006.01)

(52) U.S. Cl.
CPC ...... *H01M 2/0217* (2013.01); *H01M 10/0568* (2013.01); *H01M 10/48* (2013.01); *H01M 2300/0037* (2013.01); *Y02E 60/122* (2013.01); *Y02T 10/7011* (2013.01)

(58) Field of Classification Search
USPC .................................................. 429/61, 162
See application file for complete search history.

(56) References Cited

U.S. PATENT DOCUMENTS

| | | | |
|---|---|---|---|
| 2008/0292971 A1* | 11/2008 | Ihara | H01M 10/052 |
| | | | 429/331 |
| 2009/0017386 A1* | 1/2009 | Xu et al. | 429/331 |
| 2010/0190065 A1* | 7/2010 | Ihara et al. | 429/331 |

* cited by examiner

SECONDARY BATTERY WITH ELECTROLYTIC SOLUTION INCLUDING A METHYLENE CYCLIC CARBONATE, BATTERY PACK, ELECTRIC VEHICLE, ENERGY STORAGE SYSTEM, ELECTRIC POWER TOOL, AND ELECTRONIC UNIT INCLUDING THE SAME

CROSS REFERENCES TO RELATED APPLICATIONS

The present application claims priority to Japanese Priority Patent Application JP 2011-193145 filed in the Japan Patent Office on Sep. 5, 2011, JP 2011-218316 filed in the Japan Patent Office on Sep. 30, 2011, the entire content of which is hereby incorporated by reference.

BACKGROUND

The present application relates to a secondary battery including a cathode, an anode, and a nonaqueous electrolytic solution, and a battery pack, an electric vehicle, a energy storage system, an electric power tool, and an electronic unit each using the secondary battery.

In recent years, various electronic units such as cellular phones and personal digital assistants (PDAs) have been widely used, and further size and weight reduction and longer life of the electronic units are desired. Accordingly, as power supplies for the electronic units, batteries, in particular, small and lightweight secondary batteries capable of obtaining high energy density have been developed. Recently, other various applications of the secondary batteries, as typified by battery packs removably mounted in electronic units or the like, electric vehicles such as electric cars, energy storage systems such as home energy servers, and electric power tools such as electric drills have been studied.

Secondary batteries obtaining battery capacity with use of various charge-discharge principles have been proposed, and in particular, lithium secondary batteries with use of lithium as an electrode reactant holds great promise, because the secondary batteries are allowed to obtain higher energy density than lead-acid batteries or nickel-cadmium batteries. The lithium secondary batteries include lithium-ion secondary batteries using insertion and extraction of lithium ions and lithium metal secondary batteries using deposition and dissolution of lithium metal.

The secondary battery includes a cathode, an anode, and an electrolytic solution, and the electrolytic solution includes a nonaqueous solvent and an electrolyte salt. As the electrolytic solution functioning as a medium of charge-discharge reaction exerts a large effect on performance of the secondary battery, various compositions of the electrolytic solution have been studied.

More specifically, it is proposed to use a cyclic carbonate having a carbon-carbon double bond (a methylene group) to suppress reductive decomposition reaction of the electrolytic solution (for example, refer to Japanese Unexamined Patent Application Publication No. 2000-058122 and Japanese Unexamined Patent Application Publication (Published Japanese Translation of PCT application) No. 2010-533359). As the cyclic carbonate having a methylene group, 4-methylene-1,3-dioxolane-2-one, 4,4-dimethyl-5-methylene-1,3-dioxolane-2-one, or the like is used.

SUMMARY

In recent years, electronic units and the like using secondary batteries have higher performance and more functions; therefore, a further improvement in battery characteristics of the secondary batteries is desired.

It is desirable to provide a secondary battery, a battery pack, an electric vehicle, an energy storage system, an electric power tool, and an electronic unit which each are capable of obtaining good battery characteristics.

According to an embodiment of the technology, there is provided a secondary battery including: a cathode, an anode, and a nonaqueous electrolytic solution in a package member having a flat surface, wherein the nonaqueous electrolytic solution includes a methylene cyclic carbonate represented by an expression (1):

[Chemical Expression 1]

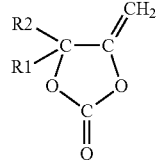

(1)

where R1 and R2 each are a hydrogen group, a halogen group, a monovalent hydrocarbon group, a monovalent halogenated hydrocarbon group, an oxygen-containing monovalent hydrocarbon group, or an oxygen-containing monovalent halogenated hydrocarbon group, and R1 and R2 may be bonded to each other.

According to an embodiment of the technology, there is provided a battery pack including: a secondary battery; a control section controlling a usage state of the secondary battery; and a switch section switching the usage state of the secondary battery according to an instruction from the control section, in which the secondary battery includes a cathode, an anode, and a nonaqueous electrolytic solution in a package member having a flat surface, and the nonaqueous electrolytic solution includes a methylene cyclic carbonate represented by the above-described expression (1).

According to an embodiment of the technology, there is provided an electric vehicle including: a secondary battery; a conversion section converting power supplied from the secondary battery into driving force; a drive section driven by the driving force; and a control section controlling a usage state of the secondary battery, in which the secondary battery includes a cathode, an anode, and a nonaqueous electrolytic solution in a package member having a flat surface, and the nonaqueous electrolytic solution includes a methylene cyclic carbonate represented by the above-described expression (1).

According to an embodiment of the technology, there is provided an energy storage system including: a secondary battery; one or two or more electrical units receiving power from the secondary battery; and a control section controlling power supply from the secondary battery to the electrical unit, in which the secondary battery includes a cathode, an anode, and a nonaqueous electrolytic solution in a package member having a flat surface, and the nonaqueous electrolytic solution includes a methylene cyclic carbonate represented by the above-described expression (1).

According to an embodiment of the technology, there is provided an electric power tool including: a secondary battery; and a movable section receiving power from the secondary battery, in which the secondary battery includes a cathode, an anode, and a nonaqueous electrolytic solution in a package member having a flat surface, and the nonaqueous electrolytic solution includes a methylene cyclic carbonate represented by the above-described expression (1).

According to an embodiment of the technology, there is provided an electronic unit including a secondary battery as a power supply, the secondary battery including a cathode, an anode, and a nonaqueous electrolytic solution in a package member having a flat surface, in which the nonaqueous electrolytic solution includes a methylene cyclic carbonate represented by the above-described expression (1).

In the secondary battery of the technology, the nonaqueous electrolytic solution is included in the package member having a flat surface, and the nonaqueous electrolytic solution includes the methylene cyclic carbonate represented by the expression (1); therefore, good battery characteristics are allowed to be obtained. Moreover, the battery pack, the electric vehicle, the energy storage system, the electric power tool, and the electronic unit each using the secondary battery of the technology are allowed to obtain similar effects.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Preferred embodiments of the technology will be described in detail below referring to the accompanying drawings. It is to be noted that description will be given in the following order.

1. Secondary Battery (First Embodiment)
(methylene cyclic carbonate+package member having flat surface)
  1-1. Lithium-ion secondary battery (prismatic type)
  1-2. Lithium-ion secondary battery (laminate film type)
  1-3. Lithium metal secondary battery (prismatic type, laminate film type)
2. Secondary Battery (Second Embodiment)
(methylene cyclic carbonate+dicarbonate compound or the like)
  2-1. Lithium-ion secondary battery (cylindrical type)
  2-2. Lithium-ion secondary battery (prismatic type, laminate film type)
  2-3. Lithium metal secondary battery (cylindrical type, prismatic type, laminate film type)
3. Secondary Battery (Third Embodiment)
(methylene cyclic carbonate+halogenated carbonate)
  3-1. Lithium-ion secondary battery (cylindrical type)
  3-2. Lithium-ion secondary battery (prismatic type, laminate film type)
  3-3. Lithium metal secondary battery (cylindrical type, prismatic type, laminate film type)
4. Secondary Battery (Fourth Embodiment)
(Restriction on structure of methylene cyclic carbonate)
  4-1. Lithium-ion secondary battery (cylindrical type)
  4-2. Lithium-ion secondary battery (prismatic type, laminate film type)
  4-3. Lithium metal secondary battery (cylindrical type, prismatic type, laminate film type)
5. Secondary Battery (Fifth Embodiment)
(methylene cyclic carbonate+unsaturated cyclic carbonate+mixture ratio)
  5-1. Lithium-ion secondary battery (cylindrical type)
  5-2. Lithium-ion secondary battery (prismatic type, laminate film type)
  5-3. Lithium metal secondary battery (cylindrical type, prismatic type, laminate film type)
6. Appropriate Adjustment of Composition of Electrolytic Solution
7. Applications of Secondary Batteries
  7-1. Battery pack
  7-2. Electric vehicle
  7-3. Energy storage system
  7-4. Electric power tool (1. Secondary Battery (First Embodiment))

First, a secondary battery according to a first embodiment of the technology will be described below.

(1-1. Lithium-ion Secondary Battery (Prismatic Type))

Figure 1:
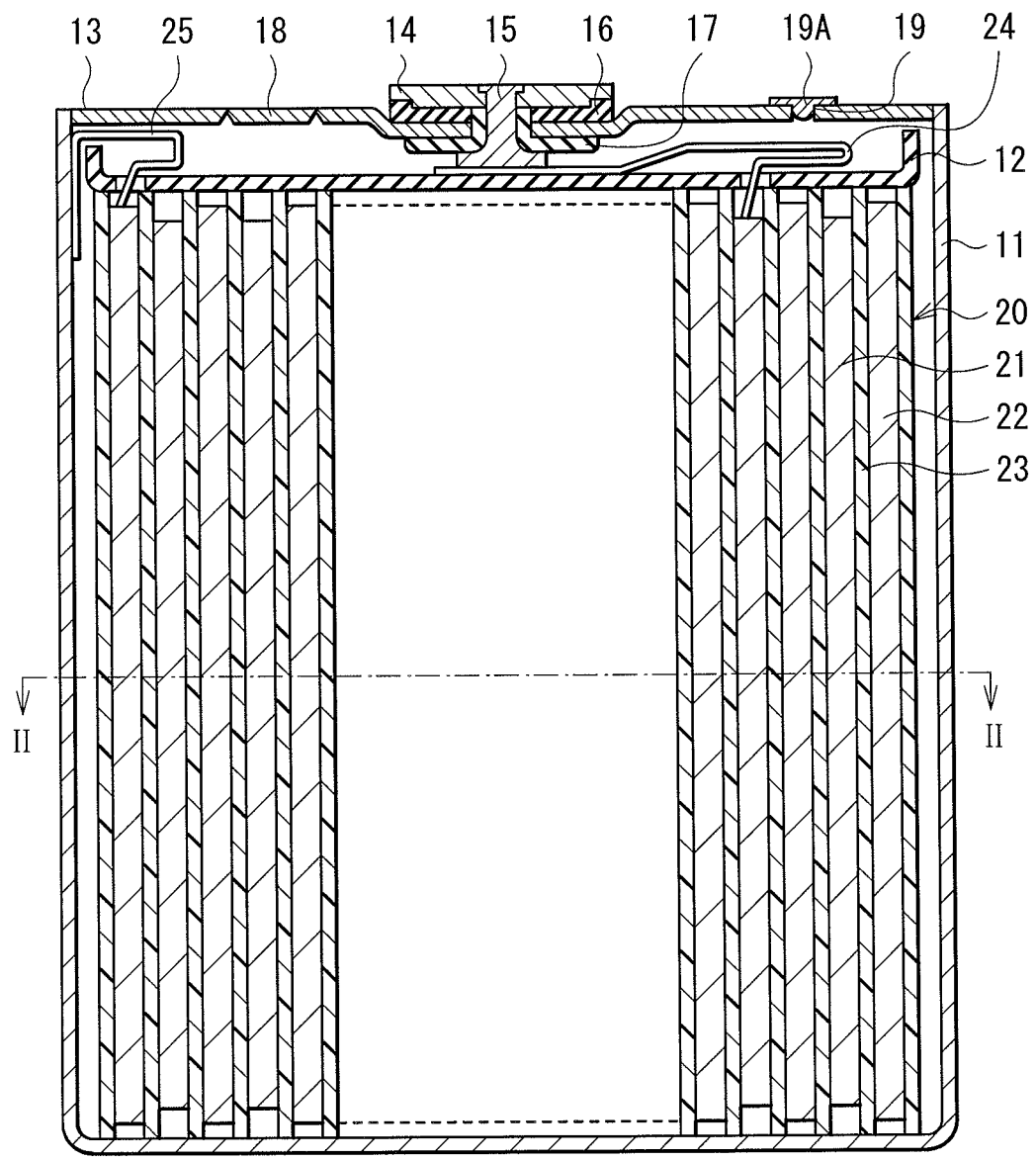
FIG. 1 is a sectional view illustrating a configuration of a secondary battery (prismatic type) according to a first embodiment of the technology.
Figure 2:
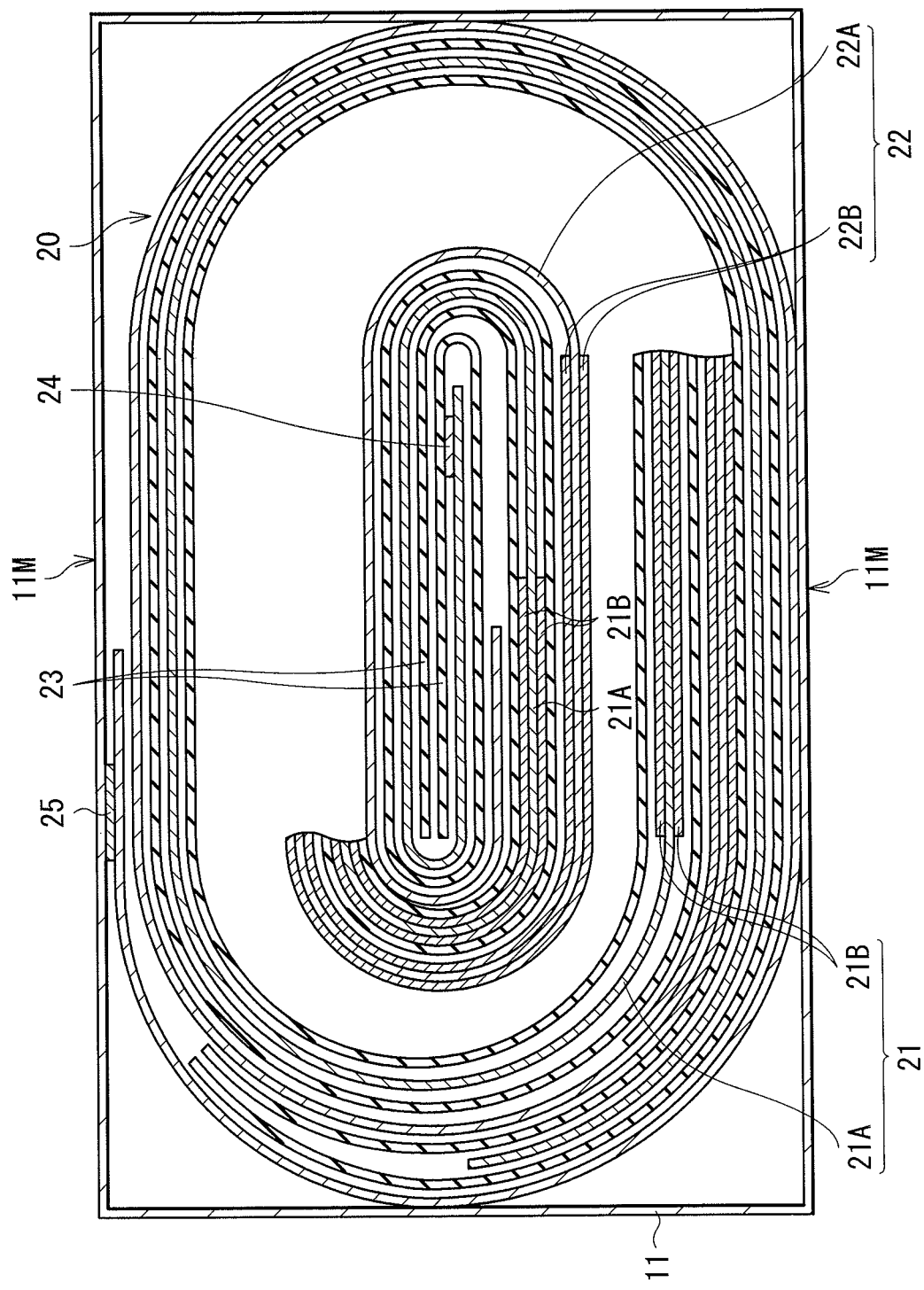
FIG. 2 is a sectional view taken along a line II-II of the secondary battery illustrated in FIG. 1.

FIGS. 1 and 2 illustrate a sectional configuration of the secondary battery, and FIG. 2 illustrates a section of the secondary battery taken along a line II-II in FIG. 1.

[Entire Configuration of Secondary Battery]

The secondary battery is a lithium secondary battery (a lithium-ion secondary battery) capable of obtaining battery capacity by insertion and extraction of lithium (lithium ions) as an electrode reactant.

The secondary battery described here has a so-called prismatic type battery configuration. The secondary battery is configured by mainly containing a battery device 20 in a battery can 11. The battery device 20 is formed by laminating a cathode 21 and an anode 22 with a separator 23 in between and then winding them, and has a flat shape corresponding to the shape of the battery can 11. The separator 23 is impregnated with a nonaqueous electrolytic solution (hereinafter simply referred to as "electrolytic solution") which is a liquid electrolyte.

The battery can 11 is a prismatic package member having one or more flat outer surfaces (one or more flat surfaces 11M). The "flat surface" has an appearance characteristic in which battery swelling due to gas generation in the battery is easily noticeable, because the outer surfaces of the package member in a normal state are flat, and is a concept against a curved surface in which battery swelling is not easily noticeable. As illustrated in FIG. 2, in the prismatic package member, a sectional surface in a longitudinal direction has a rectangular shape or a substantially rectangular shape (including a curve in part), and may have not only a rectangular shape but also an oval shape. In other words, the prismatic package member is a vessel-shaped member having a rectangular closed end or an oval closed end and an opening with a rectangular shape or a substantially rectangular (oval) shape formed by connecting arcs with straight lines. It is to be noted that FIG. 2 illustrates the battery can 11 having a rectangular sectional surface.

The battery can 11 is made of, for example, a conductive material such as iron, aluminum, or an alloy thereof, and may function as an electrode terminal. In particular, iron which is harder than aluminum is preferable to suppress swelling of the battery can 11 during charge and discharge with use of the hardness (resistance to deformation) of the battery can 11. It is to be noted that, in the case where the battery can 11 is made of iron, surfaces of the battery can 11 may be plated with a metal material such as nickel.

Moreover, the battery can 11 has a hollow configuration having an open end and a closed end, and the battery can 11 is sealed by an insulating plate 12 and a battery cover 13 attached to the open end. The insulating plate 12 is disposed between the battery device 20 and the battery cover 13, and is made of an insulating material such as polypropylene. The battery cover 13 is made of, for example, a material similar to that of the battery can 11, and may function as an electrode terminal as in the case of the battery can 11.

A terminal plate 14 which is a cathode terminal is disposed outside the battery cover 13, and the terminal plate 14 is electrically insulated from the battery cover 13 by an insulating case 16. The insulating case 16 is made of an insulating material such as polybutylene terephthalate. A through hole is provided around the center of the battery cover 13, and a cathode pin 15 is inserted into the through hole to be electrically connected to the terminal plate 14 and to be electrically insulated from the battery cover 13 by a gasket 17. The gasket 17 is made of, for example, an insulating material, and its surface is coated with asphalt.

A cleavage valve 18 and an injection hole 19 are disposed around an edge of the battery cover 13. The cleavage valve 18 is electrically connected to the battery cover 13, and when an internal pressure in the secondary battery increases to a certain extent or higher due to an internal short circuit or external application of heat, the cleavage valve 18 is separated from the battery cover 13 to release the internal pressure. The injection hole 19 is filled with a sealing member 19A made of, for example, a stainless steel ball.

A cathode lead 24 made of a conductive material such as aluminum is attached to an end (for example, an inside end) of the cathode 21, and an anode lead 25 made of a conductive material such as nickel is attached to an end (for example, an outside end) of the anode 22. The cathode lead 24 is connected to an end of the cathode pin 15 by welding or the like, and is electrically connected to the terminal plate 14. The anode lead 25 is connected to the battery can 11 by welding or the like, and is electrically connected to the battery can 11.

[Cathode]

The cathode 21 includes a cathode current collector 21A and a cathode active material layer 21B disposed on one surface or both surfaces of the cathode current collector 21A. The cathode current collector 21A is made of a conductive material such as aluminum, nickel, or stainless.

The cathode active material layer 21B includes, as cathode active materials, one kind or two or more kinds of cathode materials capable of inserting and extracting lithium ions, and may include any other material such as a cathode binder or a cathode conductor, if necessary.

As the cathode material, a lithium-containing compound is preferable, because high energy density is obtainable. Examples of the lithium-containing compound include a complex oxide including lithium and a transition metal element as constituent elements, and a phosphate compound including lithium and a transition metal element as constituent elements. In particular, the lithium-containing compound including one or two or more kinds selected from the group consisting of cobalt, nickel, manganese, and iron as transition metal elements is preferable, because a higher voltage is obtainable. The complex oxide and the phosphate compound are represented by, for example, $Li_xM1O_2$ and $Li_yM2PO_4$, respectively. In the expression, M1 and M2 each are one or more kinds of transition metal elements. The values of x and y depend on a charge-discharge state of the battery, and are generally within a range of $0.05 \leq x \leq 1.10$ and $0.05 \leq y \leq 1.10$, respectively.

Examples of the complex oxide including lithium and the transition metal element include $Li_xCoO_2$, $Li_xNiO_2$, and a lithium-nickel-based complex oxide represented by the following expression (30). Examples of the phosphate compound including lithium and the transition metal element include $LiFePO_4$ and $LiFe_{1-u}Mn_uPO_4$ (u<1), because high battery capacity and good cycle characteristics are obtainable.

$$LiNi_{1-z}M_zO_2 \tag{30}$$

where M is one or more kinds selected from the group consisting of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb, and z is within a range of $0.005 < z < 0.5$.

In addition to the above-described materials, examples of the cathode material include oxides, bisulfides, chalcogenides, and conductive polymers. Examples of the oxides include titanium oxide, vanadium oxide, and manganese dioxide. Examples of the bisulfides include titanium bisulfide and molybdenum sulfide. Examples of the chalcogenides include niobium selenide. Examples of the conductive polymers include sulfur, polyaniline, and polythiophene. However, any material other than the above-described materials may be used as the cathode material.

As the cathode binder, for example, one kind or two or more kinds of synthetic rubber or polymer materials are used. Examples of synthetic rubber include styrene butadiene-based rubber, fluorine-based rubber, and ethylene propylene diene. Examples of the polymer materials include polyvinylidene fluoride and polyimide.

As the cathode conductor, for example, one kind or two or more kinds of carbon materials are used. Examples of the cathode materials include graphite, carbon black, acetylene black, and ketjen black. It is to be noted that the cathode conductor may be a metal material, a conductive polymer, or the like, as long as the metal material, the conductive polymer, or the like is a material having electrical conductivity.

[Anode]

The anode 22 includes an anode current collector 22A and an anode active material layer 22B disposed on one surface or both surfaces of the anode current collector 22A.

The anode current collector 22A is made of a conductive material such as copper, nickel, or stainless. The surfaces of the anode current collector 22A are preferably roughened, because adhesion of the anode active material layer 22B to the anode current collector 22A is improved by a so-called anchor effect. In this case, the surfaces of the anode current collector 22A may be roughened at least in a region facing the anode active material layer 22B. Examples of a roughening method include a method of forming microparticles by electrolytic treatment. The electrolytic treatment is a method of forming microparticles on the surfaces of the anode current collector 22A in an electrolytic bath by an electrolytic method to form roughened surfaces. Copper foil formed by the electrolytic treatment is generally called electrolytic copper foil.

The anode active material layer 22B includes, as anode active materials, one kind or two or more kinds of anode materials capable of inserting and extracting lithium ions, and may include any other material such as an anode binder or an anode conductor, if necessary. It is to be noted that details of the anode binder and the anode conductor are, for example, similar to those of the cathode binder and the cathode conductor, respectively. In the anode active material layer 22B, the chargeable capacity of the anode material is larger than the discharge capacity of the cathode 21 to prevent unintended deposition of lithium metal during charge and discharge.

Examples of the anode material include carbon materials, because variations in crystal structure during insertion and extraction of lithium ions are very small, and high energy density and good cycle characteristics are obtainable accordingly. Moreover, it is because the carbon materials function as anode conductors. Examples of the carbon materials include graphitizable carbon, non-graphitizable carbon having the (002) plane with a surface separation of 0.37 nm or over, and graphite having the (002) plane with a surface separation of 0.34 nm or less. More specific examples of the carbon materials include pyrolytic carbons, cokes, glass-like carbon fibers, an organic polymer compound fired body, activated carbon, and carbon blacks. Cokes include pitch coke, needle coke, and petroleum coke. The organic polymer compound fired body is formed by firing (carbonizing) a polymer compound such as a phenolic resin or a furan resin at an appropriate temperature. In addition, as the carbon material, low-crystalline carbon or amorphous carbon subjected to heat treatment at approximately 1000° C. or less may be used. It is to be noted that the carbon material may have any of a fibrous shape, a spherical shape, a granular shape, and a scale-like shape.

In addition, examples of the anode material may include metal oxides and polymer compounds. Examples of metal oxides include iron oxide, ruthenium oxide, and molybdenum oxide. Examples of the polymer compounds include polyacetylene, polyaniline, and polypyrrole. However, any material other than the above-described materials may be used as the anode material.

The anode active material layer 22B is formed by, for example, a coating method, a vapor-phase method, a liquid-phase method, a spraying method, a firing method (a sintering method), or a combination of two or more kinds of the methods. In the coating method, for example, a particulate anode active material is mixed with the anode binder or the like to form a mixture, and the mixture is dispersed in a solvent such as an organic solvent, and then coating with the mixture is performed. Examples of the vapor-phase method include a physical deposition method and a chemical deposition method. More specific examples of the vapor-phase method include a vacuum deposition method, a sputtering method, an ion plating method, a laser ablation method, a thermal chemical vapor deposition method, a chemical vapor deposition (CVD) method, and a plasma chemical vapor deposition method. Examples of the liquid-phase method include an electrolytic plating method, and an electroless plating method. In the spray method, the anode active material in a molten state or a semi-molten state is sprayed. In the firing method, for example, after coating is performed by the coating method, the mixture is heated at a higher temperature than the melting point of the anode binder or the like. As the firing method, a known technique may be used. Examples of the firing method include an atmosphere firing method, a reaction firing method, and a hot press firing method.

[Separator]

The separator 23 isolates between the cathode 21 and the anode 22 to allow lithium ions to pass there through while preventing a short circuit of a current due to contact between the cathode 21 and the anode 22. The separator 23 is configured of, for example, a porous film of a synthetic resin or ceramic, and may be configured of a laminate film formed by laminating two or more kinds of porous films. Examples of the synthetic resin include polytetrafluoroethylene, polypropylene, and polyethylene.

In particular, for example, the separator 23 may include a base layer made of the above-described porous film and a polymer compound layer disposed on one surface or both surfaces of the base layer, because adhesion of the separator 23 to the cathode 21 and the anode 22 is improved, thereby suppressing distortion of the battery device 20 which is a spirally wound body. Thus, decomposition reaction of the electrolytic solution is suppressed, and leakage of the electrolytic solution with which the base layer is impregnated is suppressed; therefore, if charge and discharge are repeated, resistance of the secondary battery is less likely to increase, and battery swelling is suppressed.

The polymer compound layer includes, for example, a polymer material such as polyvinylidene fluoride, because the polymer material is good in physical strength and is electrochemically stable. However, the polymer material may be any polymer material other than polyvinylidene fluoride. For example, the polymer compound layer is formed by preparing a solution in which the polymer material is dissolved, and then coating a surface of the base layer with the solution, and drying the base layer. It is to be noted that the base layer may be immersed in the solution, and then dried.

[Electrolytic Solution]

The electrolytic solution with which the separator 23 is impregnated includes a methylene cyclic carbonate represented by the following expression (1). However, the electrolytic solution may include other materials such as a nonaqueous solvent and an electrolyte salt.

[Chemical Expression 2]

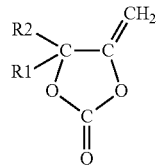

(1)

where R1 and R2 each are a hydrogen group, a halogen group, a monovalent hydrocarbon group, a monovalent halogenated hydrocarbon group, an oxygen-containing monovalent hydrocarbon group or an oxygen-containing monovalent halogenated hydrocarbon group, and R1 and R2 may be bonded to each other.

The methylene cyclic carbonate is a carbonate compound having a methylene group as an unsaturated carbon bond (a carbon-carbon double bond) outside a ring structure (a five-membered ring). As a firm coating is formed on a surface of the anode 22 mainly during initial charge, the electrolytic solution includes the methylene cyclic carbonate to suppress decomposition reaction of the electrolytic solution caused by reactivity of the anode 22. Therefore, high battery capacity is obtainable even during initial charge and discharge, thereby improving initial charge-discharge characteristics. Moreover, gas generation caused by decomposition reaction of the electrolytic solution is suppressed not only during initial charge and discharge but also during storage of the secondary battery at high temperature, thereby improving swelling characteristics. In particular, in the prismatic secondary battery in which battery swelling is easily noticeable by the flat surface 11M of the battery can 11, battery swelling is effectively suppressed.

Kinds of R1 and R2 are not specifically limited, as long as, as described above, they each are the hydrogen group, the halogen group, the monovalent hydrocarbon group, the monovalent halogenated hydrocarbon group, the oxygen-containing monovalent hydrocarbon group, or the oxygen-containing monovalent halogenated hydrocarbon group, because the methylene cyclic carbonate has a carbonate ring structure (a five-membered ring) and a unsaturated carbon bond (a methylene group), thereby allowing the above-described advantages to be obtained without relying on the kinds of R1 and R2. It is to be noted that the kinds of R1 and R2 may be the same as or different from each other. The ring structure may be formed by bonding R1 and R2 to each other.

Here, the "hydrocarbon group" is a generic name of a group including carbon and hydrogen, and may have a straight-chain structure or a branched structure. Moreover, the "halogenated hydrocarbon group" is a group obtained by halogenating the above-described hydrocarbon group, that is, a group in which one or more of hydrogen groups in the hydrocarbon group is substituted with a halogen group. As the halogen group, for example, one kind or two or more kinds selected from the group consisting of a fluorine group (—F), a chlorine group (—Cl), a bromine group (—Br), and an iodine group (—I) are used, and in particular, the fluorine group is preferable, because a coating caused by the methylene cyclic carbonate is easily formed.

In R1 and R2, specific examples of the halogen group are similar to those in the case where the "halogenated hydrocarbon group" is described above. Specific examples of the monovalent hydrocarbon group include an alkyl group having 1 to 12 carbon atoms, an alkenyl group having 2 to 12 carbon atoms, an alkynyl group having 2 to 12 carbon atoms, an aryl group having 6 to 18 carbon atoms, and a cycloalkyl group having 3 to 18 carbon atoms. Moreover, the monovalent halogenated hydrocarbon group is a group obtained by substituting one or more of hydrogen groups in the above-described alkyl group or the like with a halogen group. The alkyl group, the alkenyl group, or the alkynyl group may have a straight-chain structure, or a branched structure having one or two or more side chains, because the above-described advantages are obtainable while securing solubility, compatibility, and the like of the methylene cyclic carbonate. However, R1 and R2 each may be a group other than the above-described groups.

More specifically, examples of the alkyl group include a methyl group (—CH$_3$), an ethyl group (—C$_2$H$_5$), and a propyl group (—C$_3$H$_7$). Examples of the alkenyl group include a vinyl group (—C$_2$H$_3$) and an allyl group (—C$_3$H$_5$). Examples of the alkynyl group include an ethynyl group (—C$_2$H$_1$). Examples of the aryl group include a phenyl group and a naphthyl group. Examples of the cycloalkyl group include a cyclopropyl group, a cyclobutyl group, a cyclopentyl group, a cyclohexyl group, a cycloheptyl group, and a cyclooctyl group. Examples of a group obtained by halogenating the alkyl group or the like include a trifluoromethyl group (—CF$_3$) and a pentafluoroethyl group (—C$_2$F$_5$). The above-described groups are just examples, and any other group may be used.

The "oxygen-containing hydrocarbon group" is a group including carbon, hydrogen, and oxygen. The "oxygen-containing halogenated hydrocarbon group" is a group obtained by substituting one or more of hydrogen groups in the above-described oxygen-containing hydrocarbon group with a halogen group, and the kind of the halogen group is as described above.

Examples of the oxygen-containing monovalent hydrocarbon group include an alkoxy group having 1 to 12 carbon atoms. Moreover, for example, the oxygen-containing monovalent halogenated hydrocarbon group is a group obtained by substituting one or more of hydrogen groups in the above-described alkoxy group or the like with a halogen group, because the above-described advantages are obtainable while securing solubility, compatibility, and the like of the methylene cyclic carbonate.

Specific examples of the alkoxy group include a methoxy group (—OCH$_3$) and an ethoxy group (—OC$_2$H$_5$). Examples of a group obtained by halogenating the alkoxy group or the like include a trifluoromethoxy group (—OCF$_3$) and a pentafluoroethoxy group (—OC$_2$F$_5$).

It is to be noted that R1 and R2 each may be a derivative of any one of the above-described groups. The derivative is a group obtained by introducing one or two or more substituent groups into any of the above-described groups, and the kind of the substituent group is arbitrarily selected. A derivative may be used for R11 and later groups which will be described later in a similar manner.

Specific examples of the methylene cyclic carbonate are represented by the following expressions (1-1) to (1-31). It is to be noted that R1 and R2 may be bonded to each other; therefore, as illustrated in the expression (1-31), R1 and R2 bonded to each other may be methylene groups (—CH$_2$—).

[Chemical Expression 3]

(1-1)

(1-2)

(1-3) 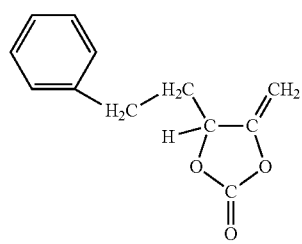
(1-4) 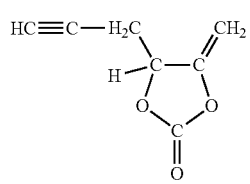
(1-5) 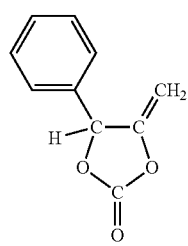
(1-6) 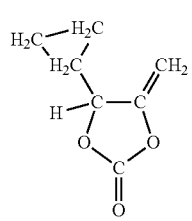
(1-7) 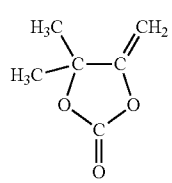
(1-8) 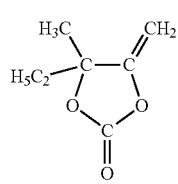
(1-9) 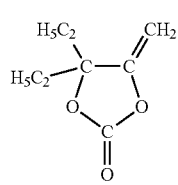
(1-10) 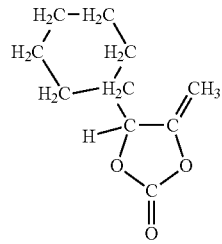
(1-11) 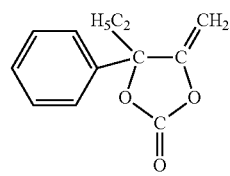
(1-12) 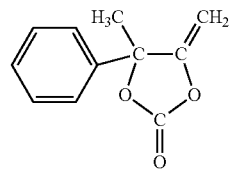
(1-13) 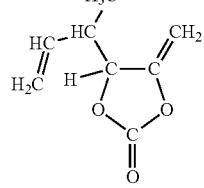
(1-14) 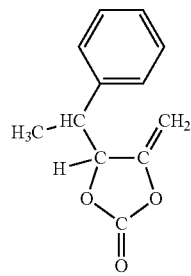
(1-15) 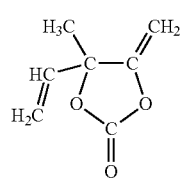
[Chemical Expression 4]
(1-16) 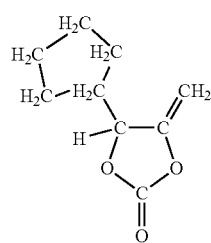

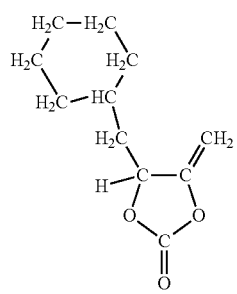
(1-17)
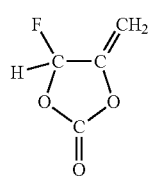
(1-18)
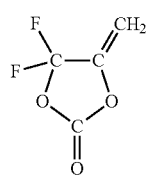
(1-19)
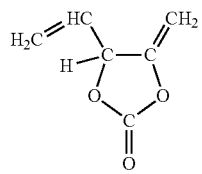
(1-20)
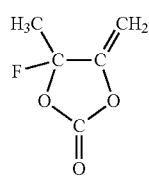
(1-21)
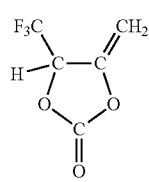
(1-22)
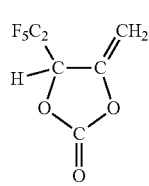
(1-23)
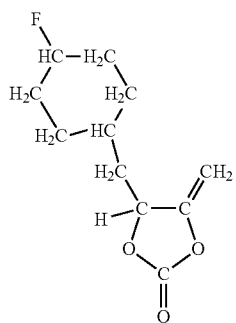
(1-24)
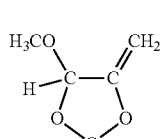
(1-25)
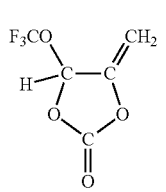
(1-26)
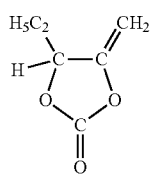
(1-27)
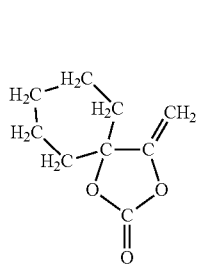
(1-28)
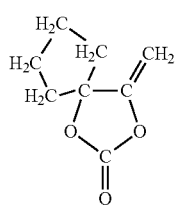
(1-29)
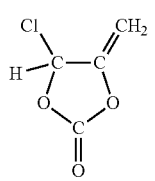
(1-30)

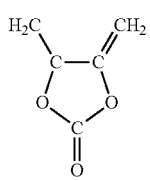

(1-31)

The content of the methylene cyclic carbonate in the electrolytic solution is not specifically limited, but is preferably within a range of 0.01 wt % to 10 wt % both inclusive, and more preferably within a range of 0.1 wt % to 5 wt % both inclusive, because a higher effect is obtainable.

The nonaqueous solvent includes one kind or two or more kinds of organic solvents (except for the above-described methylene cyclic carbonate).

Examples of the organic solvent include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, Nmethylpyrrolidinone, N-methyloxazolidinone, N,N'-dimethylimidazolidinone, nitromethane, nitroethane, sulfolane, trimethyl phosphate, and dimethyl sulfoxide, because good battery capacity, good cycle characteristics, good storage characteristics, and the like are obtainable.

In particular, one or more kinds selected from the group consisting of ethylene carbonate and propylene carbonate which are cyclic carbonates, and dimethyl carbonate, diethyl carbonate, and ethyl methyl carbonate which are chain carbonates are preferable, because higher battery capacity, better cycle characteristics, better storage characteristics, and the like are obtainable. In this case, a combination of a high-viscosity (high-permittivity) solvent (for example, relative permittivity ε≥30) such as ethylene carbonate or propylene carbonate and a low-viscosity solvent (for example, viscosity≤1 mPa·s) such as dimethyl carbonate, ethyl methyl carbonate or diethyl carbonate is more preferable, because the dissociation property of the electrolyte salt and ion mobility are improved.

In particular, the nonaqueous solvent preferably includes one kind or two or more kinds selected from unsaturated cyclic carbonates represented by the following expressions (2) and (3), because a coating is formed on the surface of the anode 22 mainly during charge and discharge, thereby suppressing decomposition reaction of the electrolytic solution. The unsaturated cyclic carbonate is a cyclic carbonate having one or two or more unsaturated carbon bonds (carbon-carbon double bonds). The kinds of R11 and R12 may be the same as or different from each other. The kinds of R13 to R16 may be the same as or different from one another, or two or more of R13 to R16 may be the same as one another. The content of the unsaturated cyclic carbonate in the nonaqueous solvent is not specifically limited, but is, for example, within a range of 0.01 wt % to 10 wt % both inclusive. It is to be noted that specific examples of the unsaturated cyclic carbonate may include not only compounds which will be described below, but also other compounds.

[Chemical Expression 5]

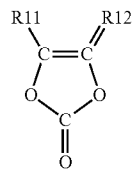

(2)

where R11 and R12 each are a hydrogen group or an alkyl group.

[Chemical Expression 6]

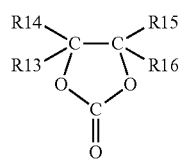

(3)

where R13 to R16 each are a hydrogen group, an alkyl group, a vinyl group, or an allyl group, and one or more of R13 to R16 is a vinyl group or an allyl group.

The unsaturated cyclic carbonate represented by the expression (2) is a vinylene carbonate-based compound. Examples of the vinylene carbonate-based compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one. In particular, vinylene carbonate is preferable, because vinylene carbonate is easily available, and a high effect is obtainable.

The unsaturated cyclic carbonate represented by the expression (3) is a vinyl ethylene carbonate-based compound. Examples of the vinyl ethylene carbonate-based compound include vinyl ethylene carbonate, 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. In particular, vinyl ethylene carbonate is preferable, because vinyl ethylene carbonate is easily available, and a high effect is obtainable. All of R13 to R16 may be vinyl groups or allyl groups, or vinyl groups and allyl groups may be mixed in R13 to R16.

It is to be noted that the unsaturated cyclic carbonate may be catechol carbonate having a benzene ring in addition to the compounds represented by the expressions (2) and (3).

Moreover, the nonaqueous solvent preferably includes one kind or two or more kinds selected from halogenated carbonates represented by the following expressions (4) and (5), because a coating is formed on the surface of the anode 22 mainly during charge and discharge, thereby suppressing decomposition reaction of the electrolytic solution. The halogenated carbonate represented by the expression (4) is a cyclic carbonate (a halogenated cyclic carbonate) having one or two or more halogen atoms as constituent elements. On the other hand, the halogenated carbonate represented by the expression (5) is a chain carbonate (halogenated chain carbonate) having one or two or more halogen atoms as constituent elements. The kinds of R17 to R20 may be the same as or different from one another, and two or more of R17 to R20 may be the same as one another. The same applies to R21 to R26. The content of the halogenated carbonate in the nonaqueous solvent is not specifically limited, but is, for example, within a range of 0.01 wt % to 50 wt % both inclusive. However, specific examples of the halogenated carbonate include not only compounds which will be described below but also other compounds.

[Chemical Expression 7]

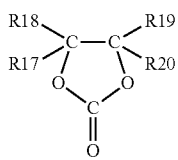
(4)

where R17 to R20 each are a hydrogen group, a halogen group, a monovalent hydrocarbon group, or a monovalent halogenated hydrocarbon group, and one or more of R17 to R20 is a halogen group or a monovalent halogenated hydrocarbon group.

[Chemical Expression 8]

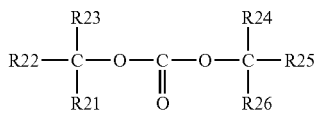
(5)

where R21 to R26 each are a hydrogen group, a halogen group, a monovalent hydrocarbon group, or a monovalent halogenated hydrocarbon group, and one or more of R21 to R26 is a halogen group or a monovalent halogenated hydrocarbon group.

The kind of halogen is not specifically limited; however, in particular, fluorine (F), chlorine (Cl) or bromine (Br) is preferable, and fluorine is more preferable, because a higher effect than that of other halogens is obtainable. The number of halogen atoms is more preferably 2 than 1, and may be 3 or more, because a capability of forming a coating is improved, and a firmer and stabler coating is formed, thereby further suppressing decomposition reaction of the electrolytic solution.

The kinds of R17 to 26 are not specifically limited, as long as they each are a hydrogen group, a halogen group, a monovalent hydrocarbon group, or a monovalent halogenated hydrocarbon group, as described above. However, as a condition, one or more of R17 to R20 is a halogen group or a monovalent halogenated hydrocarbon group. The same applies to R21 to R26. Specific examples of the halogen group are similar to the above-described kinds of halogen. Specific examples of the monovalent hydrocarbon group include an alkyl group having 1 to 12 carbon atoms, and specific examples of the monovalent halogenated hydrocarbon group include a group in which one or more of hydrogen groups in the above-described alkyl group or the like is substituted with a halogen group. However, the alkyl group may have a straight-chain structure, or a branched structure having one or two or more side chains.

Examples of the halogenated cyclic carbonate include compounds represented by expressions (4-1) to (4-21), and also include a geometric isomer. In particular, 4-fluoro-1,3-dioxolane-2-one represented by the expression (4-1) and 4,5-difluoro-1,3-dioxolane-2-one represented by the expression (4-3) are preferable, and the latter carbonate is more preferable. Moreover, as 4,5-difluoro-1,3-dioxolane-2-one, a transisomer is more preferable than a cis-isomer, because it is easily available, and a high effect is obtainable. On the other hand, examples of the halogenated chain carbonate include fluoromethyl methyl carbonate, bis(fluoromethyl) carbonate, and difluoromethyl methyl carbonate.

[Chemical Expression 9]

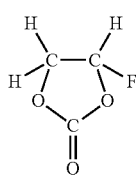
(4-1)

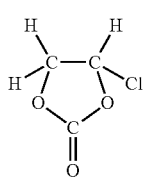
(4-2)

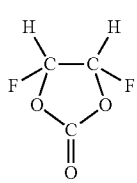
(4-3)

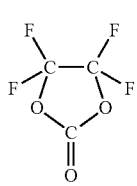
(4-4)

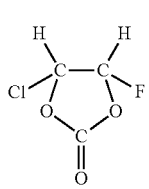
(4-5)

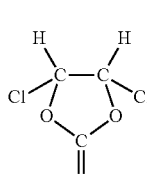
(4-6)

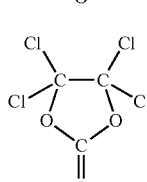
(4-7)

(4-8) 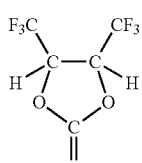

(4-9) 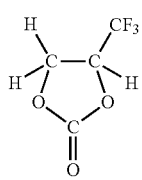

(4-10) 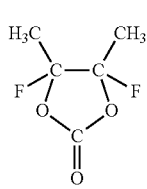

(4-11) 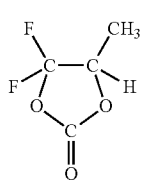

(4-12) 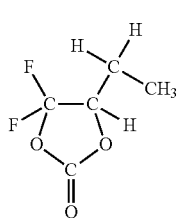

(4-13) 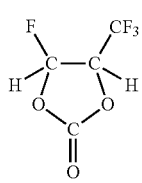

(4-14) 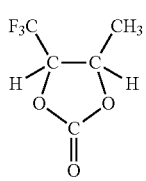

(4-15) 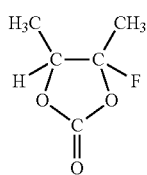

(4-16)

(4-17)

(4-18)

(4-19)

(4-20)

(4-21)

The electrolyte salt includes, for example, one kind or two or more kinds of salts such as lithium salt. However, the electrolyte salt may include, for example, any salt other than lithium salt (for example, a light-metal salt other than lithium salt).

Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenyl borate ($LiB(C_6H_5)_4$), lithium methanesulfonate ($LiCH_3SO_3$). trifluoromethane sulfonic lithium ($LiCF_3SO_3$), lithium tetrachloroaluminate ($LiAlCl_4$), lithium silicate hexafluoride ($Li_2SiF_6$), lithium chloride ($LiCl$), and lithium bromide ($LiBr$), because good battery capacity, good cycle characteristics, good storage characteristics, and the like are obtainable. However, specific examples of lithium salt may include not only the above-described compound but also other compounds.

In particular, one or more kinds selected from the group consisting of lithium hexafluorophosphate, lithium tetrafluoroborate, lithium perchlorate, and lithium hexafluoroarsenate are preferable, and lithium hexafluorophosphate is more preferable, because internal resistance is reduced; therefore, a higher effect is obtainable.

In particular, the electrolyte salt preferably includes one kind or two or more kinds selected from compounds represented by the following expressions (6) to (8), because higher characteristics are obtainable. It is to be noted that the kinds of R31 and R33 may be the same as or different from each other. The same applies to R41 to R43, and R51 and R52. However, specific examples of the compounds represented by the expressions (6) to (8) may include not only compounds which will be described below but also other compounds.

[Chemical Expression 10]

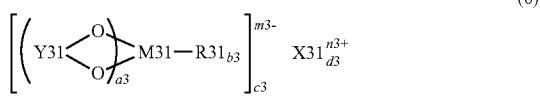

(6)

where X31 is a Group 1 element or a Group 2 element in the long form of the periodic table of the elements, or aluminum, M31 is a transition metal element, or a Group 13 element, a Group 14 element, or a Group 15 element in the long form of the periodic table of the elements, R31 is a halogen group, Y31 is —C(O=)—R32-C(=O)—, —C(O=)—CR33$_2$-, or —C(=O)—C(=O)—, in which R32 is an alkylene group, a halogenated alkylene group, an arylene group or a halogenated arylene group, R33 is an alkyl group, a halogenated alkyl group, an aryl group or a halogenated aryl group, a3 is an integer of 1 to 4, b3 is an integer of 0, 2 or 4, and c3, d3, m3, and n3 each are an integer of 1 to 3.

[Chemical Expression 11]

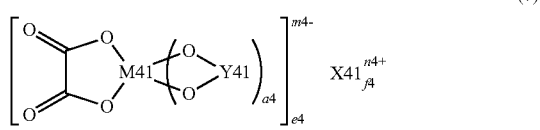

(7)

where X41 is a Group 1 element or a Group 2 element in the long form of the periodic table of the elements, M41 is a transition metal element, or a Group 13 element, a Group 14 element, or a Group 15 element in the long form of the periodic table of the elements, Y41 is —C(=O)—(CR41$_2$)$_{b4}$—C(=O)—, —R43$_2$C—(CR42$_2$)$_{c4}$—C(=O)—, —R43$_2$C—(CR42$_2$)$_{c4}$—CR43$_2$—, —R43$_2$C—(CR42$_2$)$_{c4}$—S(=O)$_2$—, —S(=O)$_2$—(CR42$_2$)$_{d4}$—S(=O)$_2$—, or —C(=O)—(CR42$_2$)$_{d4}$—S(=O)$_2$—, in which R41 and R43 each are a hydrogen group, an alkyl group, a halogen group, or a halogenated alkyl group, and one or both of them are a halogen group or a halogenated alkyl group, R42 is a hydrogen group, an alkyl group, a halogen group, or a halogenated alkyl group, and a4, e4, and n4 each are an integer of 1 or 2, b4 and d4 each are an integer of 1 to 4, c4 is an integer of 0 to 4, and f4 and m4 each are an integer of 1 to 3.

[Chemical Expression 12]

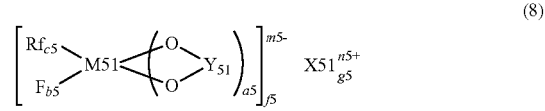

(8)

where X51 is a Group 1 element or a Group 2 element in the long form of the periodic table of the elements, M51 is a transition metal element, or a Group 13 element, a Group 14 element, or a Group 15 element in the long form of the periodic table of the elements, Rf is a fluorinated alkyl group having 1 to 10 carbon atoms or a fluorinated aryl group having 1 to 10 carbon atoms, Y51 is —C(=O)—(CR51$_2$)$_{d5}$—C(=O)—, —R52$_2$C—(CR51$_2$)$_{d5}$—C(=O)—, —R52$_2$C—(CR51$_2$)$_{d5}$—CR52$_2$—, —R52$_2$C—(CR51$_2$)$_{d5}$—S(=O)$_2$—, —S(=O)$_2$—(CR51$_2$)$_{e5}$—S(=O)$_2$—, or —C(=O)—(CR51$_2$)$_{e5}$—S(=O)$_2$—, in which R51 is a hydrogen group, an alkyl group, a halogen group or a halogenated alkyl group, R52 is a hydrogen group, an alkyl group, a halogen group, or a halogenated alkyl group, and one or more of them is a halogen group or a halogenated alkyl group, and a5, f5, and n5 each are an integer of 1 or 2, b5, c5, and e5 each are an integer of 1 to 4, d5 is an integer of 0 to 4, and g5 and m5 each are an integer of 1 to 3.

It is to be noted that Group 1 elements include hydrogen, lithium, sodium, potassium, rubidium, cesium, and francium. Group 2 elements include beryllium, magnesium, calcium, strontium, barium, and radium. Group 13 elements include boron, aluminum, gallium, indium, and thallium. Group 14 elements include carbon, silicon, germanium, tin, and lead. Group 15 elements include nitrogen, phosphorus, arsenic, antimony, and bismuth.

Examples of the compound represented by the expression (6) include compounds represented by expressions (6-1) to (6-6). Examples of the compound represented by the expression (7) include compounds represented by expressions (7-1) to (7-8). Examples of the compound represented by the expression (8) include a compound represented by an expression (8-1).

[Chemical Expression 13]

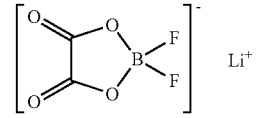

(6-1)

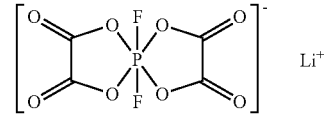

(6-2)

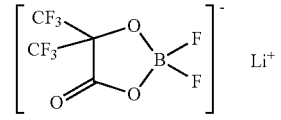

(6-3)

(6-4) 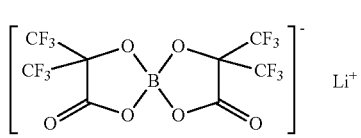

(6-5) 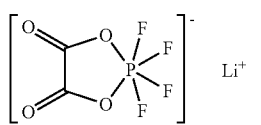

(6-6) 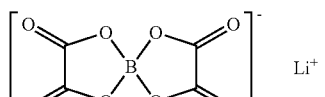

[Chemical Expression 14]

(7-1) 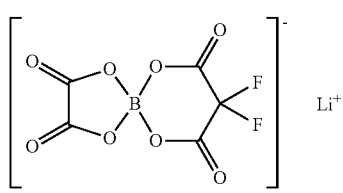

(7-2) 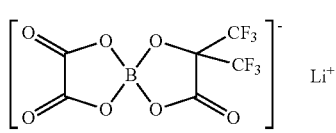

(7-3) 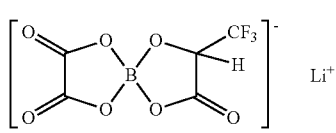

(7-4) 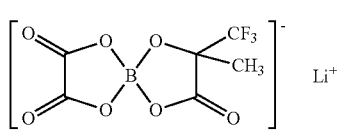

(7-5) 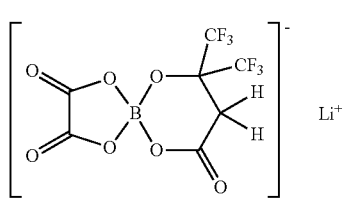

(7-6) 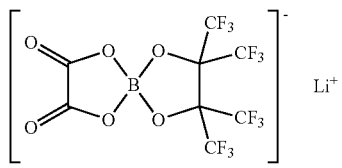

(7-7) 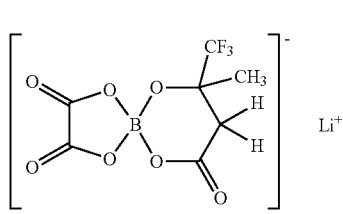

(7-8) 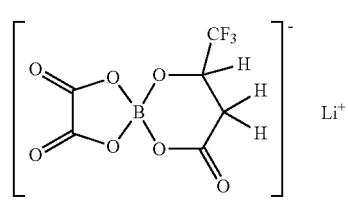

[Chemical Expression 15]

(8-1) 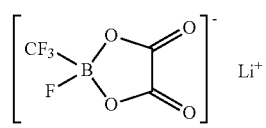

Moreover, the electrolyte salt preferably includes one kind or two or more kinds selected from compounds represented by the following expressions (9) to (11), because higher characteristics are obtainable. It is to be noted that the values of m and n may be the same as or different from each other. The same applied to p, q, and r. However, specific examples of the compounds represented by the expressions (9) to (11) may include not only compounds which will be described below but also other compounds.

$$\text{LiN}(C_mF_{2m+1}SO_2)(C_nF_{2n+1}SO_2) \qquad (9)$$

where m and n each are an integer of 1 or more.

[Chemical Expression 16]

(10)

where R61 is a straight-chain or branched perfluoroalkylene group having 2 to 4 carbon atoms.

$$\text{LiC}(C_pF_{2p+1}SO_2)(C_qF_{2q+1}SO_2)(C_rF_{2r+1}SO_2) \qquad (11)$$

where p, q, and r each are an integer of 1 or more.

The compound represented by the expression (9) is a chain imide compound, and examples thereof include lithium bis(trifluoromethane-sulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)), and lithium (trifluoromethanesulfonyl)(nonafluorobutanesulfonyl)imide (LiN(CF$_3$SO$_2$)(C$_4$F$_9$SO$_2$)).

The compound represented by the expression (10) is a cyclic imide compound, and examples thereof include compounds represented by expressions (10-1) to (10-4).

[Chemical Expression 17]

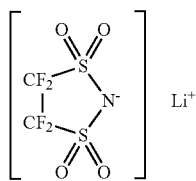

(10-1)

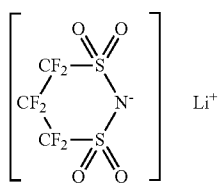

(10-2)

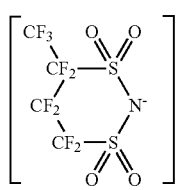

(10-3)

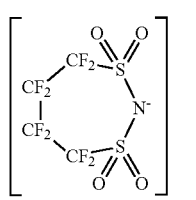

(10-4)

The compound represented by the expression (11) is a chain methide compound, and examples thereof include lithium tris(trifluoromethanesulfonyl)methide (LiC($CF_3SO_2$)$_3$).

The content of the electrolyte salt is not specifically limited, but is preferably within a range from 0.3 mol/kg to 3.0 mol/kg both inclusive relative to the nonaqueous solvent, because high ionic conductivity is obtainable.

[Operation of Secondary Battery]

In the secondary battery, for example, lithium ions extracted from the cathode 21 are inserted into the anode 22 through the electrolytic solution during charge, and lithium ions extracted from the anode 22 are inserted into the cathode 21 through the electrolytic solution during discharge.

[Method of Manufacturing Secondary Battery]

The secondary battery is manufactured by, for example, the following steps.

First of all, the cathode 21 is formed. First, the cathode active material and, if necessary, the cathode binder, the cathode conductor, and the like are mixed to form a cathode mixture. Then, the cathode mixture is dispersed in an organic solvent or the like to form paste-form cathode mixture slurry. Next, both surfaces of the cathode current collector 21A are coated with the cathode mixture slurry, and the cathode mixture slurry is dried to form the cathode active material layer 21B. Then, the cathode active material layer 21B is compression molded by a roller press or the like while applying heat, if necessary. In this case, compression molding may be repeated a plurality of times.

Moreover, the anode 22 is formed by steps similar to the above-described steps of forming the cathode 21. An anode mixture is formed by mixing the anode active material and, if necessary, the anode binder, the anode conductor, and the like, and the anode mixture is dispersed in an organic solvent or the like to form paste-form anode mixture slurry. Next, both surfaces of the anode current collector 22A are coated with the anode mixture slurry, and the anode mixture slurry is dried to form the anode active material layer 22B. Then, if necessary, the anode active material layer 22B is compression molded.

Further, the electrolyte salt is dispersed in the nonaqueous solvent, and then the methylene cyclic carbonate is added to the nonaqueous solvent to prepare the electrolytic solution.

Next, the battery device 20 is formed. First, the cathode lead 24 and the anode lead 25 are attached to the cathode current collector 21A and the anode current collector 22A, respectively, by a welding method or the like. Then, the cathode 21 and the anode 22 are laminated with the separator 23 in between, and they are spirally wound in a longitudinal direction to form a spirally wound body. Finally, the spirally wound body is molded to have a flat shape.

Finally, the secondary battery is assembled. First, the battery device 20 is contained in the battery can 11, and then the insulating plate 12 is placed on the battery device 20. Next, the cathode lead 24 and the anode lead 25 are attached to the cathode pin 15 and the battery can 11, respectively, by a welding method or the like. In this case, the battery cover 13 is fixed to an open end of the battery can 11 by a laser welding method or the like. Finally, the electrolytic solution is injected into the battery can 11 from the injection hole 19 to impregnate the separator 23 with the electrolytic solution, and then the injection hole 19 is sealed with the sealing member 19A.

[Functions and Effects of Secondary Battery]

In the prismatic type secondary battery, the electrolytic solution is contained in the battery can 11 having the flat surface 11M, and the electrolytic solution includes the methylene cyclic carbonate. In this case, as described above, decomposition reaction of the electrolytic solution caused by reactivity of the anode 22 is suppressed; therefore, initial charge-discharge characteristics are improved. Moreover, gas generation caused by decomposition reaction of the electrolytic solution not only during the initial charge and discharge but also while storage of the secondary battery at high temperature is suppressed; therefore, swelling characteristics are also improved. Thus, the initial charge-discharge characteristics and the swelling characteristics are both improved; therefore, good battery characteristics are allowed to be obtained.

In particular, when the content of the methylene cyclic carbonate in the electrolytic solution is within a range of 0.01 wt % to 10 wt % both inclusive, more specifically within a range of 0.1 wt % to 5 wt % both inclusive, a higher effect is allowed to be obtained.

(1-2. Lithium-Ion Secondary Battery (Laminate Film Type))

Figure 3:
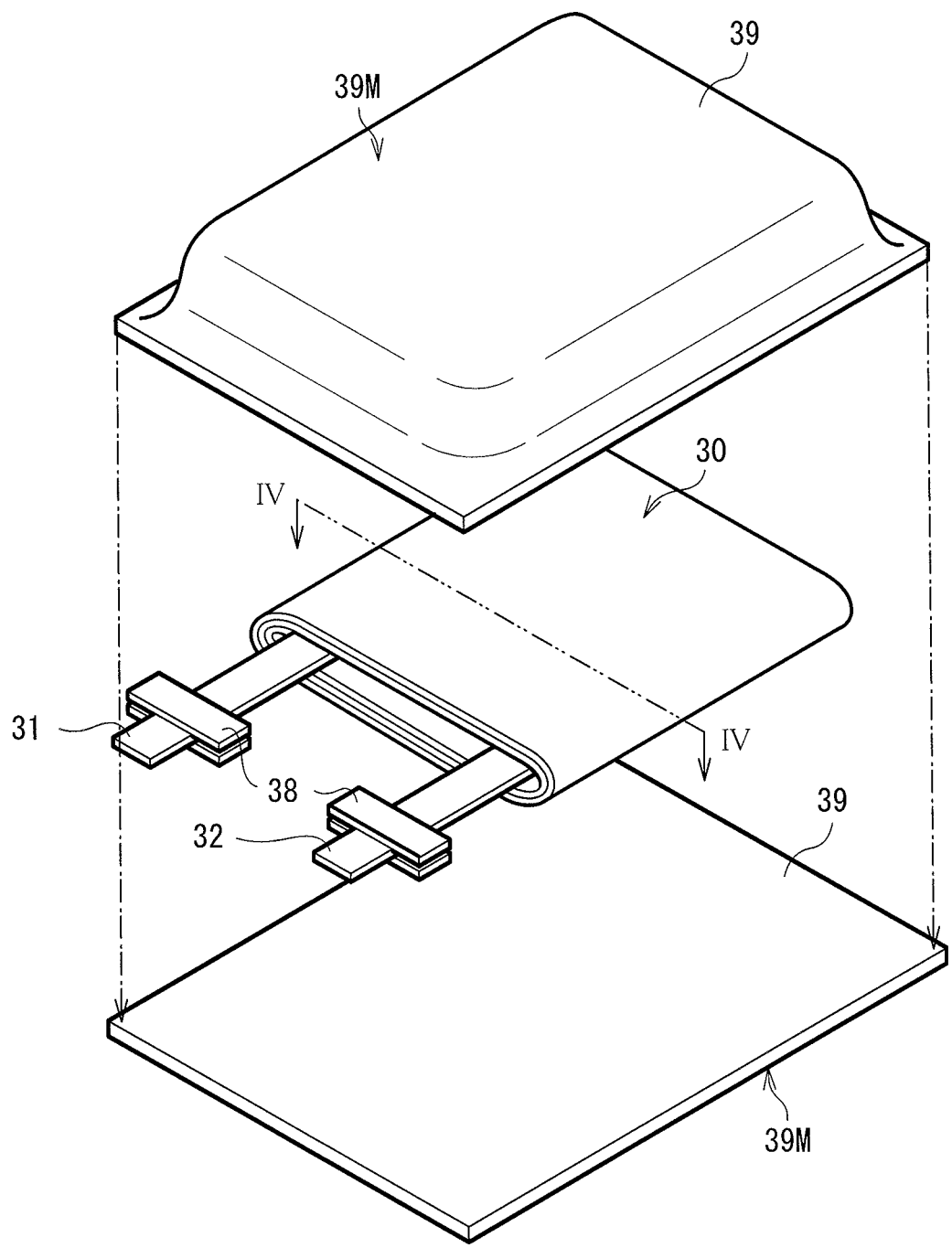
FIG. 3 is an exploded perspective view illustrating a configuration of another secondary battery (laminate film type) according to the first embodiment of the technology.
Figure 4:
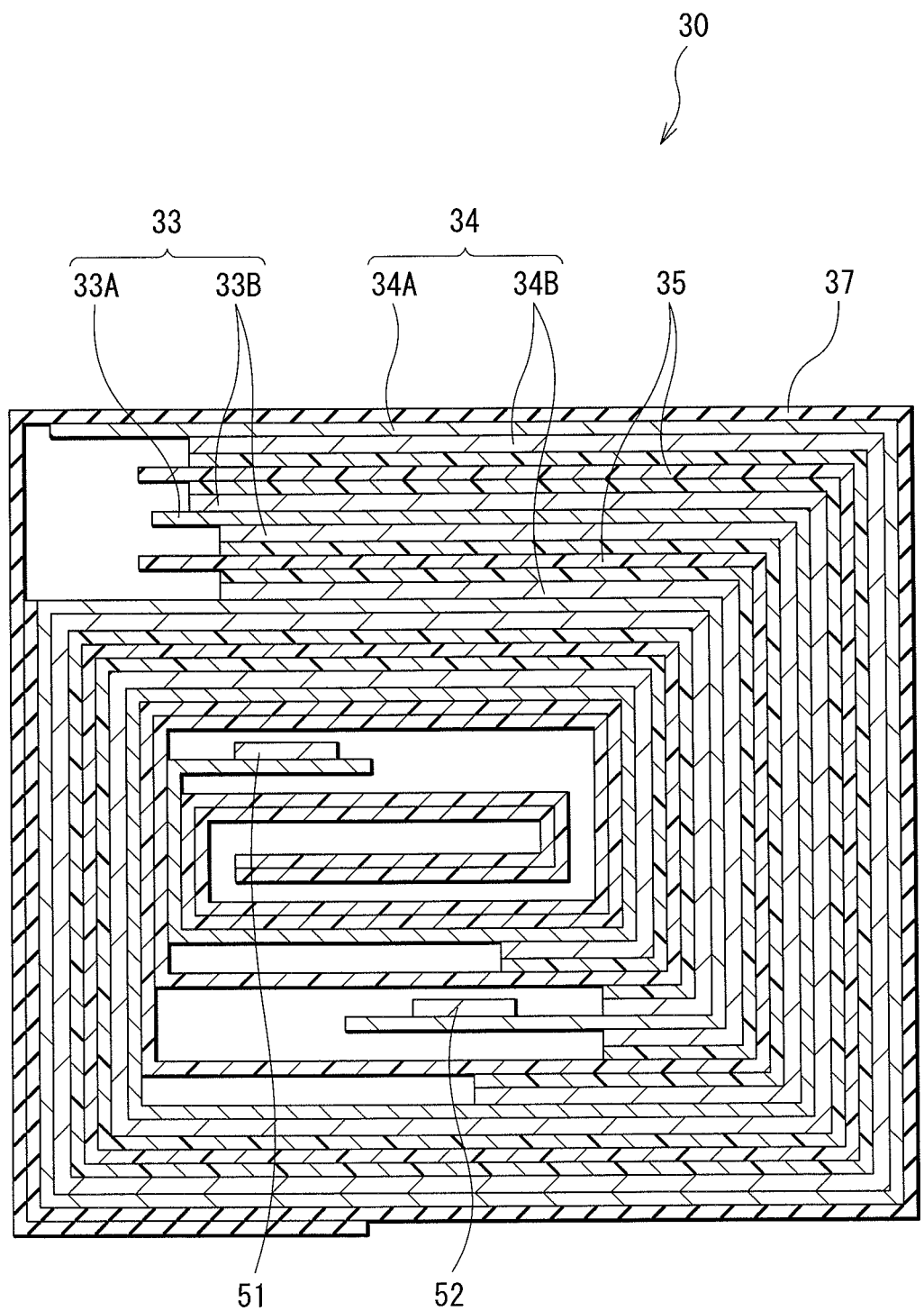
FIG. 4 is a sectional view taken along a line IV-IV of a spirally wound electrode body illustrated in FIG. 3.

FIGS. 3 and 4 illustrate a sectional configuration of another secondary battery, and FIG. 4 illustrates a section of the spirally wound electrode body 30 taken along a line IV-IV in FIG. 3. A description will be given of constituent components of the secondary battery with reference to the above-described components of the prismatic type secondary battery as appropriate.

[Entire Configuration of Secondary Battery]

The secondary battery is a lithium-ion secondary battery capable of obtaining battery capacity by insertion and extraction of lithium ions as in the case of the prismatic type secondary battery.

The secondary battery described here has a so-called laminate film type battery configuration. In the secondary battery, mainly a spirally wound electrode body 30 as the battery device is contained in a package member 39, and the spirally wound electrode body 30 is formed by laminating the cathode 33 and the anode 34 with the separator 35 impregnated with the electrolytic solution in between, and spirally winding them. The cathode lead 31 and the anode lead 32 are attached to the cathode 33 and the anode 34, respectively. An outermost portion of the spirally wound electrode body 30 is protected with a protective tape 37.

The cathode lead 31 and the anode lead 32 are drawn, for example, from the interiors of the package members 39 to outside in the same direction. The cathode lead 31 is made of, for example, a conductive material such as aluminum, and the anode lead 32 are made of, for example, a conductive material such as copper, nickel, or stainless. These conductive materials each have a sheet shape or a mesh shape.

The package members 39 are film-shaped package members having one or more flat outer surfaces (one or more flat surfaces 39M), and are laminate films formed by laminating, for example, a bonding layer, a metal layer, and a surface protection layer in this order. In the laminate films, for example, edge portions of the bonding layers of two laminate films are adhered to each other by fusion bonding or an adhesive to allow the bonding layers to face the spirally wound electrode body 30. The bonding layer is, for example, a film of polyethylene or polypropylene. The metal layer is, for example, aluminum foil. The surface protection layer is, for example, a film of nylon or polyethylene terephthalate.

In particular, as the package members 39, aluminum laminate films each formed by laminating a polyethylene film, aluminum foil, and a nylon film in this order are preferable. However, the package members 39 may be laminate films with any other laminate configuration, a polymer film of polypropylene or the like, or a metal film.

Adhesive films 38 for preventing the entry of outside air are inserted between each package member 39 and the cathode lead 31 and between each package member 39 and the anode lead 32. The adhesive films 38 are made of, for example, a material having adhesion to the cathode lead 31 and the anode lead 32. Examples of such a material include polyolefin resins such as polyethylene, polypropylene, modified polyethylene, and modified polypropylene.

The cathode 33 includes, for example, a cathode current collector 33A and a cathode active material layer 33B disposed on both surfaces of the cathode current collector 33A. The anode 34 includes, for example, an anode current collector 34A and an anode active material layer 34B disposed on both surfaces of the anode current collector 34A. The configurations of the cathode current collector 33A, the cathode active material layer 33B, the anode current collector 34A, and the anode active material layer 34B are similar to those of the cathode current collector 21A, the cathode active material layer 21B, the anode current collector 22A, and the anode active material layer 22B, respectively.

The configuration of the separator 35 is similar to that of the separator 23, and the composition of the electrolytic solution with which the separator 35 is impregnated is similar to that in the prismatic type secondary battery.

[Operation of Secondary Battery]

In the secondary battery, for example, lithium ions extracted from the cathode 33 are inserted into the anode 34 through the electrolyte layer 36 during charge. On the other hand, for example, lithium ions extracted from the anode 34 are inserted into the cathode 33 through the electrolyte layer 36 during discharge.

[Method of Manufacturing Secondary Battery]

The secondary battery is manufactured by, for example, the following steps.

First, the cathode 33 and the anode 34 are formed by steps similar to the steps of forming the cathode 21 and the anode 22. In this case, the cathode active material layer 33B is formed on both surfaces of the cathode current collector 33A to form the cathode 33, and the anode active material layer 34 is formed on both surfaces of the anode current collector 34A to form the anode 34. Next, the cathode lead 31 and the anode lead 32 are attached to the cathode current collector 33A and the anode current collector 34A, respectively, by a welding method or the like. Then, the cathode 33 and the anode 34 are laminated with the separator 35 in between, and they are spirally wound to form the spirally wound electrode body 30, and then the protective tape 37 is bonded to an outermost part of the spirally wound electrode body 30. Next, the spirally wound electrode body 30 is sandwiched between two film-shaped package members 39, and then the electrolytic solution is injected into the package members 39 to impregnate the separator 35 with the electrolytic solution. Next, edge portions of the package members 39 are adhered to each other by a thermal fusion bonding method or the like to seal the spirally wound electrode body 30 in the package members 39. In this case, the adhesive films 38 are inserted between the cathode lead 31 and each package member 39 and between the anode lead 32 and each package member 39.

[Functions and Effects of Secondary Battery]

In the laminate film type secondary battery, the electrolytic solution is contained in the package members 39 having the flat surface 39M, and the electrolytic solution include the methylene cyclic carbonate. Therefore, good battery characteristics are allowed to be obtained because of a reason similar to that in the case of the prismatic type secondary battery. Functions and effects other than this are similar to those in the case of the prismatic type secondary battery.

(1-3. Lithium Metal Secondary Battery (Prismatic Type, Laminate Film Type))

A secondary battery described here is a lithium secondary battery (lithium metal secondary battery) in which the capacity of an anode is represented by deposition and dissolution of lithium (lithium metal) as an electrode reactant. The secondary battery has a configuration similar to that of the above-described prismatic type lithium-ion secondary battery, except that the anode active material layer 22B is formed of lithium metal, and is manufactured by steps similar to those in the case of the above-described prismatic type lithium-ion secondary battery.

In the secondary battery, as lithium metal is used as the anode active material, high energy density is allowed to be obtained. The anode active material layer 22B may exist at the time of assembling, or may not exist at the time of assembling, and may be formed of lithium metal deposited during charge. Moreover, the anode active material layer 22B may be also used as a current collector, and the anode current collector 22A may not be included.

In the secondary battery, for example, lithium ions extracted from the cathode 21 are deposited as lithium metal on surfaces of the anode current collector 22A through the electrolytic solution during charge. On the other hand, for example, lithium metal in the anode active material layer 22B is eluted as lithium ions into the electrolytic solution, and the lithium ions are inserted into the cathode 21 through the electrolytic solution during discharge.

In the lithium metal secondary battery, the electrolytic solution includes the methylene cyclic carbonate; therefore, good battery characteristics are allowed to be obtained because of a reason similar to that in the case of the above-described lithium ion secondary batteries. Functions and effects other than this are similar to those in the case of the prismatic type secondary battery. It is to be noted that the lithium metal secondary battery is not limited to the prismatic type secondary battery, and may be the laminate film type secondary battery illustrated in FIGS. 3 and 4. In this case, similar effects are also allowed to be obtained.

Although some specific examples of the secondary battery are described above, the battery configuration of the secondary battery and the device configuration of the battery device may have any other configuration, as long as the package member of the secondary battery has a flat surface. More specifically, for example, the battery configuration is not limited to the prismatic type and the laminate film type, and may be a coin type, a button type, or the like. Moreover, the device configuration is not limited to a spirally wound configuration, and may be a laminate configuration. In this case, similar effects are also allowed to be obtained.

(2. Secondary Battery (Second Embodiment))

(2-1. Lithium-Ion Secondary Battery (Cylindrical Type))

Next, a secondary battery according to a second embodiment of the technology will be described below.

Figure 5:
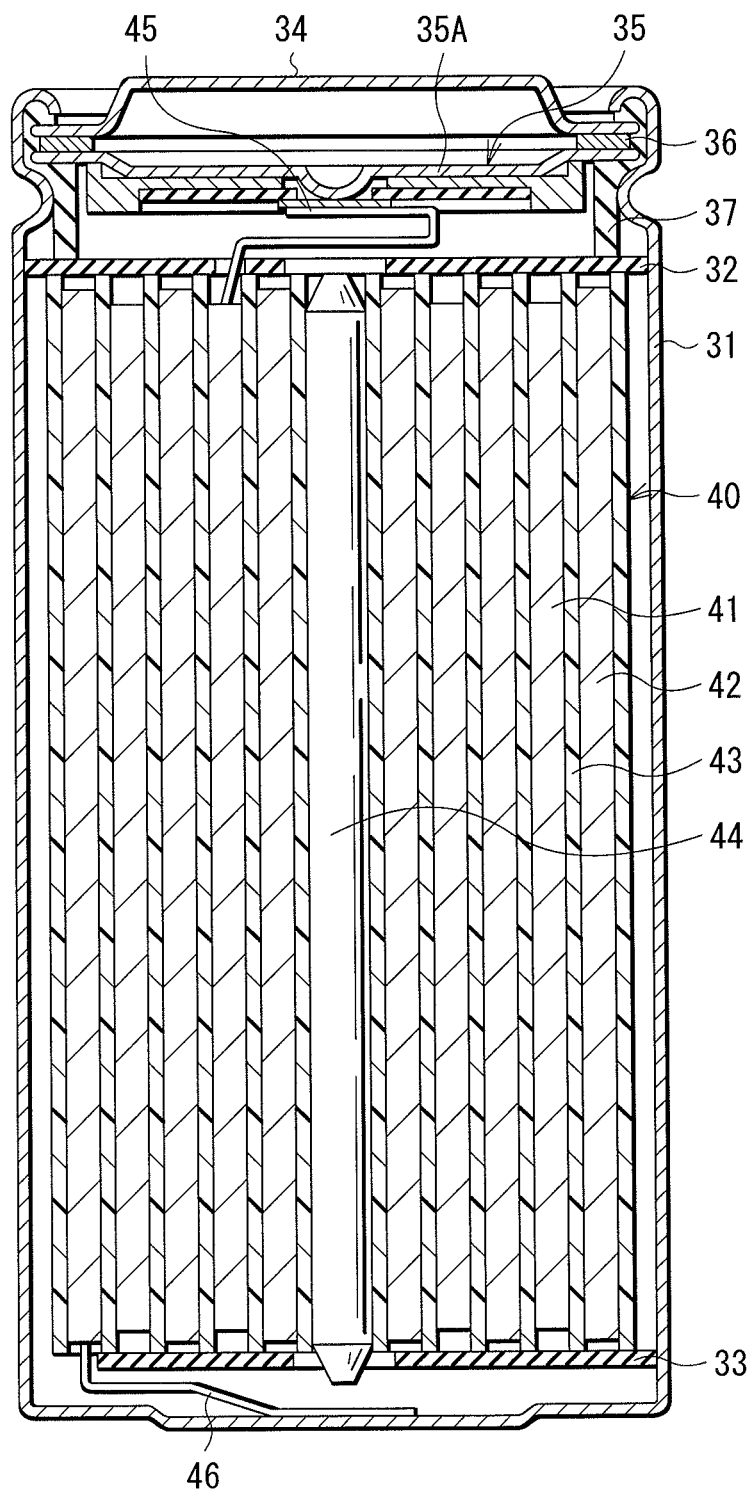
FIG. 5 is a sectional view illustrating a configuration of a secondary battery (cylindrical type) according to a second embodiment of the technology.
Figure 6:
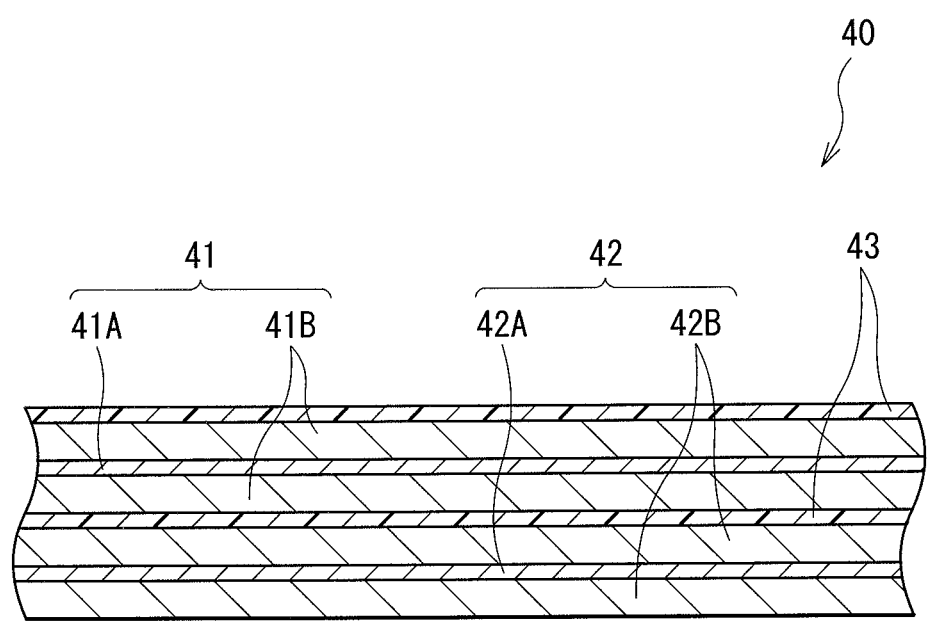
FIG. 6 is an enlarged sectional view illustrating a part of a spirally wound electrode body illustrated in FIG. 5.

FIGS. 5 and 6 illustrate a sectional configuration of the secondary battery, and FIG. 6 illustrates an enlarged view of a part of a spirally wound electrode body 40 illustrated in FIG. 5. A description will be given of constituent components of the secondary battery with reference to the above-described components of the secondary battery (prismatic type) according to the first embodiment as appropriate.

[Entire Configuration of Secondary Battery]

The secondary battery described here has a so-called cylindrical type battery configuration. In the secondary battery, the spirally wound electrode body 40 and a pair of insulating plates 32 and 33 are contained in a substantially hollow cylindrical shaped battery can 31. The spirally wound electrode body 40 is formed, for example, by laminating a cathode 41 and an anode 42 with a separator 43 in between, and then spirally winding them.

The battery can 31 has a hollow configuration in which an end of the battery can 31 is closed and the other end thereof is opened, and the battery can 31 is made of, for example, a material similar to that of the battery can 11. The pair of insulating plates 32 and 33 are disposed to allow the spirally wound electrode body 40 to be sandwiched therebetween at the top and the bottom of the spirally wound electrode body 40 and to extend in a direction perpendicular to a peripheral winding surface.

In the open end of the battery can 31, a battery cover 34, and a safety valve mechanism 35, and a positive temperature coefficient (PTC) device 36 are caulked by a gasket 37, thereby sealing the battery can 31. The battery cover 34 is made of, for example, a material similar to that of the battery can 31. The safety valve mechanism 35 and the PTC device 36 are disposed inside the battery cover 34, and the safety valve mechanism 35 is electrically connected to the battery cover 34 through the PTC device 36. In the safety valve mechanism 35, when an internal pressure in the secondary battery increases to a certain extent or higher due to an internal short circuit or external application of heat, a disk plate 35A is flipped to disconnect the electrical connection between the battery cover 34 and the spirally wound electrode body 40. The PTC device 36 prevents abnormal heat generation caused by a large current. The PTC device 36 increases resistance with an increase in temperature. The gasket 37 is made of, for example, an insulating material, and its surface may be coated with asphalt.

A center pin 44 may be inserted into the center of the spirally wound electrode body 40. A cathode lead 45 made of a conductive material such as aluminum is connected to the cathode 41, and an anode lead 46 made of a conductive material such as nickel is connected to the anode 42. The cathode lead 45 is connected to the safety valve mechanism 35 by welding or the like, and is electrically connected to the battery cover 34, and the anode lead 46 is connected to the battery can 31 by welding or the like, and is electrically connected to the battery can 31.

[Cathode, Anode and Separator]

The cathode 41 includes, for example, a cathode current collector 41A and a cathode active material layer 41B disposed on both surfaces of the cathode current collector 41A. The anode 42 includes, for example, an anode current collector 42A and an anode active material layer 42B disposed on both surfaces of the anode current collector 42A. The configurations of the cathode current collector 41A, the cathode active material layer 41B, the anode current collector 42A, and the anode active material layer 42B are similar to those of the cathode current collector 21A, the cathode active material layer 21B, the anode current collector 22A, and the anode active material layer 22B, respectively. Moreover, the configuration of the separator 43 is similar to that of the separator 23.

[Electrolytic Solution]

An electrolytic solution which is a liquid electrolyte is impregnated with the separator 43, and includes a methylene cyclic carbonate represented by the following expression (11) and one or more kinds selected from auxiliary compounds represented by the following expressions (12) to (16). However, the electrolytic solution may include other materials such as a nonaqueous solvent and an electrolyte salt.

[Chemical Expression 18]

(11)

where R1 and R2 each are a hydrogen group, a halogen group, a monovalent hydrocarbon group, a monovalent halogenated hydrocarbon group, an oxygen-containing monovalent hydrocarbon group, or an oxygen-containing monovalent halogenated hydrocarbon group, and R1 and R2 may be bonded to each other.

[Chemical Expression 19]

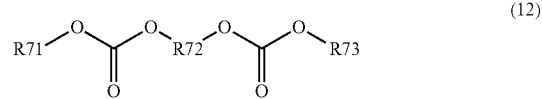

(12)

where R71 and R73 each are a monovalent hydrocarbon group, a monovalent halogenated hydrocarbon group, an oxygen-containing monovalent hydrocarbon group, or an oxygen-containing monovalent halogenated hydrocarbon group, and R72 is a divalent hydrocarbon group, a divalent halogenated hydrocarbon group, an oxygencontaining divalent hydrocarbon group, or an oxygen-containing divalent halogenated hydrocarbon group.

[Chemical Expression 20]

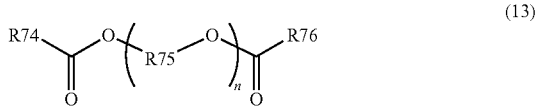

(13)

where R74 and R76 each are a monovalent hydrocarbon group, a monovalent halogenated hydrocarbon group, an oxygen-containing monovalent hydrocarbon group, or an oxygen-containing monovalent halogenated hydrocarbon group, R75 is a divalent hydrocarbon group, a divalent halogenated hydrocarbon group, an oxygen-containing divalent hydrocarbon group, or an oxygen-containing divalent halogenated hydrocarbon group, and n is an integer of 1 or more.

[Chemical Expression 21]

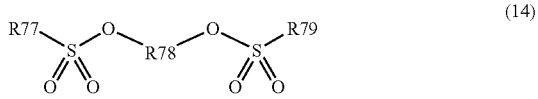

(14)

where R77 and R79 each are a monovalent hydrocarbon group, a monovalent halogenated hydrocarbon group, an oxygen-containing monovalent hydrocarbon group, or an oxygen-containing monovalent halogenated hydrocarbon group, and R78 is a divalent hydrocarbon group, a divalent halogenated hydrocarbon group, an oxygen-containing divalent hydrocarbon group, or an oxygen-containing divalent halogenated hydrocarbon group.

(15)

(16)

The electrolytic solution includes both the methylene cyclic carbonate and the auxiliary compound, because chemical stability of the electrolytic solution is improved by a synergistic interaction between them. Therefore, a reduction in discharge capacity is less likely to occur, even if the secondary battery is repeatedly charged and discharged and the secondary battery is kept in a high-temperature environment.

Details of the methylene cyclic carbonate represented by the expression (11) is similar to those of the methylene cyclic carbonate represented by the expression (1) in the first embodiment, and will not be further described.

The auxiliary compound represented by the expression (12) is a dicarbonate compound having carbonate groups (—O—C(=O)—O—R71 and —O—C(=O)—O—R73) at both ends.

Kinds of R71 and R73 are not specifically limited, as long as they each are a monovalent hydrocarbon group, a monovalent halogenated hydrocarbon group, an oxygen-containing monovalent hydrocarbon group, or an oxygen-containing monovalent halogenated hydrocarbon group, as described above, because the dicarbonate compound has the carbonate groups, thereby allowing the above-described advantages to be obtained without relying on the kinds of R71 and R73. It is to be noted that the kinds of R71 and R73 may be the same as or different from each other.

Examples of the monovalent hydrocarbon group and the monovalent halogenated hydrocarbon group include an alkyl group having 1 to 12 carbon atoms, an alkenyl group having 2 to 12 carbon atoms, an alkynyl group having 2 to 12 carbon atoms, an aryl group having 6 to 18 carbon atoms, a cycloalkyl group having 3 to 18 carbon atoms, and a group in which one or more of hydrogen groups in any of the above-described groups is substituted with a halogen group. Moreover, examples of the oxygen-containing monovalent hydrocarbon group and the oxygen-containing monovalent halogenated hydrocarbon group include an alkoxy group having 1 to 12 carbon atoms, and a group in which one or more of hydrogen groups in the alkoxy group is substituted with a halogen group, because the above-described advantages are obtainable while securing solubility, compatibility, and the like of the dicarbonate compound. It is to be noted that the alkyl group, the alkenyl group, the alkynyl group, or the alkoxy group may have a straight-chain structure, or a branched structure having one or two or more side chains. For example, details of R71 and R73 are similar to those of R1 and R2 in the first embodiment, and will not be further described.

The kind of R72 is not specifically limited, as long as R72 is a divalent hydrocarbon group, a divalent halogenated hydrocarbon group, an oxygen-containing divalent hydrocarbon group, or an oxygen-containing divalent halogenated hydrocarbon group, as described above, because the above-described advantages are obtainable without relying on the kind of R72 by a reason similar to the abovedescribed reason in the case of R71 and R73.

Examples of the divalent hydrocarbon group include an alkylene group having 1 to 12 carbon atoms, an alkenylene group having 2 to 12 carbon atoms, an alkynylene group having 2 to 12 carbon atoms, an arylene group having 6 to 18 carbon atoms, a cycloalkylene group having 3 to 18 carbon atoms, and a group including an arylene group and an alkylene group. However, the group including an arylene group and an alkylene group may be a group in which one arylene group and one alkylene group are linked to each other, or a group (an aralkylene group) in which two alkylene groups are linked to each other through an arylene group. The number of carbon atoms in the alkylene group is preferably 12 or less. Moreover, the divalent halogenated hydrocarbon group is, for example, a group in which one or more of hydrogen groups in the above-described alkylene group or the like is substituted with a halogen group, because the above-described advantages are obtainable while securing solubility, compatibility, and the like of the dicarbonate compound.

Examples of the oxygen-containing divalent hydrocarbon group include a group including an ether bond and an alkylene group. However, the group including an ether bond and an alkylene group may be a group in which one ether bond and one alkylene group are linked to each other, or a group (an aralkylene group) in which two alkylene groups are linked to each other through one ether bond. The number of carbon atoms in the alkylene group is preferably 12 or less. Moreover, examples of the oxygen-containing divalent halogenated hydrocarbon group include a group in which one or more of hydrocarbon groups in the above-described group including an ether bond and an alkylene group, or the like is substituted with a halogen group, because the above-described advantages are obtainable while securing solubility, compatibility, and the like of the dicarbonate compound.

Specific examples of R72 include straight-chain alkylene groups represented by the following expressions (12-1) to (12-7), branched alkylene groups represented by expressions (12-8) to (12-16), arylene groups represented by expressions (12-17) to (12-19), and divalent groups (benzylidene groups) including an arylene group and an alkylene group represented by expressions (12-20) to (12-22).

[Chemical Expression 22]

 (12-1)

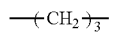 (12-2)

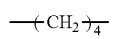 (12-3)

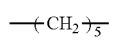 (12-4)

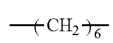 (12-5)

 (12-6)

 (12-7)

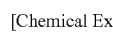

[Chemical Expression 23]

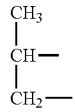 (12-8)

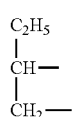 (12-9)

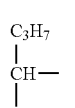 (12-10)

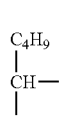 (12-11)

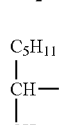 (12-12)

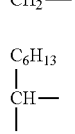 (12-13)

-continued

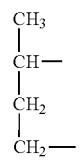 (12-14)

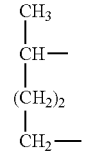 (12-15)

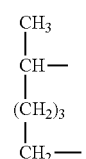 (12-16)

[Chemical Expression 24]

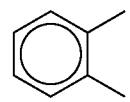 (12-17)

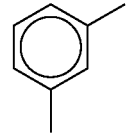 (12-18)

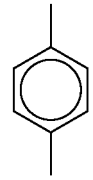 (12-19)

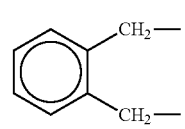 (12-20)

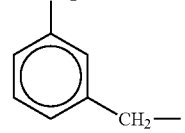 (12-21)

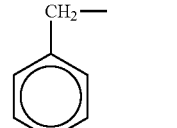 (12-22)

It is to be noted that as the divalent group including an ether bond and an alkylene group, a group in which two or more alkylene groups are linked to each other through an ether bond and carbon atoms are included at both ends thereof is preferable. The number of carbon atoms in such a group is preferably within a range of 4 to 12 both inclusive, because good solubility and good compatibility are obtainable. However, the number of ether bonds, the linking order of the ether bond and the alkylene groups may be arbitrarily selected.

Specific examples of R72 in this case include divalent groups represented by the following expressions (12-23) to (12-35). Moreover, in the case where the divalent groups represented by the expressions (12-23) to (12-35) are fluorinated, examples of R72 may include groups represented by expressions (12-36) to (12-44). In particular, the groups represented by the expressions (12-28) to (12-30) are preferable.

[Chemical Expression 25]

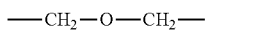 (12-23)

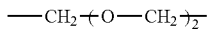 (12-24)

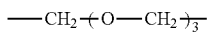 (12-25)

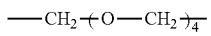 (12-26)

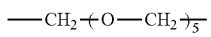 (12-27)

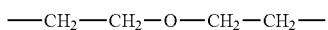 (12-28)

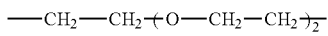 (12-29)

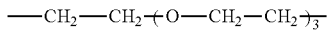 (12-30)

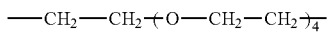 (12-31)

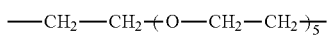 (12-32)

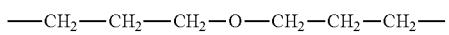 (12-33)

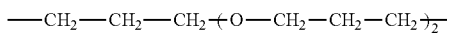 (12-34)

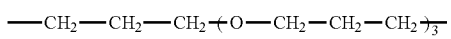 (12-35)

[Chemical Expression 26]

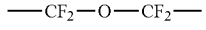 (12-36)

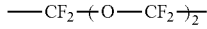 (12-37)

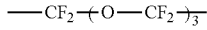 (12-38)

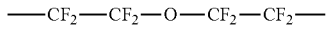 (12-39)

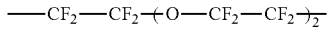 (12-40)

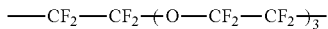 (12-41)

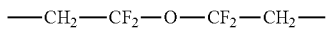 (12-42)

 (12-43)

 (12-44)

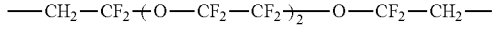

The molecular weight of the dicarbonate compound is not specifically limited, but is preferably within a range of 200 to 800 both inclusive, more preferably within a range of 200 to 600 both inclusive, and still more preferably within a range of 200 to 450 both inclusive, because good solubility and good compatibility are obtainable.

Specific examples of the dicarbonate compound include compounds represented by the following expressions (12-45) to (12-56), because sufficient solubility and sufficient compatibility are obtainable, and chemical stability of the electrolytic solution is sufficiently improved. However, any other compound corresponding to the expression (12) may be used.

[Chemical Expression 27]

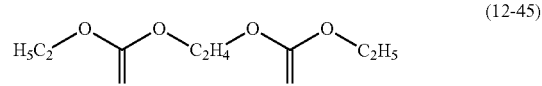 (12-45)

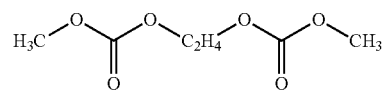 (12-46)

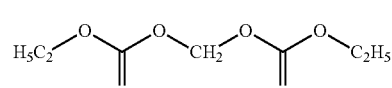 (12-47)

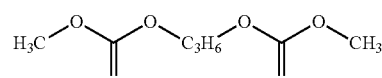 (12-48)

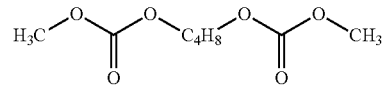 (12-49)

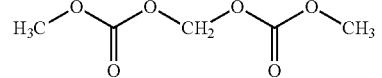 (12-50)

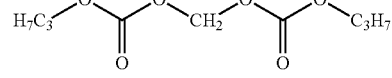 (12-51)

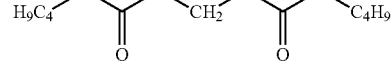 (12-52)

 (12-53)

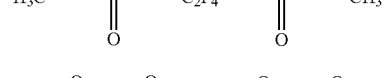 (12-54)

 (12-55)

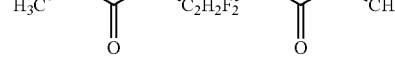 (12-56)

The auxiliary compound represented by the expression (13) is a dicarboxylic acid compound having carboxylic acid groups (—O—C(=O)—R74 and —O—C(=O)—R76) at both ends. The value of n is not specifically limited, as long as the value is an integer of 1 or more. The kinds of R74 and R76 may be the same as or different from each other. It is to be noted that details of R74 to R76 are similar to those of R71 to R73, and will not be further described.

The molecular weight of the dicarboxylic acid compound is not specifically limited, but is preferably within a range of 162 to 1000 both inclusive, more preferably within a range of 162 to 500 both inclusive, and still more preferably within a range of 162 to 300 both inclusive, because good solubility and good compatibility are obtainable.

Specific examples of the dicarboxylic acid compound include compounds represented by the following expressions (13-1) to (13-17), because sufficient solubility and sufficient compatibility are obtainable, and chemical stability of the electrolytic solution is sufficiently improved. However, any other compound corresponding to the expression (13) may be used.

[Chemical Expression 28]

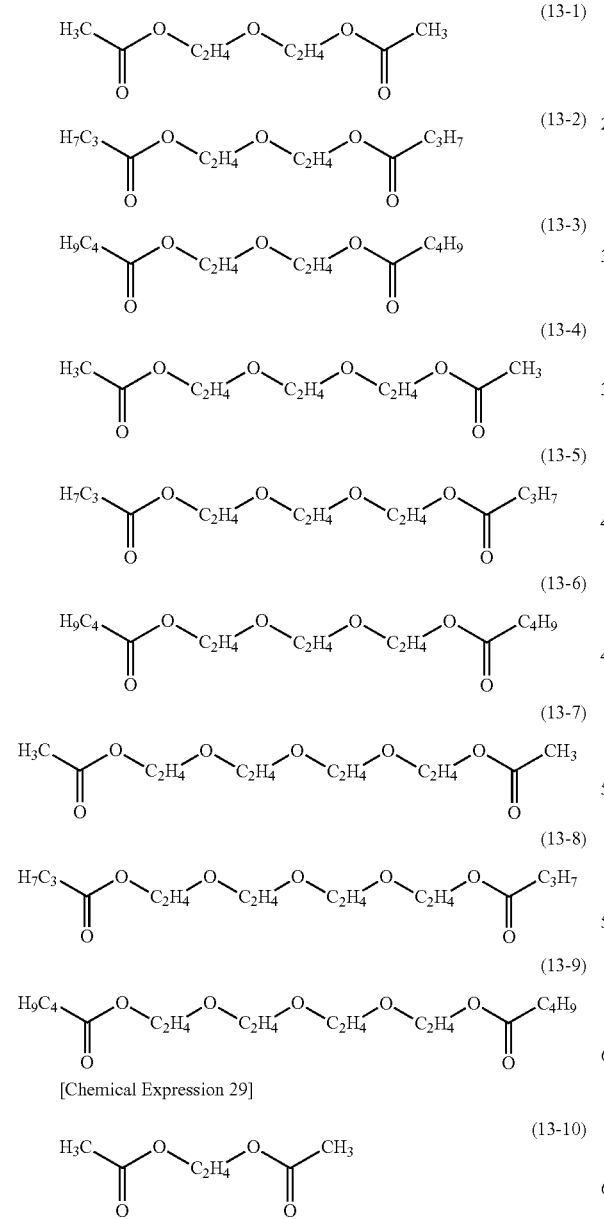

[Chemical Expression 29]

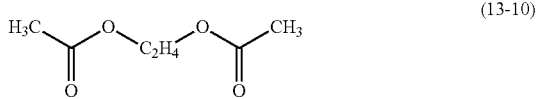

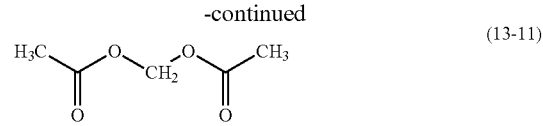

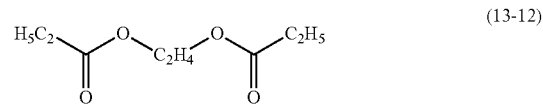

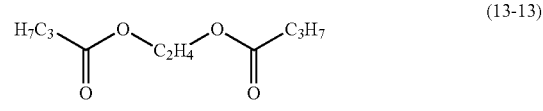

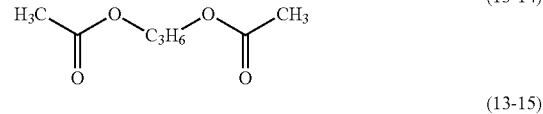

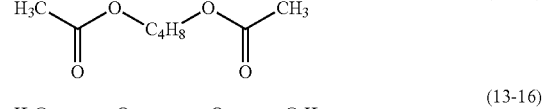

The auxiliary compound represented by the expression (14) is a difulfonic acid compound having sulfonic acid groups (—O—S(=O)$_2$—R77 and —O—S(=O)$_2$—R79) at both ends. The kinds of R77 and R79 may be the same as or different from each other. It is to be noted that details of R77 to R79 are similar to those of R71 to R73, and will not be further described.

The molecular weight of the disulfonic acid compound is not specifically limited, but is preferably within a range of 200 to 800 both inclusive, more preferably within a range of 200 to 600 both inclusive, and still more preferably within a range of 200 to 450 both inclusive, because good solubility and good compatibility are obtainable.

Specific examples of the disulfonic acid compound include compounds represented by the following expressions (14-1) to (14-9), because sufficient solubility and sufficient compatibility are obtainable, and chemical stability of the electrolytic solution is sufficiently improved. However, any other compound corresponding to the expression (14) may be used.

[Chemical Expression 30]

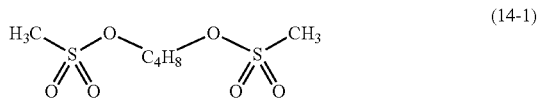

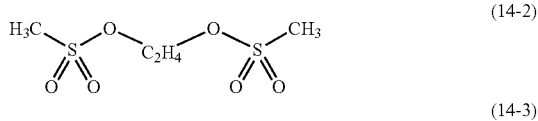

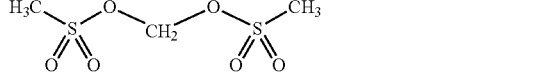

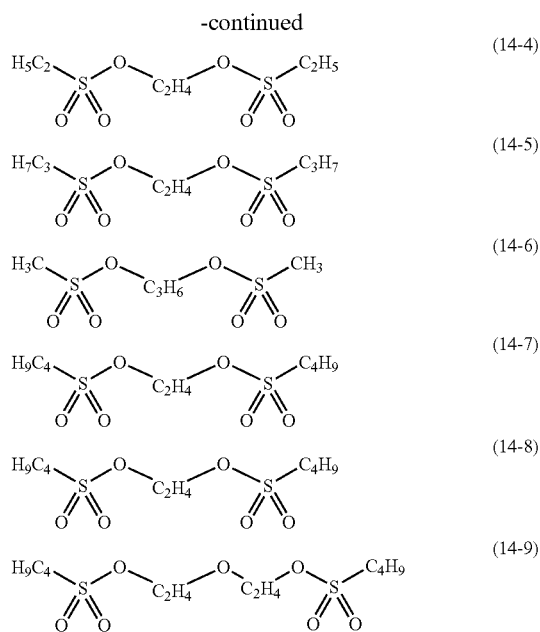

The auxiliary compound represented by the expression (15) is lithium monofluorophosphate, and the auxiliary compound represented by the expression (16) is lithium difluorophosphate.

The content of the methylene cyclic carbonate in the electrolytic solution is not specifically limited, but is preferably within a range of 0.01 wt % to 10 wt % both inclusive, and more preferably within a range of 0.5 wt % to 5 wt % both inclusive. Moreover, the content of the auxiliary compound in the electrolytic solution is not specifically limited, but is preferably within a range of 0.001 wt % to 2 wt % both inclusive, and more preferably within a range of 0.1 wt % to 1 wt % both inclusive, because a higher effect is obtainable.

It is to be noted that details of the nonaqueous solvent and the electrolyte salt are similar to those in the first embodiment, and will not be further described.

[Operation of Secondary Battery]

In the secondary battery, for example, lithium ions extracted from the cathode 41 are inserted into the anode 42 through the electrolytic solution during charge, and lithium ions extracted from the anode 42 are inserted into the cathode 41 through the electrolytic solution during discharge.

[Method of Manufacturing Secondary Battery]

The secondary battery is manufactured by, for example, the following steps.

First, the cathode 41 and the anode 42 are formed by steps similar to those in the first embodiment. In this case, the cathode active material layer 41B is formed on both surfaces of the cathode current collector 41A to form the cathode 41, and the anode active material layer 42B is formed on both surfaces of the anode current collector 42A to form the anode 42.

Moreover, the electrolyte salt is dispersed in the nonaqueous solvent, and then the methylene cyclic carbonate and the auxiliary compound are added to the nonaqueous solvent to prepare the electrolytic solution.

Finally, the secondary battery is assembled with use of the cathode 41 and the anode 42. The cathode lead 45 and the anode lead 46 are attached to the cathode current collector 41A and the anode current collector 42A, respectively, by a welding method or the like. Next, the cathode 41 and the anode 42 are laminated with the separator 43 in between, and they are spirally wound to form the spirally wound electrode body 40, then the center pin 44 is inserted into the center of the spirally wound electrode body 40. Next, the spirally wound electrode body 40 sandwiched between the pair of insulating plates 32 and 33 is contained in the battery can 31. In this case, the safety valve mechanism 35 and the battery can 31 are attached to an end of the cathode lead 45 and an end of the anode lead 46, respectively, by a welding method or the like. Then, the electrolytic solution is injected into the battery can 31 to impregnate the separator 43 with the electrolytic solution. Next, the battery cover 34, the safety valve mechanism 35, and the PTC device 36 are caulked in the open end of the battery can 31 by the gasket 37.

[Functions and Effects of Secondary Battery]

In the cylindrical type secondary battery, the electrolytic solution includes the methylene cyclic carbonate and the auxiliary compound. In this case, as described above, chemical stability of the electrolytic solution is improved by a synergistic interaction between them; therefore, a reduction in discharge capacity is less likely to occur, even if the secondary battery is repeatedly charged and discharged and the secondary battery is kept in a high-temperature environment. Accordingly, good battery characteristics are allowed to be obtained.

In particular, when the content of the methylene cyclic carbonate in the electrolytic solution is within a range of 0.01 wt % to 10 wt % both inclusive, specifically within a range of 0.5 wt % to 5 wt % both inclusive, a higher effect is allowed to be obtained. Moreover, when the content of the auxiliary compound in the electrolytic solution is within a range of 0.001 wt % to 2 wt % both inclusive, specifically within a range of 0.1 wt % to 1 wt % both inclusive, a higher effect is allowed to be obtained.

(2-2. Lithium-Ion Secondary Battery (Prismatic Type, Laminate Film Type))

It is to be noted that the secondary battery according to the embodiment may be a prismatic type secondary battery, a laminate film type secondary battery, or the like, instead of the above-described cylindrical type secondary battery. The configuration of the prismatic type or laminate film type secondary battery is similar to that in the first embodiment, except that the composition of the electrolytic solution is different from that in the first embodiment. In this case, good battery characteristics are also allowed to be obtained.

(2-3. Lithium Metal Secondary Battery (Cylindrical Type, Prismatic Type, .laminate Film Type))

Moreover, the secondary battery according to the embodiment may be a lithium metal secondary battery instead of the above-described lithium-ion secondary battery. In this case, the secondary battery may a cylindrical type, a prismatic type, or a laminate film type secondary battery. The configuration of the lithium metal secondary battery is similar to that in the first embodiment, except that the configuration of the anode is different from that in the first embodiment. In this case, good battery characteristics are also allowed to be obtained.

(3. (Secondary Battery (Third Embodiment)/3-1. Lithium-Ion Secondary Battery (Cylindrical Type))

Next, a secondary battery according to a third embodiment of the technology will be described below.

The secondary battery according to the embodiment has a configuration similar to that in the second embodiment, except that, for example, the composition of the electrolytic solution is different from that in the second embodiment. In other words, the secondary battery described here is a cylindrical type lithium-ion secondary battery.

The electrolytic solution includes a methylene cyclic carbonate represented by the following expression (17) and one or both of halogenated carbonates represented by the following expressions (18) and (19). However, the electrolytic solution may include any other material such as a nonaqueous solvent and an electrolyte salt.

[Chemical Expression 31]

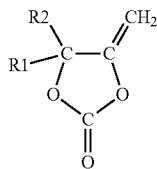

(17)

where R1 and R2 each are a hydrogen group, a halogen group, a monovalent hydrocarbon group, or a monovalent halogenated hydrocarbon group, and R1 and R2 may be bonded to each other.

[Chemical Expression 32]

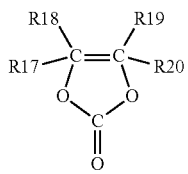

(18)

where R17 to R20 each are a hydrogen group, a halogen group, a monovalent hydrocarbon group, or a monovalent halogenated hydrocarbon group, and one or more of R17 to R20 is a halogen group or a monovalent halogenated hydrocarbon group.

[Chemical Expression 33]

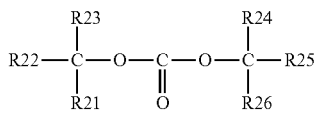

(19)

where R21 to R26 each are a hydrogen group, a halogen group, a monovalent hydrocarbon group, or a monovalent halogenated hydrocarbon group, and one or more of R21 to R26 is a halogen group or a monovalent halogenated hydrocarbon group.

The electrolytic solution includes both the methylene cyclic carbonate and the halogenated carbonate, because chemical stability of the electrolytic solution is improved by a synergistic interaction between them. Therefore, a reduction in discharge capacity is less likely to occur, even if the secondary battery is repeatedly charged and discharged and the secondary battery is kept in a high-temperature environment.

Details of the methylene cyclic carbonate represented by the expression (17) is similar to those of the methylene cyclic carbonate in the first embodiment, and will not be further described. Moreover, details of the halogenated carbonates represented by the expressions (18) and (19) are similar to those of the halogenated carbonates (the halogenated cyclic carbonate and the halogenated chain carbonate) in the first embodiment, and will not be further described.

The content of the methylene cyclic carbonate in the electrolytic solution is not specifically limited, but is preferably within a range of 0.01 wt % to 10 wt % both inclusive, and more preferably within a range of 0.1 wt % to 5 wt % both inclusive. Moreover, the content of the halogenated carbonate in the electrolytic solution is not specifically limited, but is preferably within a range of 0.1 wt % to 20 wt % both inclusive, and more preferably within a range of 5 wt % to 20 wt % both inclusive, because a higher effect is obtainable.

It is to be noted that details of the nonaqueous solvent and the electrolyte salt are similar to those in the first embodiment, and will not be further described.

For example, details of the operation and the manufacturing method of the secondary battery are similar to those in the second embodiment (cylindrical type), except that the composition of the electrolytic solution is different from that in the second embodiment.

In the cylindrical type secondary battery, the electrolytic solution includes the methylene cyclic carbonate and the halogenated carbonate. In this case, as described above, chemical stability of the electrolytic solution is improved by the synergistic interaction between them; therefore, a reduction in discharge capacity is less likely to occur, even if the secondary battery is repeatedly charged and discharged and the secondary battery is kept in a high-temperature environment. Accordingly, good battery characteristics are allowed to be obtained.

In particular, when the content of the methylene cyclic carbonate in the electrolytic solution is within a range of 0.01 wt % to 10 wt % both inclusive, and the content of the halogenated carbonate in the electrolytic solution is within a range of 0.1 wt % to 20 wt % both inclusive, a higher effect is allowed to be obtained.

(3-2. Lithium-Ion Secondary Battery (Prismatic Type, Laminate Film Type))

It is to be noted that the secondary battery according to the embodiment may be a prismatic type secondary battery, a laminate film type secondary battery, or the like, instead of the above-described cylindrical type secondary battery. The configuration of the prismatic type or laminate film type secondary battery is similar to that in the first embodiment, except that the composition of the electrolytic solution is different from that in the first embodiment. In this case, good battery characteristics are also allowed to be obtained.

(3-3. Lithium Metal Secondary Battery (Cylindrical Type, Prismatic Type, Laminate Film Type))

Moreover, the secondary battery according to the embodiment may be a lithium metal secondary battery instead of the above-described lithium-ion secondary battery. In this case, the secondary battery may a cylindrical type, a prismatic type, or a laminate film type secondary battery. The configuration of the lithium metal secondary battery is similar to that in the first embodiment, except that the configuration of the anode is different from that in the first embodiment. In this case, good battery characteristics are also allowed to be obtained.

(4. Secondary Battery (Fourth Embodiment)/4-1. Lithium-Ion Secondary Battery (Cylindrical Type))

Next, a secondary battery according to a fourth embodiment of the technology will be described below.

The secondary battery according to the embodiment has a configuration similar to that in the second embodiment, except that, for example, the composition of the electrolytic solution is different from that in the second embodiment. In other words, the secondary battery described here is a cylindrical type lithium-ion secondary battery.

The electrolytic solution includes one or more kinds of methylene cyclic carbonates represented by the following expressions (20) to (22). However, the electrolytic solution may include any other material such as a nonaqueous solvent and an electrolyte salt.

[Chemical Expression 34]

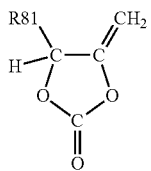
(20)

where R81 is a monovalent chain unsaturated hydrocarbon group, a monovalent chain halogenated unsaturated hydrocarbon group, a halogen group, or a monovalent chain halogenated saturated hydrocarbon group.

[Chemical Expression 35]

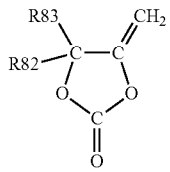
(21)

where R82 and R83 each are a hydrogen group, a halogen group, a monovalent hydrocarbon group, a monovalent halogenated hydrocarbon group, an oxygen-containing monovalent hydrocarbon group, or an oxygen-containing monovalent halogenated hydrocarbon group, and one or both of R82 and R83 may be a monovalent cyclic hydrocarbon group or a monovalent halogenated cyclic hydrocarbon group.

[Chemical Expression 36]

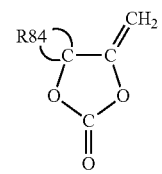
(22)

where R84 is a divalent hydrocarbon group or a divalent halogenated hydrocarbon group.

The electrolytic solution includes the methylene cyclic carbonate, because compared to the case where the methylene cyclic carbonate is not included, chemical stability of the electrolytic solution is improved. Therefore, a reduction in discharge capacity is less likely to occur, even if the secondary battery is repeatedly charged and discharged and the secondary battery is kept in a high-temperature environment.

More specifically, in the methylene cyclic carbonate represented by the expression (20), R81 is a hydrogen group, or a chain saturated hydrocarbon group such as a methyl group, chemical stability of the electrolytic solution is not sufficient; therefore, the electrolytic solution is easily decomposed during charge and discharge or during storage in a high-temperature environment. On the other hand, when R81 is the above-described monovalent chain unsaturated hydrocarbon group or the like, chemical stability of the electrolytic solution is secured. Therefore, the electrolytic solution is less likely to be decomposed during charge and discharge or during storage in a high-temperature environment.

Moreover, in the methylene cyclic carbonate represented by the expression (21), R82 and R83 both are monovalent chain hydrocarbon groups such as methyl groups, the electrolytic solution is easily decomposed during charge and discharge or during storage in a high-temperature environment due to a reason similar to that in the case of the expression (20). On the other hand, when one or both of R82 and R83 are the above-described monovalent cyclic hydrocarbon groups or the like, chemical stability of the electrolytic solution is secured; therefore, the electrolytic solution is less likely to be decomposed during charge and discharge or during storage in a high-temperature environment.

Further, in the cyclic carbonate represented by the expression (22), a ring structure including R84 as a part is formed; therefore, chemical stability of the electrolytic solution is improved, compared to the case where the ring structure is not formed. Thus, the electrolytic solution is less likely to be decomposed during charge and discharge or during storage in a high-temperature environment.

Details of the methylene cyclic carbonates represented by the expressions (20) to (22) are similar to the methylene cyclic carbonate in the first embodiment, except for points which will be described below.

The kind of R81 is not specifically limited, as long as R81 is a monovalent chain unsaturated hydrocarbon group, a monovalent chain halogenated unsaturated hydrocarbon group, a halogen group, or a monovalent chain halogenated saturated hydrocarbon group, because the methylene cyclic carbonate has a cyclic carbonate structure including a monovalent chain unsaturated hydrocarbon group or the like, thereby allowing the above-described advantages to be obtained without relying on the kind of R81.

The "monovalent chain unsaturated hydrocarbon group" is a chain hydrocarbon group including an unsaturated carbon bond such as a carbon-carbon double bond or a carbon-carbon triple bond at an end of a carbon chain or in the middle of the carbon chain. Moreover, the "monovalent chain halogenated unsaturated hydrocarbon group" is a group in which one or more of hydrogen groups in the abovedescribed monovalent chain unsaturated hydrocarbon group is substituted with a halogen group. However, the number of unsaturated carbon bonds may be one or two or more. Moreover, the monovalent chain halogenated unsaturated hydrocarbon group may have a straight-chain structure, or a branched structure having one or two or more side chains. Examples of the monovalent chain unsaturated hydrocarbon group include an alkenyl group having 2 to 12 carbon atoms, an alkynyl group having 2 to 12 carbon atoms, an aryl group having 6 to 18 carbon atoms, a group in which an aryl group having 6 to 18 carbon atoms and an alkylene group having 1 to 12 carbon atoms are bonded to each other, and a group in which a hydrogen group in the middle of an alkyl group having 1 to 12 carbon atoms is substituted with an aryl group having 6 to 18 carbon atoms. In addition, a group in which an alkyl group having 1 to 12 carbon atoms and an alkylene group having 1 to 12 carbon atoms are bonded to each other through an arylene group having 6 to 18 carbon atoms may be used. Moreover, examples of the monovalent chain halogenated unsaturated hydrocarbon group include a group in which one or more of hydrogen groups in the above-described alkyl group or the like is substituted with a halogen group. It is to be noted that details of the above-described alkyl group, the above-described alkenyl group, the above-described alkynyl group, the above-described aryl group, the above-described alkylene group, the above-described halogen group, and the like are similar to those in the first embodiment.

The kinds of R82 and R83 are not specifically limited, as long as R82 and R83 each are a hydrogen group, a halogen group, a monovalent hydrocarbon group, a monovalent halogenated hydrocarbon group, an oxygen-containing monovalent hydrocarbon group, or an oxygen-containing monovalent halogenated hydrocarbon group, as described above. However, as a condition, one or both of R82 and R83 are a monovalent cyclic hydrocarbon group or a monovalent halogenated cyclic hydrocarbon group, because the methylene cyclic carbonate has a cyclic carbonate structure including one or more monovalent cyclic carbonate groups, or the like, thereby allowing the above-described advantages to be obtained without relying on the kinds of R82 and R83.

The "monovalent cyclic hydrocarbon group" is a hydrocarbon group having a saturated ring structure or an unsaturated ring structure, and the "monovalent halogenated cyclic hydrocarbon group" is a group in which one or more of hydrogen groups in the above-described monovalent cyclic hydrocarbon group is substituted with a halogen group. Moreover, the "monovalent hydrocarbon group" includes both of the saturated hydrocarbon group and the unsaturated hydrocarbon group, and the same applies to the "monovalent halogenated hydrocarbon group". Examples of the monovalent cyclic hydrocarbon group include an aryl group having 6 to 18 carbon atoms, a group in which an aryl group having 6 to 18 carbon atoms and an alkylene group having 1 to 12 carbon atoms are bonded to each other, a cycloalkyl group having 6 to 18 carbon atoms, and a group in which a cycloalkyl group having 6 to 18 carbon atoms and an alkylene group having 1 to 12 carbon atoms are bonded to each other. In addition, a group in which an alkyl group having 1 to 12 carbon atoms and an alkylene group having 1 to 12 carbon atoms are bonded to each other through an arylene group or a cycloalkyl group having 6 to 18 carbon atoms may be used. Moreover, examples of the monovalent halogenated cyclic hydrocarbon group include a group in which one or more of hydrogen groups in the above-described aryl group or the like is substituted with a halogen group. It is to be noted that details of the above-described aryl group, the above-described cycloalkyl group, the above-described halogen group, and the like are similar to those in the first embodiment.

In the methylene cyclic carbonate represented by the expression (22), the kind of R84 is not specifically limited, as long as R84 is a divalent hydrocarbon group or a divalent halogenated hydrocarbon group, as described above, because the methylene cyclic carbonate has a cyclic carbonate structure including a ring structure formed by including R84 as a part together with a methylene group, thereby allowing the abovedescribed advantages to be obtained without relying on the kind of R84.

Examples of the divalent hydrocarbon group include an alkylene group having 2 to 12 carbon atoms, and specific examples thereof include a butylene group and a pentyl group. However, the alkylene group may have a straight-chain structure, or a branched structure having one or two or more side chains. Moreover, examples of the divalent halogenated hydrocarbon group include a group in which one or more of hydrogen groups in the above-described alkylene group or the like is substituted with a halogen group, because the above-described advantages are obtainable while securing solubility, compatibility, and the like of the methylene cyclic carbonate. It is to be noted that details of the above-described alkylene group, the above-described halogen group, and the like are similar to those in the first embodiment.

It is to be noted that R81 to R84 each may be any kind of group other than the above-described groups. Specific examples of R81 to R84 include derivatives of the above-described groups. The derivative is a group formed by introducing one or two or more substituent groups into any of the above-described groups, and the kind of the substituent group is arbitrarily selected.

Specific examples of the methylene cyclic carbonate represented by the expression (20) include the compounds represented by the expressions (1-4), (1-13), (1-18), (1-20), (1-22), (1-23), and (1-30) in the compounds represented by the expressions (1-1) to (1-31) in the first embodiment.

Specific examples of the methylene cyclic carbonate represented by the expression (21) include the compounds represented by the expressions (1-3), (1-5), (1-6), (1-10) to (1-12), (1-14), (1-16), (1-17), and (1-24).

Specific examples of the methylene cyclic carbonate represented by the expression (22) include the compounds represented by the expressions (1-28), (1-29), and (1-31).

The content of the methylene cyclic carbonate in the electrolytic solution is not specifically limited, but is preferably within a range of 0.01 wt % to 10 wt % both inclusive.

It is to be noted that details of the nonaqueous solvent and the electrolyte salt are similar to those in the first embodiment, and in particular, the electrolytic solution preferably includes the auxiliary compound described in the second embodiment, because a higher effect is obtainable. The kind and content of the auxiliary compound have been already described in detail above, and will not be further described. Moreover, for example, details of the operation and the manufacturing method of the secondary battery are similar to those in the second embodiment (cylindrical type), except that the composition of the electrolytic solution is different from that in the second embodiment.

In the cylindrical type secondary battery, as the electrolytic solution includes the methylene cyclic carbonate, chemical stability of the electrolytic solution is improved. Therefore, a reduction in discharge capacity is less likely to occur, even if the secondary battery is repeatedly charged and discharged and the secondary battery is kept in a high-temperature environment. Accordingly, good battery characteristics are allowed to be obtained.

In particular, when the content of the methylene cyclic carbonate in the electrolytic solution is within a range of 0.01 wt % to 10 wt % both inclusive, a higher effect is allowed to be obtained. Moreover, when the electrolytic solution includes the auxiliary compound with the methylene cyclic carbonate, a higher effect is allowed to be obtained.

(4-2. Lithium-Ion Secondary Battery (Prismatic Type, Laminate Film Type))

It is to be noted that the secondary battery according to the embodiment may be a prismatic type secondary battery, a laminate film type secondary battery, or the like, instead of the above-described cylindrical type secondary battery. The configuration of the prismatic type or laminate film type secondary battery is similar to that in the first embodiment, except that the composition of the electrolytic solution is different from that in the first embodiment. In this case, good battery characteristics are also allowed to be obtained.

(4-3. Lithium Metal Secondary Battery (Cylindrical Type, Prismatic Type, Laminate Film Type))

Moreover, the secondary battery according to the embodiment may be a lithium metal secondary battery, instead of the above-described lithium-ion secondary battery. In this case, the secondary battery may be a cylindrical type, a prismatic type, or a laminate film type secondary battery. The configuration of the lithium metal secondary battery is similar to that in the first embodiment, except that the configuration of the anode is different from that in the first embodiment. In this case, good battery characteristics are also allowed to be obtained.

(5. Secondary Battery(Fifth Embodiment)/5-1. Lithium-Ion Secondary Battery (Cylindrical Type))

Next, a secondary battery according to a fifth embodiment of the technology will be described below.

The secondary battery according to the embodiment has a configuration similar to that in the second embodiment, except that, for example, the composition of the electrolytic solution is different from that in the second embodiment. In other words, the secondary battery described here is a cylindrical type lithium-ion secondary battery.

The electrolytic solution includes a methylene cyclic carbonate represented by the following expression (23) and an unsaturated cyclic carbonate represented by the following expression (24). It is clear from the expression (24) that the unsaturated cyclic carbonate in the embodiment is a vinylene carbonate-based compound. However, the electrolytic solution may include any other material such as a nonaqueous solvent and an electrolyte salt.

[Chemical Expression 37]

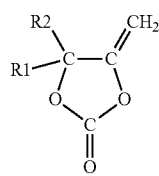

(23)

where R1 and R2 each are a hydrogen group, a halogen group, a monovalent hydrocarbon group, or a monovalent halogenated hydrocarbon group, and R1 and R2 may be bonded to each other.

[Chemical Expression 38]

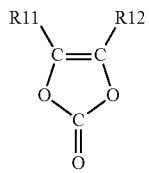

(24)

where R11 and R12 each are a hydrogen group or an alkyl group.

Details of the methylene cyclic carbonate represented by the expression (23) are similar to those of the methylene cyclic carbonate in the first embodiment, and will not be further described. Moreover, details of the unsaturated cyclic carbonate represented by the expression (24) are similar to those of the unsaturated cyclic carbonate (vinylene carbonate-based compound) in the first embodiment, and will not be further described.

However, the contents of the methylene cyclic carbonate and the unsaturated cyclic carbonate and a mixture thereof satisfy predetermined conditions. More specifically, it is assumed that the content of the unsaturated cyclic carbonate in the electrolytic solution is A (wt %) and the content of the methylene cyclic carbonate in the electrolytic solution is B (wt %). In this case, three conditions: that A be equal to 0.01 wt % to 5 wt % both inclusive; that B be equal to 0.01 wt % to 5 wt % both inclusive; and that B/A be equal to 0.002 to 500 both inclusive are concurrently satisfied. The kind of the unsaturated cyclic carbonate is not specifically limited, as long as the unsaturated cyclic carbonate has a chemical structure represented by the expression (24). Specific examples of the unsaturated cyclic carbonate is one kind or two or more kinds selected from the group consisting of vinylene carbonate (1,3-dioxol-2-one), methyl vinylene carbonate (4-methyl-1,3-dioxol-2-one), and the like.

The electrolytic solution includes both the methylene cyclic carbonate and the unsaturated cyclic carbonate, because chemical stability of the electrolytic solution is improved by a synergistic interaction between them. Therefore, a reduction in discharge capacity is less likely to occur, even if the secondary battery is repeatedly charged and discharged and the secondary battery is kept in a high-temperature environment. Moreover, it is because when the contents of the methylene cyclic carbonate and the unsaturated cyclic carbonate and the mixture ratio thereof satisfy the predetermined conditions, chemical stability of the electrolytic solution is further improved. Therefore, a reduction in discharge capacity is less likely to occur, even if the secondary battery is repeatedly charged and discharged under a load condition (for example, high current). Such a tendency is pronounced when the secondary battery is charged and discharged specifically in a severe temperature environment such as low temperature.

It is to be noted that details of the nonaqueous solvent and the electrolyte salt are similar to those in the first embodiment, and will not be further described.

For example, details of the operation and the manufacturing method of the secondary battery are similar to those in the second embodiment (cylindrical type), except that the composition of the electrolytic solution is different from that in the second embodiment.

In the cylindrical type secondary battery, the electrolytic solution includes both the methylene cyclic carbonate and the unsaturated cyclic carbonate, and the contents A and B and the ratio B/A satisfy the predetermined conditions. In this case, as described above, chemical stability of the electrolytic solution is remarkably improved; therefore, a reduction in discharge capacity is less likely to occur, even if the secondary battery is kept in a high-temperature environment or the secondary battery is charged and discharged under the load condition. Accordingly, good battery characteristics are allowed to be obtained.

(5-2. Lithium-ion Secondary Battery (Prismatic Type, Laminate Film Type))

It is to be noted that the secondary battery according to the embodiment may be a prismatic type secondary battery, a laminate film type secondary battery, or the like, instead of the above-described cylindrical type secondary battery. The configuration of the prismatic type or laminate film type secondary battery is similar to that in the first embodiment, except that the composition of the electrolytic solution is different from that in the first embodiment. In this case, good battery characteristics are also allowed to be obtained.

(5-3. Lithium Metal Secondary Battery (Cylindrical Type, Prismatic Type, Laminate Film Type))

Moreover, the secondary battery according to the embodiment may be a lithium metal secondary battery, instead of the above-described lithium-ion secondary battery. In this case, the secondary battery may be a cylindrical type, a prismatic type, or a laminate film type secondary battery. The configuration of the lithium metal secondary battery is similar to that in the first embodiment, except that the configuration of the anode is different from that in the first embodiment. In this case, good battery characteristics are also allowed to be obtained.

Conditions of the composition of the electrolytic solution in the embodiment (the contents A and B and the ratio B/A) may be applied to the above-described secondary batteries according to the first to fourth embodiments. In other words, in the case where, in the secondary batteries according to the first to fourth embodiments, the electrolytic solution includes the unsaturated cyclic carbonate, similar effects are allowed to be obtained when the contents A and B and the ratio B/A satisfy the above-described conditions.

(6. Appropriate Adjustment of Composition of Electrolytic Solution)

Next, appropriate adjustment of the composition of the electrolytic solution applied to the above-described secondary batteries according to the first to fifth embodiments of the technology will be described below.

It is preferable to appropriately adjust specific conditions of the composition of the electrolytic solution according to the kinds and combinations of components of the electrolytic solution, because a reduction in discharge capacity is suppressed, even if the secondary battery is repeatedly charged and discharged under a load condition (for example, high current). Such a tendency is pronounced when the secondary battery is charged and discharged specifically in a severe temperature environment such as low temperature.

Firstly, in the case where the electrolytic solution includes one or both of the halogenated carbonates (one or both of the halogenated cyclic carbonate and the halogenated chain carbonate) represented by the expressions (4) and (5), it is preferable to appropriately adjust the contents of the halogenated carbonate and the methylene cyclic carbonate and the ratio thereof. More specifically, it is assumed that the content of the halogenated carbonate in the electrolytic solution is C (wt %), and the content of the methylene cyclic carbonate in the electrolytic solution is D (wt %). In this case, it is preferable to concurrently satisfy three conditions: that C be equal to 0.01 wt % to 30 wt % both inclusive; that D be equal to 0.01 wt % to 5 wt % both inclusive; and that the ratio D/C be equal to 1/3000 to 500 both inclusive. The kind of the halogenated carbonate is not specifically limited, as long as the halogenated carbonate has a chemical structure represented by the expression (4) or (5). Specific examples of the halogenated carbonate is one kind or two or more kinds selected from the group consisting of 4-fluoro-1,3-dioxolane-2-one and the like.

Secondly, in the case where the electrolytic solution includes both ethylene carbonate (1,3-dioxolane-2-one) and propylene carbonate (4-methyl-1,3-dioxolane-2-one), it is preferable to appropriately adjust the mixture ratio of the ethylene carbonate and the propylene carbonate and the content of the methylene cyclic carbonate. More specifically, it is preferable to concurrently satisfy two conditions: that the mixture ratio of ethylene carbonate:propylene carbonate in weight ratio be within a range of 75:25 to 25:75 both inclusive; and that the content of the methylene cyclic carbonate in the electrolytic solution be within a range of 0.01 wt % to 10 wt % both inclusive.

(7. Applications of Secondary Batteries)

Next, application examples of any of the above-described secondary batteries will be described below.

The application of any of the secondary batteries is not specifically limited, as long as any of the secondary batteries is applied to machines, devices, appliances, units, systems (combinations of a plurality of devices), and the like which each are allowed to use any of the secondary batteries as a power supply for drive or a power storage source for power storage. In the case where any of the secondary batteries is used as a power supply, the power supply may be a main power supply (a power supply to be preferentially used) or an auxiliary power supply (a power supply to be used instead of the main power supply or by switching from the main power supply). The kind of the main power supply in the latter case is not limited to secondary batteries.

The secondary batteries are applied to, for example, the following applications. The applications include portable electronic units such as video cameras, digital still cameras, cellular phones, notebook personal computers, cordless telephones, headphone stereos, portable radios, portable televisions, and personal digital assistants. The electronic units are not limited to portable electronic units. The applications further include portable home appliances such as electric shavers, memory units such as backup power supplies and memory cards, electric power tools such as electric drills and electric saws, battery packs used as power supplies of notebook personal computers, medical electronic units such as pacemakers and hearing aids, electric vehicles such as electric cars (including hybrid vehicles), and energy storage system such as household battery systems storing power in case of emergency or the like. The secondary batteries may be applied to any applications other than the above-described applications.

In particular, the secondary batteries are effectively applied to the battery packs, the electric vehicles, the energy storage systems, the electric power tools, the electronic units, and the like, because they need good battery characteristics, and their characteristics are allowed to be effectively improved by using the secondary battery according to any of the embodiments of the technology. It is to be noted that the battery packs are power supplies using any of the secondary batteries, and are so-called assembled batteries or the like. The electric vehicles are vehicles operating (running) with use of any of the secondary batteries as a power supply for drive, and as described above, the electric vehicles may include vehicles (such as hybrid vehicles)

including a driving source in addition to the secondary battery. The energy storage systems are systems using any of the secondary batteries as a power storage source. For example, in a household energy storage system, power is stored in any of the secondary batteries as a power storage source, and the power is consumed when necessary, thereby allowing home appliances or the like to be used by the household energy storage system. The electric power tools are tools having a movable section (such as a drill) which is movable with use of any of the secondary batteries as a power supply for drive. The electronic units are unit fulfilling various functions with use of any of the secondary batteries as a power supply for drive.

Some application examples of the secondary batteries will be described in detail below. It is to be noted that the configurations of the application examples which will be described below are just examples, and may be modified, as necessary.

(7-1. Battery Pack)

Figure 7:
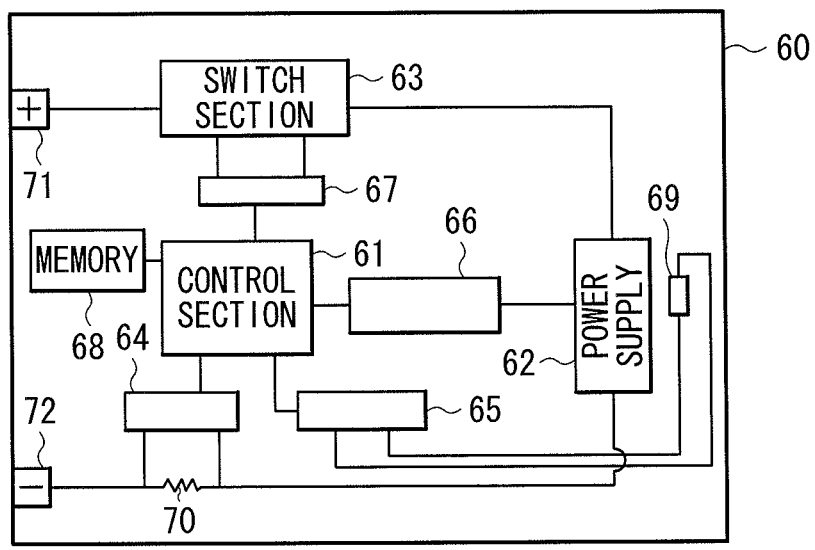
FIG. 7 is a block diagram illustrating a configuration of an application example (battery pack) of the secondary battery.

FIG. 7 illustrates a block configuration of a battery pack. As illustrated in FIG. 7, the battery pack includes a control section 61, a power supply 62, a switch section 63, a current measurement section 64, a temperature detection section 65, a voltage detection section 66, a switch control section 67, a memory 68, a temperature detection device 69, a current sensing resistor 70, a cathode terminal 71, an anode terminal 72 in an enclosure 60 made of a plastic material or the like.

The control section 61 controls operation of the entire battery pack (including a usage state of the power supply 62), and includes, for example, a central processing unit (CPU). The power supply 62 includes one or two or more secondary batteries (not illustrated). The power supply 62 is, for example, an assembled battery including two or more secondary batteries, and the secondary batteries may be connected to each other in series, in parallel, or in any series-parallel combination. As an example, the power supply 62 includes six secondary batteries connected in a configuration of two in parallel by three in series.

The switch section 63 switches the usage state of the power supply 62 (connection/disconnection between the power supply 62 and an external unit) according to an instruction from the control section 61. The switch section 63 includes, for example, a charge control switch, a discharge control switch, a diode for charge, and a diode for discharge (all not illustrated). The charge control switch and the discharge control switch are, for example, semiconductor switches such as metal oxide semiconductor field-effect transistors (MOSFETs) using a metal oxide semiconductor.

The current measurement section 64 measures a current with use of the current sensing resistor 70, and outputs a measurement result to the control section 61. The temperature detection section 65 measures a temperature with use of the temperature detection device 69, and outputs a measurement result to the control section 61. The temperature measurement result is used, for example, in the case where the control section 61 performs charge-discharge control during abnormal heat generation or in the case where the control section 61 performs a correction process during calculation of a capacity level. The voltage detection section 66 measures the voltage of the secondary battery in the power supply 62, and performs analog-digital (A/D) conversion on a measured voltage to supply the voltage to the control section 61.

The switch control section 67 controls the operation of the switch section 63 based on signals supplied from the current measurement section 64 and the voltage detection section 66.

For example, when a battery voltage reaches an overcharge detection voltage, the switch control section 67 turns off the switch section 63 (the charge control switch), thereby controlling a charge current not to flow through a current path of the power supply 62. Thus, in the power supply 62, only discharge through the diode for discharge is allowed to be executed. It is to be noted that, for example, when a large current flows during charge, the switch control section 67 blocks a charge current.

Moreover, for example, when the battery voltage reaches an overdischarge detection voltage, the switch control section 67 turns off the switch section 63 (the discharge control switch), thereby controlling a discharge current not to flow through the current path of the power supply 62. Thus, in the power supply 62, only charge through the diode for charge is allowed to be executed. It is to be noted that, for example, when a large current flows during discharge, the switch control section 67 blocks a discharge current.

It is to be noted that, in the secondary battery, for example, the overcharge detection voltage is $4.20\ \text{V}\pm0.05\ \text{V}$, and the overdischarge detection voltage is $2.4\ \text{V}\pm0.1\ \text{V}$.

The memory 68 is, for example, an EEPROM which is a non-volatile memory, or the like. In the memory 68, for example, values computed by the control section 61, and information (for example, initial internal resistance) of the secondary battery measured in a manufacturing process are stored. It is to be noted that, when the value of full-charge capacity of the secondary battery is stored in the memory 68, the control section 61 is allowed to keep track of information such as the capacity level.

The temperature detection device 69 measures the temperature of the power supply 62, and outputs a measurement result to the control section 61, and is, for example, a thermistor.

The cathode terminal 71 and the anode terminal 72 are terminals connected to an external unit (such as a notebook personal computer) operating by the battery pack or an external unit (such as a charger) used to charge the battery pack. The power supply 62 is charged and discharged through the cathode terminal 71 and the anode terminal 72.

(7-2. Electric Vehicle)

Figure 8:
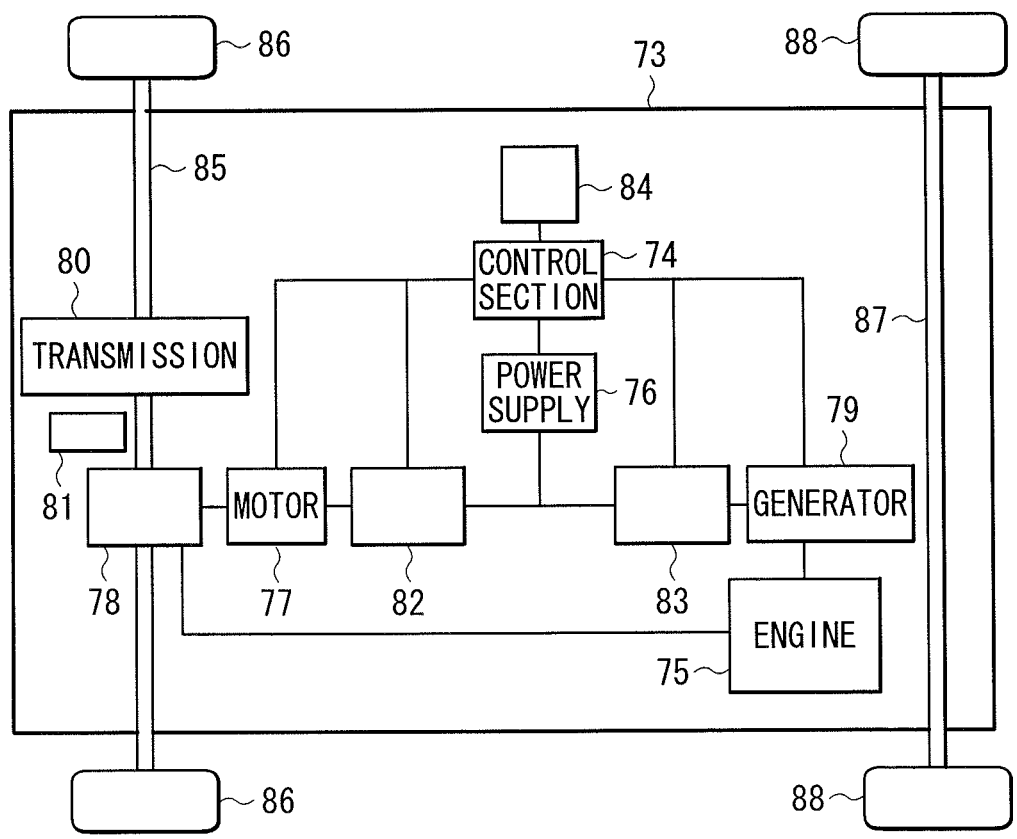
FIG. 8 is a block diagram illustrating a configuration of an application example (electric vehicle) of the secondary battery.

FIG. 8 illustrates a block configuration of a hybrid vehicle as an example of the electric vehicle. For example, as illustrated in FIG. 8, the electric vehicle includes a control section 74, an engine 75, a power supply 76, a drive motor 77, a differential gear 78, a generator 79, a transmission 80 and a clutch 81, inverters 82 and 83, and various sensors 84 in a body 73 made of metal. The electric vehicle further includes, for example, a front-wheel axle 85 and front wheels 86 which are connected to the differential gear 78 and the transmission 80, and a rear-wheel axle 87 and rear wheels 88.

The electric vehicle is capable of running with use of one of the engine 75 and the motor 77 as a driving source. The engine 75 is a main power source, and is, for example, a gasoline engine or the like. When the engine 75 is used as a power source, for example, the driving force (torque) of the engine 75 is transmitted to the front wheels 86 or the rear wheels 88 through drive sections, i.e., the differential gear 78, the transmission 80, and the clutch 81. It is to be noted that the torque of the engine 75 is also transmitted to the generator 79, thereby allowing the generator 79 to generate AC power by the torque, and the AC power is converted into DC power by the inverter 83 to be stored in the power supply 76. On the other hand, in the case where the motor 77 as a conversion section is used as a power source, power (DC power) supplied from the power supply 76 is converted into AC power by the inverter 82, and the motor 77 is driven by the AC power. For example, the driving force (torque) into which the power is converted by the motor 77 is transmitted to the front wheels 86 or the rear wheels 88 through the drive sections, i.e., the differential gear 78, the transmission, and the clutch 81.

It is to be noted that when the electric vehicle is slowed down by a control mechanism (not illustrated), resistance while slowing the electric vehicle down may be transmitted to the motor 77 as a torque, thereby allowing the motor 77 to generate AC power by the torque. The AC power is preferably converted into DC power by the inverter 82, thereby storing DC regenerative power in the power supply 76.

The control section 74 controls operation of the entire electric vehicle, and includes, for example, a CPU. The power supply 76 includes one or two or more secondary batteries (not illustrated). The power supply 76 may be connected to an external power supply to receive power from the external power supply; therefore, the power supply 76 is allowed to store power. The various sensors 84 are used to control the RPM of the engine 75 or opening of a throttle valve (throttle opening). The various sensors 84 include, for example, a speed sensor, an acceleration sensor, and an engine RPM sensor.

It is to be noted that the hybrid vehicle is described above as the electric vehicle; however, the electric vehicle may be a vehicle (electric car) driven only by the power supply 76 and the motor 77 without using the engine 75.

(7-3. Energy Storage System)

Figure 9:
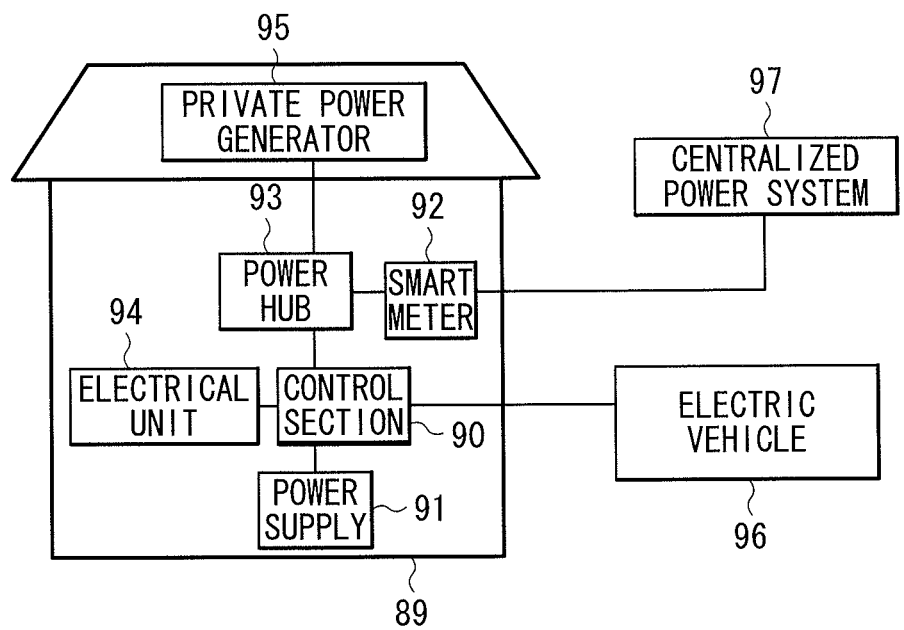
FIG. 9 is a block diagram illustrating a configuration of an application example (energy storage system) of the secondary battery.

FIG. 9 illustrates a block configuration of an energy storage system. For example, as illustrated in FIG. 9, the energy storage system includes a control section 90, a power supply 91, a smart meter 92, and a power hub 93 in a house 89 such as a general house or a commercial building.

In this case, for example, the power supply 91 is connected to an electrical unit 94 placed in the house 89, and is connectable to an electric vehicle 96 placed outside the house 89. Moreover, for example, the power supply 91 is connected to a private electric generator 95 mounted on the house 89 through the power hub 93, and is connectable to an external centralized power system 97 through the smart meter 92 and the power hub 93.

It is to be noted that examples of the electrical unit 94 include one or two or more household electrical appliances such as a refrigerator, an air conditioner, a television, and a boiler. Examples of the private electric generator 95 include one kind or two or more kinds of solar power systems or wind power generators. Examples of the electric vehicle 96 include one kind or two or more kinds of electric vehicles, electric motorbikes, and hybrid vehicles. Examples of the centralized power system 97 include one kind or two or more kinds of thermal power plants, nuclear power plants, hydroelectric power plants, and wind power plants.

The control section 90 controls operation of the entire energy storage system including a usage state of the power supply 91, and includes, for example, a CPU. The power supply 91 includes one or two or more secondary batteries (not illustrated). The smart meter 92 is a network-compatible wattmeter mounted in the house 89 demanding power, and is allowed to communicate with a power supplier. Accordingly, for example, the smart meter 92 is allowed to control balance between demand and supply in the house 89 while communicating with an external unit as necessary, thereby securing efficient and stable energy supply.

In the energy storage system, for example, power from the centralized power system 97 as the external power supply is stored in the power supply 91 through the smart meter 92 and the power hub 93, and power from the private electric generator 95 is stored in the power supply 91 through the power hub 93. The power stored in the power supply 91 is supplied to the electrical unit 94 or the electric vehicle 96 as necessary according to an instruction from the control section 91; therefore, the electrical unit 93 is allowed to operate, and the electric vehicle 96 is allowed to be charged. In other words, the energy storage system is a system capable of storing and supplying power in the house with use of the power supply 91.

The power stored in the power supply 91 is arbitrarily usable. Therefore, for example, the power from the centralized power system 97 is allowed to be stored in the power supply 91 at midnight at which a power rate is low, and the power stored in the power supply 91 is allowed to be used in the daytime in which the power rate is high.

It is to be noted that the above-described energy storage system may be mounted per house (per household), or per a plurality of houses (a plurality of households).

(7-4. Electric Power Tool)

Figure 10:
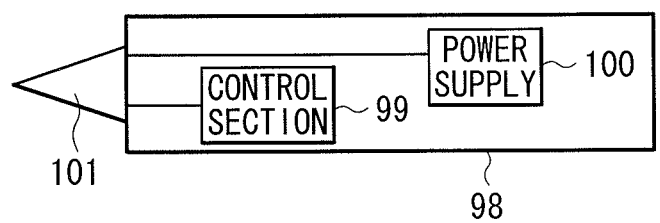
FIG. 10 is a block diagram illustrating a configuration of an application example (electric power tool) of the secondary battery.

FIG. 10 illustrates a block configuration of an electric power tool. For example, as illustrated in FIG. 10, the electric power tool is an electric drill, and includes a control section 99 and a power supply 100 in a tool body 98 formed of a plastic material. A drill section 101 as a movable section is operably (rotatably) attached to the tool body 98.

The control section 99 controls operation of the entire electric power tool (including a usage state of the power supply 100), and includes, for example, a CPU. The power supply 100 includes one or two or more secondary batteries (not illustrated). The control section 99 allows the power supply 100 to supply power to the drill section 101 as necessary according to an operation of an operation switch (not illustrated), thereby bringing the drill section 101 into operation.

EXAMPLES

Examples of the technology will be described in detail below.

(1) Examples of First Embodiment

First, various characteristics of the secondary battery according to the first embodiment were determined.

Experimental Example 1-1 to 1-33

The prismatic type secondary batteries illustrated in FIGS. 1 and 2 were formed by the following steps.

First, the cathode 21 was formed. Lithium carbonate ($Li_2CO_3$) and cobalt carbonate ($CoCO_3$) were mixed at a mole ratio of 0.5:1 to form a mixture, and then the mixture was fired in air at 900° C. for 5 hours to obtain lithium cobalt complex oxide ($LiCoO_2$). Next, 91 parts by mass of the cathode active material (lithium cobalt complex oxide: $LiCoO_2$), 6 parts by mass of the cathode conductor (graphite) and 3 parts by mass of the cathode binder (polyvinylidene fluoride: PVDF) were mixed to form a cathode mixture. Next, the cathode mixture was dispersed in the organic solvent (N-methyl-2-pyrrolidone: NMP) to form paste-form cathode mixture slurry. Then, the cathode mixture slurry was applied to both surfaces of the strip-like cathode current collector 21A (aluminum foil with a thickness of 20 μm) by a coating unit, and the cathode mixture slurry was dried to form the cathode active material layer 21B. Next, the cathode active material layer 21B was compression molded by a roller press.

Next, the anode 22 was formed. First, 90 parts by mass of the anode active material (artificial graphite) and 10 parts by mass of the anode binder (PVDF) were mixed to form an anode mixture. Next, the anode mixture was dispersed in the organic solvent (NMP) to form paste-form anode mixture slurry. Then, the anode mixture slurry was applied to both surfaces of the strip-like anode current collector 22A (electrolytic copper foil with a thickness of 15 μm) by a coating unit, and the anode mixture slurry was dried to form the anode active material layer 22B. Next, the anode active material layer 22B was compression molded by a roller press.

Next, the electrolyte salt was dissolved in the nonaqueous solvent, and then the methylene cyclic carbonate represented by the expression (1) was added to the nonaqueous solvent to have one of compositions illustrated in Tables 1 to 3 as necessary, thereby preparing the electrolytic solution. In this case, a mixture of ethylene carbonate (EC) and ethyl methyl carbonate (EMC) was used as the nonaqueous solvent, and the mixture ratio (weight ratio) of them was EC:EMC=50: 50. As the electrolyte salt, lithium hexafluorophosphate (LiPF$_6$) was used, and the content of the electrolyte salt was 1 mol/kg relative to the solvent. As the nonaqueous solvent, in addition to EC and EMC, propylene carbonate (PC), diethyl carbonate (DEC) or dimethyl carbonate (DMC) was used instead of EMC. Moreover, 4-fluoro-1,3-dioxolane-2-one (FEC) was also used.

Next, the secondary battery was assembled with use of the cathode 21, the anode 22, and the electrolytic solution. The cathode 21 and the anode 22 were laminated with the separator 23 (a microporous polypropylene film with a thickness of 25 μm) in between, and were spirally wound to form a spirally wound body, and then the spirally wound body was molded into a flat shape to form the battery device 20. Next, the battery device 20 was contained in the battery can 11 made of iron, and then the insulating plate 12 was put on the battery device 20. Next, the cathode lead 24 made of aluminum was welded to an end of the cathode current collector 21A, and the anode lead 25 made of nickel was welded to the anode current collector 22A. In this case, the battery cover 13 was fixed to an open end of the battery can 11 by a laser welding method. Finally, the electrolytic solution was injected into the battery can 11 from the injection hole 19 to impregnate the separator 23 with the electrolytic solution, and then the injection hole 19 was sealed with the sealing member 19A. Thus, the prismatic type secondary battery was completed. When the secondary battery was formed, the thickness of the cathode active material layer 21B was adjusted to prevent lithium metal from being deposited on the anode 22 in a fully-charged state.

It is to be noted that, instead of the prismatic type secondary battery, the cylindrical lithium-ion secondary batteries illustrated in FIGS. 5 and 6 were also formed for comparison of battery configurations.

In this case, the spirally wound electrode body 40 was formed by steps similar to those of forming the above-described battery device 20, except that the spirally wound electrode body 40 was not molded in a flat shape, and then the cathode lead 45 was welded to the cathode current collector 41A, and the anode lead 46 was welded to the anode current collector 42A. Moreover, the center pin 44 was inserted into the center of the spirally wound electrode body 40. Next, the spirally wound electrode body 40 sandwiched between the pair of insulating plates 32 and 33 was contained in the battery can 31 made of nickel-plated iron. In this case, an end of the cathode lead 45 and an end of the anode lead 46 were welded to the safety valve mechanism 35 and the battery can 31, respectively. Next, the electrolytic solution was injected into the battery can 31 by a decompression method to impregnate the separator 43 with the electrolytic solution. Finally, the battery cover 34, the safety valve mechanism 35, and the PTC device 36 were caulked in an open end of the battery can 31 by the gasket 37. Thus, the cylindrical type secondary battery was completed. Even in this secondary battery, the thickness of the cathode active material layer 41B was adjusted to prevent lithium metal from being deposited on the anode 42 in a fully-charged state.

When initial charge-discharge characteristics and swelling characteristics of these secondary batteries were determined, results illustrated in Tables 1 to 3 were obtained.

To determine the initial charge-discharge characteristics, one cycle of charge and discharge was performed on each of the secondary batteries in a room temperature environment (at 23° C.) to stabilize its battery state, and then each of the secondary batteries was charged again to determine its charge capacity. Next, each of the secondary batteries was discharged to determine its discharge capacity. Initial efficiency (%)=(discharge capacity/charge capacity) 100 was determined from these results by calculation. As the conditions of charge, each of the secondary batteries was charged at a constant current of 0.2 C and a constant voltage until the voltage reached an upper-limit voltage of 4.2 V, and then each of the secondary batteries was charged at a constant voltage until the current reached 0.05 C. As the conditions of discharge, each of the secondary batteries was discharged at a constant current of 0.2 C until the voltage reached a cutoff voltage of 2.5 V. It is to be noted that "0.2 C" and "0.05 C" represent a current value at which the capacity (theoretical capacity) of a battery is fully discharged for 5 hours and 20 hours, respectively.

To determine initial swelling characteristics, the thickness of each of the secondary batteries was measured in a room-temperature environment (at 23° C.). Next, one cycle of charge and discharge was performed in the same environment to stabilize its battery state, and then each of the secondary batteries were charged again, and the thickness of each of the charged secondary batteries was measured. Initial swelling (mm)=thickness after charge and discharge–thickness before charge and discharge was determined from these results by calculation. The conditions of charge and discharge were similar to those in the case where the initial charge-discharge characteristics were determined.

To determine swelling characteristics during storage, one cycle of charge and discharge was performed on each of the secondary batteries in a room temperature environment (at 23° C.) to stabilize its battery state, and then each of the secondary batteries was charged again, and the thickness of each of the charged secondary batteries were measured. Next, each of the charged secondary batteries was stored for 12 hours in a constant temperature bath (at 85° C.), and then the thickness of each of the charged secondary batteries was measured. Swelling during storage (mm)=thickness after storage–thickness before storage was determined from these results by calculation. The conditions of charge and discharge were similar to those in the case where the initial charge-discharge characteristics were determined.

TABLE 1

| Experimental Example | Battery Configuration | Electrolyte Salt | Nonaqueous Solvent | Methylene Cyclic Carbonate Kind | Content (wt %) | Initial Efficiency (%) | Initial Swelling (mm) | Swelling during Storage (mm) |
|---|---|---|---|---|---|---|---|---|
| 1-1 | Prismatic | LiPF6 | EC + EMC | Expression (1-1) | 0.01 | 88.8 | 0.72 | 1.02 |
| 1-2 | Type | | | | 0.1 | 89.8 | 0.52 | 0.85 |
| 1-3 | | | | | 0.2 | 90.9 | 0.44 | 0.72 |
| 1-4 | | | | | 1 | 90.9 | 0.38 | 0.51 |
| 1-5 | | | | | 2 | 91.5 | 0.25 | 0.51 |
| 1-6 | | | | | 5 | 91.5 | 0.25 | 0.65 |
| 1-7 | | | | | 10 | 9.15 | 0.25 | 1.2 |
| 1-8 | | | EC + PC | Expression (1-1) | 2 | 91.5 | 0.22 | 0.55 |
| 1-9 | | | EC + DEC | | | 91.5 | 0.25 | 0.4 |
| 1-10 | | | EC + DMC | | | 91.5 | 0.25 | 0.81 |
| 1-11 | | | EC + EMC | Expression (1-2) | 2 | 91.5 | 0.28 | 0.52 |
| 1-12 | | | | Expression (1-4) | | 91.5 | 0.25 | 0.55 |
| 1-13 | | | | Expression (1-5) | | 91.5 | 0.3 | 0.56 |
| 1-14 | | | | Expression (1-28) | | 91.5 | 0.28 | 0.58 |
| 1-15 | | | EC − EMC + FEC | Expression (1-28) | 2 | 91.7 | 0.25 | 0.41 |

TABLE 2

| Experimental Example | Battery Configuration | Electrolyte Salt | Nonaqueous Solvent | Methylene Cyclic Carbonate Kind | Content (wt %) | Initial Efficiency (%) | Initial Swelling (mm) | Swelling during Storage (mm) |
|---|---|---|---|---|---|---|---|---|
| 1-16 | Prismatic | LiPF6 | EC + EMC | Expression (1-31) | 0.01 | 89.5 | 0.65 | 1.1 |
| 1-17 | Type | | | | 0.1 | 90.2 | 0.47 | 0.92 |
| 1-18 | | | | | 0.2 | 91.5 | 0.38 | 0.8 |
| 1-19 | | | | | 1 | 91.7 | 0.3 | 0.62 |
| 1-20 | | | | | 2 | 92.5 | 0.22 | 0.62 |
| 1-21 | | | | | 5 | 92.5 | 0.22 | 0.74 |
| 1-22 | | | | | 10 | 92.5 | 0.22 | 1.35 |
| 1-23 | | | EC + PC | Expression (1-31) | 2 | 92.5 | 0.2 | 0.58 |
| 1-24 | | | EC + DEC | | | 92.5 | 0.22 | 0.5 |
| 1-25 | | | EC + DMC | | | 92.5 | 0.22 | 0.91 |
| 1-26 | | | EC + EMC + FEC | | | 0.22 | 0.22 | 0.52 |

TABLE 3

| Experimental Example | Battery Configuration | Electrolyte Salt | Nonaqueous Solvent | Methylene Cyclic Carbonate Kind | Content (wt %) | Initial Efficiency (%) | Initial Swelling (mm) | Swelling during Storage (mm) |
|---|---|---|---|---|---|---|---|---|
| 1-27 | Prismatic | LiPF6 | EC + EMC | — | — | 88.1 | 1.22 | 1.52 |
| 1-28 | Type | | EC + PC | | | 21.0 | 9.25 | unmeasurable |
| 1-29 | | | EC − DEC | | | 89.8 | 0.99 | 1.02 |
| 1-30 | | | EC − DMC | | | 88.2 | 1.53 | 2.51 |
| 1-31 | | | EC − EMC + FEC | | | 90.2 | 0.63 | 1.01 |
| 1-32 | Cylindrical | LiPF6 | EC + EMC | — | — | 91.3 | 0 | 0 |
| 1-33 | Type | | | Expression (1-1) | 2 | 91.3 | 0 | 0 |

In the prismatic type secondary batteries, when the electrolytic solution included the methylene cyclic carbonate, high initial efficiency was obtained, and initial swelling and swelling during storage were kept low.

More specifically, there was no difference in the initial efficiency, the initial swelling, and swelling during storage between the cylindrical type secondary batteries (Experimental Examples 1-32 and 1-33) irrespective of whether the electrolytic solution included the methylene cyclic carbonate. On the other hand, in the prismatic type secondary batteries (Experimental Examples 1-1 to 1-31), in the case where the electrolytic solution included the methylene cyclic carbonate, compared to the case where the electrolytic solution did not include the methylene cyclic carbonate, the initial efficiency was increased, and the initial swelling and swelling during storage were reduced. In this case, in particular, when the content of the methylene cyclic carbonate in the electrolytic solution was within a range of 0.01 wt % to 10 wt % both inclusive, more specifically within a range of 0.1 wt % to 5 wt % both inclusive, better results were obtained.

(2) Examples of Second Embodiment

Next, various characteristics of the secondary battery according to the second embodiment were determined.

Experimental Examples 2-1 to 2-36

The prismatic type lithium-ion secondary batteries were formed by steps similar to those in the examples of the first embodiment, except that the composition of the electrolytic solution was different from that in the examples of the first embodiment. The electrolytic solution was prepared by dissolving the electrolyte salt ($LiPF_6$) in the nonaqueous solvent (EC and DMC), and then adding the methylene cyclic carbonate represented by the expression (11) and the auxiliary compound to the nonaqueous solvent as necessary, thereby allowing the electrolytic solution to have one of compositions illustrated in Tables 4 to 6. In this case, as the composition of the nonaqueous solvent, the weight ratio was EC:DMC=50:50, and the content of the electrolyte salt was 1 mol/kg relative to the nonaqueous solvent.

When cycle characteristics and storage characteristics of these secondary batteries were determined, results illustrated in Tables 4 to 6 were obtained.

To determine the cycle characteristics, one cycle of charge and discharge was performed on each of the secondary batteries in a room-temperature environment (at 23° C.) to stabilize its battery state, and then another cycle of charge and discharge was performed on each of the secondary batteries in a high-temperature environment (at 60° C.) to determine the discharge capacity of each of the secondary batteries. Next, the cycle of charge and discharge in the same environment was repeated until the total cycle number reached 100 cycles to determine the discharge capacity of each of the secondary batteries. A cycle retention ratio (%)=(discharge capacity in the 100th cycle/discharge capacity in the second cycle)×100 was determined from these results by calculation. The conditions of charge and discharge were similar to those in the examples of the first embodiment.

To determine the storage characteristics, one cycle of charge and discharge was performed, in a room temperature environment (at 23° C.), on each of the secondary batteries of which the battery states were stabilized by steps similar to those in the case where the cycle characteristics were determined to determine the discharge capacity of each of the secondary batteries. Next, each of the secondary batteries was charged again, and each of the charged secondary batteries was stored for 10 days in a constant temperature bath (at 80° C.), and then each of the secondary batteries was discharged in a room-temperature environment (at 23° C.) to determine its discharge capacity. A storage retention ratio (%)=(discharge capacity after storage/discharge capacity before storage)×100 was determined from these results by calculation. The conditions of charge and discharge were similar to those in the examples of the first embodiment.

TABLE 4

| Experimental Example | Electrolyte Salt | Nonaqueous Solvent | Methylene Cyclic Carbonate Kind | Content (wt %) | Auxiliary Compound Kind | Content (wt %) | Cycle Retention Ratio (%) | Storage Retention Ratio (%) |
|---|---|---|---|---|---|---|---|---|
| 2-1 | LiPF6 | EC + DMC | Expression (1-1) | 2 | LiPF2O2 | 0.001 | 81 | 88 |
| 2-2 | | | | | | 0.1 | 83 | 89 |
| | | | | | | 0.2 | 86 | 0.290 |
| 2-4 | | | | | | 1 | 83 | 88 |
| 2-5 | | | | | | 2 | 81 | 88 |
| 2-6 | | | Expression (1-1) | 0.01 | LiPF2O2 | 0.2 | 80 | 86 |
| 2-7 | | | | 0.5 | | | 82 | 87 |
| 2-8 | | | | 1 | | | 86 | 88 |
| 2-9 | | | | 5 | | | 86 | 90 |
| 2-10 | | | | 10 | | | 82 | 88 |
| 2-11 | | | Expression (1-1) | 2 | Expression (12-45) | 0.2 | 84 | 89 |
| 2-12 | | | | | Expression (13-1) | 0.2 | 86 | 90 |
| 2-13 | | | | | Expression (14-1) | 0.2 | 83 | 88 |
| 2-14 | | | | | Li2PFO3 | 0.2 | 85 | 90 |

TABLE 5

| Experimental Example | Electrolyte Salt | Nonaqueous Solvent | Methylene Cyclic Carbonate Kind | Content (wt %) | Auxiliary Compound Kind | Content (wt %) | Cycle Retention Ratio (%) | Storage Retention Ratio (%) |
|---|---|---|---|---|---|---|---|---|
| 2-15 | LiPF6 | EC + DMC | Expression (1-31) | 2 | LiPF2O2 | 0.001 | 83 | 90 |
| 2-16 | | | | | | 0.1 | 85 | 91 |
| 2-17 | | | | | | 0.2 | 88 | 92 |
| 2-18 | | | | | | 1 | 86 | 90 |
| 2-19 | | | | | | 2 | 84 | 90 |
| 2-20 | | | Expression (1-31) | 0.01 | LiPF2O2 | 0.2 | 82 | 88 |
| 2-21 | | | | 0.5 | | | 84 | 90 |
| 2-22 | | | | 1 | | | 88 | 92 |
| 2-23 | | | | 5 | | | 88 | 90 |

TABLE 5-continued

| Experimental Example | Electrolyte Salt | Nonaqueous Solvent | Methylene Cyclic Carbonate Kind | Content (wt %) | Auxiliary Compound Kind | Content (wt %) | Cycle Retention Ratio (%) | Storage Retention Ratio (%) |
|---|---|---|---|---|---|---|---|---|
| 2-24 | | | | 10 | | | 84 | 89 |
| 2-25 | | | Expression (1-31) | 2 | Expression (12-45) | 0.2 | 88 | 91 |
| 2-26 | | | | | Expression (13-1) | 0.2 | 90 | 92 |
| 2-27 | | | | | Expression (14-1) | 0.2 | 87 | 90 |
| 2-28 | | | | | Li2PFO3 | 0.2 | 86 | 92 |

TABLE 6

| Experimental Example | Electrolyte Salt | Nonaqueous Solvent | Methylene Cyclic Carbonate Kind | Content (wt %) | Auxiliary Compound Kind | Content (wt %) | Cycle Retention Ratio (%) | Storage Retention Ratio (%) |
|---|---|---|---|---|---|---|---|---|
| 2-29 | LiPF6 | EC + DMC | — | — | — | — | 75 | 81 |
| 2-30 | | | Expression (1-1) | 2 | — | — | 77 | 80 |
| 2-31 | | | Expression (1-31) | 2 | — | — | 76 | 80 |
| 2-32 | | | — | — | Expression (12-45) | 0.2 | 77 | 82 |
| 2-33 | | | | | Expression (13-1) | 0.2 | 76 | 82 |
| 2-34 | | | | | Expression (14-1) | 0.2 | 78 | 81 |
| 2-35 | | | | | Li2PFO3 | 0.2 | 77 | 82 |
| 2-36 | | | | | LiPF2O2 | 0.2 | 78 | 82 |

When the electrolytic solution included the methylene cyclic carbonate and the auxiliary compound, a high cycle retention ratio and a high storage retention ratio were obtained.

More specifically, with reference to the case where the methylene cyclic carbonate and the auxiliary compound were not used (Experimental Example 2-29), in the case where only the methylene cyclic carbonate was used (Experimental Examples 2-30 and 2-31), the storage retention ratio was slightly increased, but the cycle retention ratio was reduced, and in the case where only the auxiliary compound was used (Experimental Examples 2-32 to 2-36), the cycle retention ratio and the storage retention ratio were only slightly increased. On the other hand, in the case where the methylene cyclic carbonate and the auxiliary compound were used (Experimental Example 2-1 to 2-28), the cycle retention ratio and the storage retention ratio were both increased, and in particular, the storage retention ratio was remarkably increased. This result indicates that when the electrolytic solution includes the methylene cyclic carbonate and the auxiliary compound, decomposition reaction of the electrolytic solution is specifically suppressed even in a high-temperature environment.

In particular, in the case where the methylene cyclic carbonate and the auxiliary compound were used, when the content of the methylene cyclic carbonate in the electrolytic solution was within a range of 0.01 wt % to 10 wt % both inclusive, more specifically within a range of 0.5 wt % to 5 wt % both inclusive, better results were obtained. Likewise, when the content of the auxiliary compound in the electrolytic solution was within a range of 0.001 wt % to 2 wt % both inclusive, more specifically within a range of 0.1 wt % to 1 wt % both inclusive, better results were obtained.

Experimental Examples 3-1 to 3-18

Secondary batteries were formed by steps similar to those in Experimental Example 2-3, except that the composition of the nonaqueous solvent was changed as illustrated in Table 7, and various characteristics of the secondary batteries were determined. As the composition of the nonaqueous solvent, the weight ratio was EC:PC:DMC=10:20:70. The content of vinylene carbonate (VC) in the nonaqueous solvent was 2 wt %, and the content of FEC, trans-4,5-difluoro-1,3-dioxolane-2-one (t-DFEC), or bis(fluoromethyl)carbonate (DFDMC) in the nonaqueous solvent was 5 wt %.

TABLE 7

| Experimental Example | Electrolyte Salt | Nonaqueous Solvent | Methylene Cyclic Carbonate Kind | Methylene Cyclic Carbonate Content (wt %) | Auxiliary Compound Kind | Auxiliary Compound Content (wt %) | Cycle Retention Ratio (%) | Storage Retention Ratio (%) |
|---|---|---|---|---|---|---|---|---|
| 3-1 | LiPF | EC + DEC | Expression (1-1) | 2 | LiPF2O2 | 0.2 | 81 | 90 |
| 3-2 |  | EC + EMC |  |  |  |  | 82 | 90 |
| 3-3 |  | EC + PC + DMC |  |  |  |  | 86 | 90 |
| 3-4 |  | EC + DMC | VC |  |  |  | 90 | 92 |
| 3-5 |  |  | FEC |  |  |  | 90 | 90 |
| 3-6 |  |  | t-DFEC |  |  |  | 89 | 90 |
| 3-7 |  |  | DFDMC |  |  |  | 89 | 88 |
| 3-8 | LiPF6 | EC + DEC | Expression (1-31) | 2 | LiPF2O2 | 0.2 | 89 | 92 |
| 3-9 |  | EC + EMC |  |  |  |  | 89 | 92 |
| 3-10 |  | EC + PC + DMC |  |  |  |  | 89 | 92 |
| 3-11 |  | EC + DMC | VC |  |  |  | 92 | 94 |
| 3-12 |  |  | FEC |  |  |  | 94 | 94 |
| 3-13 |  |  | t-DFEC |  |  |  | 92 | 93 |
| 3-14 |  |  | DFDMC |  |  |  | 92 | 93 |
| 3-15 | LiPF6 | EC + DMC | VC | — | — | — | 80 | 83 |
| 3-16 |  |  | FEC |  |  |  | 79 | 84 |
| 3-17 |  |  | t-DFEC |  |  |  | 79 | 84 |
| 3-18 |  |  | DFDMC |  |  |  | 78 | 82 |

Even though the composition of the nonaqueous solvent was changed, a high cycle retention ratio and a high storage retention ratio were obtained. In particular, when the electrolytic solution included an unsaturated cyclic carbonate, a halogenated cyclic carbonate, or a halogenated chain carbonate, the cycle retention ratio and the storage retention ratio were increased.

Experimental Examples 4-1 to 4-3

Secondary batteries were formed by steps similar to those in Experimental Example 2-3, except that the composition of the electrolyte salt was changed as illustrated in Table 8, and various characteristics of the secondary batteries were determined. As the electrolyte salt, lithium tetrafluoroborate (LiBF4), (4,4,4-trifluorobutyrate oxalato) lithium borate (LiTFOB) represented by the expression (7-8), or lithium bis(trifluoromethane-sulfonyl)imide (LiN(CF$_3$SO$_2$)$_2$: LiTFSI) was used. In this case, the content of LiPF$_6$ was 0.9 mol/kg relative to the nonaqueous solvent, and the content of LiBF$_4$ or the like was 0.1 mol/kg relative to the nonaqueous solvent.

TABLE 8

| Experimental Example | Electrolyte Salt | Nonaqueous Solvent | Methylene Cyclic Carbonate Kind | Methylene Cyclic Carbonate Content (wt %) | Auxiliary Compound Kind | Auxiliary Compound Content (wt %) | Cycle Retention Ratio (%) | Storage Retention Ratio (%) |
|---|---|---|---|---|---|---|---|---|
| 4-1 | LiPF6 | LiBF4 | EC + DMC | Expression (1-1) | 2 | LiPF2O2 | 0.2 | 85 | 92 |
| 4-2 |  | LiTFOB |  |  |  |  |  | 86 | 93 |
| 4-3 |  | LiTFSI |  |  |  |  |  | 88 | 92 |

Even though the composition of the electrolyte salt was changed, a high cycle retention ratio and a high storage retention ratio were obtained. In particular, when the electrolytic solution included other electrolyte salt such as LiBF$_4$, the cycle retention ratio and the storage retention ratio were further increased.

(3) Examples of Third Embodiment

Next, various characteristics of the secondary battery according to the third embodiment were determined.

Experimental Examples 5-1 to 5-36

Prismatic type lithium-ion secondary batteries were formed by steps similar to those in the examples of the first embodiment, except that the composition of the electrolytic solution was different from that in the examples of the first embodiment. The electrolytic solution was prepared by dissolving the electrolyte salt (LiPF$_6$) in the nonaqueous solvent (EC and DMC), and then adding the methylene cyclic carbonate represented by the expression (17) and a halogenated carbonate or the like as necessary, thereby allowing the electrolytic solution to have one of compositions illustrated in Tables 9 to 11. As the composition of the nonaqueous solvent, the weight ratio was EC:DMC=50:50, and the content of the electrolyte salt was 1 mol/kg relative to the nonaqueous solvent, and the content of VC in the electrolytic solution was 1 wt %.

When cycle characteristics and storage characteristics of the secondary batteries were determined by steps similar to those in the examples of the second embodiment, results illustrated in Tables 9 to 11 were obtained.

TABLE 9

| Experimental Example | Electrolyte Salt | Nonaqueous Solvent | Methylene Cyclic Carbonate Kind | Methylene Cyclic Carbonate Content (wt %) | Halogenated Carbonate Kind | Halogenated Carbonate Content (wt %) | Cycle Retention Ratio (%) | Storage Retention Ratio (%) |
|---|---|---|---|---|---|---|---|---|
| 5-1 | LiPF6 | EC + DMC | Expression (1-1) | 0.01 | FEC | 5 | 80 | 85 |
| 5-2 | | | | 0.1 | | | 82 | 87 |
| 5-3 | | | | 0.5 | | | 85 | 88 |
| 5-4 | | | | 1 | | | 85 | 89 |
| 5-5 | | | | 2 | | | 86 | 90 |
| 5-6 | | | | 5 | | | 86 | 90 |
| 5-7 | | | | 10 | | | 85 | 89 |
| 5-8 | | | Expression (1-1) | 2 | FEC | 0.1 | 79 | 82 |
| 5-9 | | | | | | 0.5 | 80 | 84 |
| 5-10 | | | | | | 1 | 81 | 86 |
| 5-11 | | | | | | 10 | 90 | 90 |
| 5-12 | | | | | | 20 | 90 | 89 |
| 5-13 | LiPF6 | EC + DMC | Expression (1-1) | 2 | t-DFEC | 5 | 84 | 88 |
| 5-14 | | | | | DFDMC | | 85 | 89 |
| 5-15 | | EC + DMC VC | Expression (1-1) | 2 | FEC | 5 | 92 | 94 |

TABLE 10

| Experimental Example | Electrolyte Salt | Solvent | Methylene Cyclic Carbonate Kind | Methylene Cyclic Carbonate Content (wt %) | Halogenated Carbonate Kind | Halogenated Carbonate Content (wt %) | Cycle Retention Ratio (%) | Storage Retention Ratio (%) |
|---|---|---|---|---|---|---|---|---|
| 5-16 | LiPF6 | EC + DMC | Expression (1-31) | 0.01 | FEC | 5 | 82 | 88 |
| 5-17 | | | | 0.1 | | | 84 | 90 |
| 5-18 | | | | 0.5 | | | 86 | 92 |
| 5-19 | | | | 1 | | | 86 | 92 |
| 5-20 | | | | 2 | | | 87 | 93 |
| 5-21 | | | | 5 | | | 87 | 93 |
| 5-22 | | | | 10 | | | 86 | 90 |
| 5-23 | | | Expression (1-31) | 2 | FEC | 0.1 | 81 | 84 |
| 5-24 | | | | | | 0.5 | 83 | 87 |
| 5-25 | | | | | | 1 | 85 | 90 |
| 5-26 | | | | | | 10 | 92 | 92 |
| 5-27 | | | | | | 20 | 92 | 90 |
| 5-28 | LiPF6 | EC + DMC | Expression (1-31) | 2 | t-DFEC | 5 | 86 | 90 |
| 5-29 | 5-2 | | | | DFDMC | | 86 | 90 |
| 5-30 | | EC + DMC VC | Expression (1-31) | 2 | FEC | 5 | 90 | 90 |

TABLE 11

| Experimental Example | Electrolyte Salt | Nonaqueous Solvent | Methylene Cyclic Carbonate Kind | Methylene Cyclic Carbonate Content (wt %) | Halogenated Carbonate Kind | Halogenated Carbonate Content (wt %) | Cycle Retention Ratio (%) | Storage Retention Ratio (%) |
|---|---|---|---|---|---|---|---|---|
| 5-31 | LiPF6 | EC + DMC | — | — | — | — | 75 | 81 |
| 5-32 | | | Expression (1-1) | 2 | — | — | 77 | 80 |
| 5-33 | | | — | — | FEC | 5 | 79 | 84 |
| 5-34 | | | | | t-DFEC | | 79 | 84 |
| 5-35 | | | | | DFDMC | | 78 | 82 |
| 5-36 | | EC + DMC VC | — | — | — | — | 80 | 83 |

When the electrolytic solution included the methylene cyclic carbonate and the halogenated carbonate, a high cycle retention ratio and a high storage retention ratio were obtained.

More specifically, with reference to the case where the methylene cyclic carbonate and the halogenated carbonate were not included (Experimental Example 5-31), in the case where only the methylene cyclic carbonate was used (Experimental Example 5-32), the cycle retention ratio was slightly increased, but the storage retention ratio was reduced, and in the case where only the halogenated carbonate was used (Experimental Examples 5-33 to 5-35), the cycle retention ratio and the storage retention ratio were only slightly increased. On the other hand, in the case where the methylene cyclic carbonate and the halogenated carbonate were used (Experimental Examples 5-1 to 5-30), the cycle retention ratio and the storage retention ratio were remarkably increased. The increased amount far exceeded an increased amount expected from results obtained in the case where only one of methylene cyclic carbonate and halogenated carbonate was used. In other words, this result indicates that when the electrolytic solution includes the methylene cyclic carbonate and the halogenated carbonate, decomposition reaction of the electrolytic solution is specifically suppressed even in a high-temperature environment by a synergistic interaction between the methylene cyclic carbonate and the halogenated carbonate.

In particular, in the case where the methylene cyclic carbonate and the halogenated carbonate were used, when the content of the methylene cyclic carbonate in the electrolytic solution was within a range of 0.01 wt % to 10 wt % both inclusive, more specifically within a range of 0.1 wt % to 5 wt % both inclusive, better results were obtained. Likewise, when the content of the halogenated carbonate in the electrolytic solution was within a range of 0.1 wt % to 20 wt % both inclusive, more specifically within a range of 5 wt % to 20 wt % both inclusive, better results were obtained. Moreover, when the electrolytic solution included the unsaturated cyclic carbonate, the cycle retention ratio and the storage retention ratio were further increased.

(4) Examples of Fourth Embodiment

Next, various characteristics of the secondary battery according to the fourth embodiment were determined.

Experimental Examples 6-1 to 6-21

Prismatic lithium-ion secondary batteries were formed by steps similar to those in the examples of the first embodiment, except that the composition of the electrolytic solution was different from that in the examples of the first embodiment. The electrolytic solution was prepared by dissolving the electrolyte salt ($LiPF_6$) in the nonaqueous solvent (EC and DMC), and then adding one of the methylene cyclic carbonates represented by the expressions (20) to (22) and the auxiliary compound as necessary, thereby allowing the electrolytic solution to have one of compositions illustrated in Table 12. As the composition of the nonaqueous solvent, the weight ratio was EC:DMC=50:50, and the content of the electrolyte salt was 1 mol/kg relative to the nonaqueous solvent.

When initial charge-discharge characteristics of the secondary batteries were determined by steps similar to those in the examples of the first embodiment, and cycle characteristics and storage characteristics of the secondary batteries were determined by steps similar to those in the examples of the second embodiment, results illustrated in Table 12 were obtained.

TABLE 12

| Experimental Example | Electrolyte Salt | Nonaqueous Solvent | Methylene Cyclic Carbonate Kind | Content (wt %) | Auxiliary Compound Kind | Content (wt %) | Initial Efficiency (%) | Cycle Retention Ratio (%) | Storage Retention Ratio (%) |
|---|---|---|---|---|---|---|---|---|---|
| 6-1 | LiPF6 | EC + DMC | Expression (1-4) | 0.01 | — | — | 91.5 | 77 | 84 |
| 6-2 | | | | 0.1 | | | 91.7 | 78 | 85 |
| 6-3 | | | | 0.5 | | | 91.8 | 78 | 86 |
| 6-4 | | | | 1 | | | 92.0 | 80 | 87 |
| 6-5 | | | | 2 | | | 92.2 | 82 | 87 |
| 6-6 | | | | 5 | | | 92.2 | 82 | 86 |
| 6-7 | | | | 10 | | | 92.0 | 80 | 84 |
| 6-8 | | | Expression (1-5) | 2 | | | 92.0 | 81 | 85 |
| 6-9 | | | Expression (1-10) | | | | 92.0 | 80 | 85 |
| 6-10 | | | Expression (1-12) | | | | 91.8 | 81 | 84 |
| 6-11 | | | Expression (1-13) | | | | 92.0 | 81 | 85 |
| 6-12 | | | Expression (1-28) | | | | 91.9 | 81 | 84 |
| 6-13 | | | Expression (1-29) | | | | 91.8 | 81 | 84 |
| 6-14 | | | Expression (1-4) | 2 | Expression (12-45) | 0.2 | — | 86 | 90 |
| 6-15 | | | | | Expression (13-1) | 0.2 | — | 88 | 92 |
| 6-16 | | | | | Expression (14-1) | 0.2 | — | 84 | 91 |
| 6-17 | | | | | Li2PFO3 | 0.2 | — | 86 | 91 |
| 6-18 | | | | | LiPF2O2 | 0.2 | — | 87 | 92 |
| 6-19 | LiPF6 | EC + DMC | — | — | — | — | 91.3 | 75 | 81 |
| 6-20 | | | Expression (1-1) | 2 | | | 91.3 | 77 | 80 |
| 6-21 | | | Expression (1-7) | 2 | | | 91.3 | 77 | 80 |

When the electrolytic solution included the methylene cyclic carbonate with a specific structure, a high cycle retention ratio and a high storage retention ratio were obtained.

More specifically, with reference to the case where the methylene cyclic carbonate was not used (Experimental Example 6-19), in the case where the methylene cyclic carbonate did not satisfy conditions represented by the expressions (20) to (22) (Experimental Examples 6-20 and 6-21), the cycle retention ratio was slightly increased, but the storage retention ratio was reduced. On the other hand, in the case where the methylene cyclic carbonate satisfied the conditions represented by the expressions (20) to (22) (Experimental Examples 6-1 to 6-18), compared to the above described reference case, the cycle retention ratio and the storage retention ratio were both increased. This result indicates that when the electrolytic solution includes the methylene cyclic carbonate with a specific structure, decomposition reaction of the electrolytic solution is specifically suppressed even in a high-temperature environment.

In particular, in the case where the methylene cyclic carbonate was used, the content of the methylene cyclic carbonate in the electrolytic solution was within a range of 0.01 wt % to 10 wt % both inclusive, better results were obtained. Moreover, when the electrolytic solution included the auxiliary compound, the cycle retention ratio and the storage retention ratio were further increased.

(5) Examples of Fifth Embodiment

Next, various characteristics of the secondary battery according to the fifth embodiment were determined.

Experimental Examples 7-1 to 7-25, 8-1 to 8-25

Secondary batteries were formed by steps similar to those in Experimental Examples 1-1 to 1-7, except that the composition of the electrolytic solution was changed as illustrated in Tables 13 and 14, and various characteristics of the secondary batteries were determined. In this case, the content A (wt %) of the unsaturated cyclic carbonate (the vinylene carbonate-based compound), the content B (wt %) of the methylene cyclic carbonate, the ratio B/A were changed. As the unsaturated cyclic carbonate, methyl vinylene carbonate (MVC) and VC were used.

In this case, in addition to the cycle characteristics and the storage characteristics, load characteristics were determined. To determine the load characteristics, one cycle of charge and discharge was performed, in a room temperature environment (at 23° C.), on each of the secondary batteries of which the battery state is stabilized by steps similar to those in the case where the cycle characteristics were determined to determine the discharge capacity of each of the secondary batteries. Next, the cycle of charge and discharge in a low-temperature environment (−10° C.) was repeated until the total cycle number reached 100 cycles to determine the discharge capacity of each of the secondary batteries. A load retention ratio (%)=(discharge capacity in the 100th cycle/discharge capacity in the second cycle)×100 was determined from these results by calculation. The conditions of charge were similar to those in the case where the cycle characteristics were determined. As the conditions of discharge, each of the secondary batteries was discharged at a constant current of 1 C until the voltage reached a cutoff voltage of 2.5 V. It is to be noted that "1 C" represents a current value at which the capacity (theoretical capacity) of a battery is fully discharged for 1 hour.

TABLE 13

| Experimental Example | Unsaturated Cyclic Carbonate Kind | Content A (wt %) | Methylene Cyclic Carbonate Kind | Content B (wt %) | Ratio B/A | Cycle Retention Ratio (%) | Storage Retention Ratio (%) | Load Retention Ratio (%) |
|---|---|---|---|---|---|---|---|---|
| 7-1 | MVC | 10 | Expression (1-1) | 0.01 | 0.001 | 80 | 84 | 30 |
| 7-2 | | 5 | | | 0.002 | 85 | 85 | 52 |
| 7-3 | | 1 | | | 0.01 | 82 | 87 | 58 |
| 7-4 | | 0.01 | | | 1 | 80 | 82 | 55 |
| 7-5 | | 0.001 | | | 10 | 77 | 81 | 42 |
| 7-6 | MVC | 10 | Expression (1-1) | 0.1 | 0.01 | 82 | 84 | 30 |
| 7-7 | | 5 | | | 0.02 | 85 | 85 | 54 |
| 7-8 | | 1 | | | 0.1 | 84 | 87 | 65 |
| 7-9 | | 0.01 | | | 10 | 83 | 84 | 60 |
| 7-10 | | 0.001 | | | 100 | 78 | 82 | 45 |
| 7-11 | MVC | 10 | Expression (1-1) | 3 | 0.3 | 84 | 85 | 30 |
| 7-12 | | 5 | | | 0.6 | 85 | 86 | 60 |
| 7-13 | | 1 | | | 3 | 88 | 90 | 67 |
| 7-14 | | 0.01 | | | 300 | 85 | 89 | 66 |
| 7-15 | | 0.001 | | | 3000 | 82 | 88 | 40 |
| 7-16 | MVC | 10 | Expression (1-1) | 5 | 0.5 | 83 | 83 | 20 |
| 7-17 | | 5 | | | 1 | 85 | 84 | 50 |
| 7-18 | | 1 | | | 5 | 86 | 86 | 55 |
| 7-19 | | 0.01 | | | 500 | 84 | 85 | 48 |
| 7-20 | | 0.001 | | | 5000 | 80 | 83 | 38 |
| 7-21 | MVC | 10 | Expression (1-1) | 10 | 1 | 80 | 82 | 15 |
| 7-22 | | 5 | | | 2 | 82 | 82 | 23 |
| 7-23 | | 1 | | | 10 | 84 | 84 | 25 |
| 7-24 | | 0.01 | | | 1000 | 82 | 82 | 20 |
| 7-25 | | 0.001 | | | 10000 | 78 | 82 | 10 |

TABLE 14

| Example | Unsaturated Cyclic Carbonate Kind | Content A (wt %) | Methylene Cyclic Carbonate Kind | Content B (wt %) | Ratio B/A | Cycle Retention Ratio (%) | Storage Retention Ratio (%) | Load Retention Ratio (%) |
|---|---|---|---|---|---|---|---|---|
| 8-1 | VC | 10 | Expression (1-1) | 0.01 | 0.001 | 82 | 85 | 30 |
| 8-2 | | 5 | | | 0.002 | 84 | 85 | 50 |
| 8-3 | | 1 | | | 0.01 | 82 | 87 | 55 |
| 8-4 | | 0.01 | | | 1 | 78 | 82 | 33 |

TABLE 14-continued

| Example | Unsaturated Cyclic Carbonate Kind | Content A (wt %) | Methylene Cyclic Carbonate Kind | Content B (wt %) | Ratio B/A | Cycle Retention Ratio (%) | Storage Retention Ratio (%) | Load Retention Ratio (%) |
|---|---|---|---|---|---|---|---|---|
| 8-5  |    | 0.001 |                 |     | 10     | 77 | 81 | 40 |
| 8-6  | VC | 10    | Expression (1-1) | 0.1 | 0.01   | 82 | 85 | 30 |
| 8-7  |    | 5     |                 |     | 0.02   | 85 | 85 | 52 |
| 8-8  |    | 1     |                 |     | 0.1    | 84 | 88 | 60 |
| 8-9  |    | 0.01  |                 |     | 10     | 80 | 84 | 55 |
| 8-10 |    | 0.001 |                 |     | 100    | 78 | 82 | 40 |
| 8-11 | VC | 10    | Expression (1-1) | 3   | 0.3    | 84 | 85 | 30 |
| 8-12 |    | 5     |                 |     | 0.6    | 86 | 86 | 55 |
| 8-13 |    | 1     |                 |     | 3      | 88 | 90 | 65 |
| 8-14 |    | 0.01  |                 |     | 300    | 84 | 89 | 65 |
| 8-15 |    | 0.001 |                 |     | 3000   | 82 | 88 | 40 |
| 8-16 | VC | 10    | Expression (1-1) | 5   | 0.5    | 83 | 83 | 20 |
| 8-17 |    | 5     |                 |     | 1      | 85 | 84 | 45 |
| 8-18 |    | 1     |                 |     | 5      | 86 | 86 | 50 |
| 8-19 |    | 0.01  |                 |     | 500    | 82 | 85 | 48 |
| 8-20 |    | 0.001 |                 |     | 5000   | 80 | 83 | 38 |
| 8-21 | VC | 10    | Expression (1-1) | 10  | 1      | 80 | 82 | 15 |
| 8-22 |    | 5     |                 |     | 2      | 82 | 82 | 23 |
| 8-23 |    | 1     |                 |     | 10     | 84 | 84 | 25 |
| 8-24 |    | 0.01  |                 |     | 1000   | 78 | 82 | 20 |
| 8-25 |    | 0.001 |                 |     | 10000  | 78 | 82 | 10 |

Even though the ratio B/A was changed, a high cycle retention ratio and a high storage retention ratio were obtained when the electrolytic solution included the methylene cyclic carbonate. In particular, when three conditions: that A be equal to 0.01 wt % to 5 wt % both inclusive; that B be equal to 0.01 wt % to 5 wt % both inclusive; and that the ratio B/A be equal to 0.002 to 500 both inclusive were concurrently satisfied, a high load retention ratio was obtained.

It is to be noted that, even in the case where the electrolytic solution includes the unsaturated cyclic carbonate in the secondary batteries according to the first to fourth embodiments, when the contents A and B and the ratio B/A are appropriately adjusted in a similar manner as that in the fifth embodiment, similar results as those in Tables 13 and 14 are supposed to be obtained.

When the composition of the nonaqueous solvent in the secondary battery according to the first embodiment as a representative of the above-described secondary batteries according to the first to fifth embodiments was appropriately adjusted, the following results were obtained.

Experimental Examples 9-1 to 9-30

Secondary batteries were formed by steps similar to those in Experimental Examples 1-1 to 1-7, except that the composition of the electrolytic solution was changed as illustrated in Tables 15 and 16, and various characteristics of the secondary batteries were determined. In this case, the content C (wt %) of the halogenated carbonate, the content D (wt %) of the methylene cyclic carbonate, and the ratio D/C were changed. As the halogenated carbonate, FEC was used.

TABLE 15

| Experimental Example | Halogenated Carbonate Kind | Content C (wt %) | Methylene Cyclic Carbonate Kind | Content D (wt %) | Ratio D/C | Cycle Retention Ratio (%) | Storage Retention Ratio (%) | Load Retention Ratio (%) |
|---|---|---|---|---|---|---|---|---|
| 9-1  | FEC | 40    | Expression (1-1) | 0.01  | 0.00025 | 90 | 81 | 30 |
| 9-2  |     | 30    |                 |       | 1/3000  | 90 | 82 | 45 |
| 9-3  |     | 5     |                 |       | 0.002   | 80 | 85 | 55 |
| 9-4  |     | 1     |                 |       | 0.01    | 79 | 85 | 55 |
| 9-5  |     | 0.01  |                 |       | 1       | 78 | 82 | 44 |
| 9-6  |     | 0.001 |                 |       | 10      | 77 | 81 | 40 |
| 9-7  | FEC | 40    | Expression (1-1) | 0.1   | 0.0025  | 92 | 81 | 30 |
| 9-8  |     | 30    |                 |       | 1/300   | 91 | 83 | 48 |
| 9-9  |     | 5     |                 |       | 0.02    | 82 | 87 | 58 |
| 9-10 |     | 1     |                 |       | 0.1     | 80 | 86 | 58 |
| 9-11 |     | 0.01  |                 |       | 10      | 79 | 82 | 46 |
| 9-12 |     | 0.001 |                 |       | 100     | 78 | 81 | 40 |
| 9-13 | FEC | 40    | Expression (1-1) | 3     | 0.075   | 92 | 82 | 30 |
| 9-14 |     | 30    |                 |       | 0.1     | 92 | 85 | 50 |
| 9-15 |     | 5     |                 |       | 0.6     | 86 | 90 | 60 |
| 9-16 |     | 1     |                 |       | 3       | 81 | 86 | 60 |
| 9-17 |     | 0.01  |                 |       | 300     | 79 | 83 | 48 |
| 9-18 |     | 0.001 |                 |       | 3000    | 78 | 82 | 40 |

TABLE 16

| Experimental Example | Halogenated Carbonate Kind | Halogenated Carbonate Content C (wt %) | Methylene Cyclic Carbonate Kind | Methylene Cyclic Carbonate Content D (wt %) | Ratio D/C | Cycle Retention Ratio (%) | Storage Retention Ratio (%) | Load Retention Ratio (%) |
|---|---|---|---|---|---|---|---|---|
| 9-19 | FEC | 40 | Expression (1-1) | 5 | 0.125 | 90 | 82 | 20 |
| 9-20 | | 30 | | | 1/6 | 89 | 84 | 42 |
| 9-21 | | 5 | | | 1 | 86 | 90 | 50 |
| 9-22 | | 1 | | | 5 | 80 | 85 | 50 |
| 9-23 | | 0.01 | | | 500 | 79 | 82 | 44 |
| 9-24 | | 0.001 | | | 5000 | 78 | 82 | 40 |
| 9-25 | FEC | 40 | Expression (1-1) | 10 | 0.25 | 88 | 82 | 15 |
| 9-26 | | 30 | | | 1/3 | 88 | 84 | 20 |
| 9-27 | | 5 | | | 2 | 85 | 89 | 32 |
| 9-28 | | 1 | | | 10 | 80 | 84 | 32 |
| 9-29 | | 0.01 | | | 1000 | 78 | 82 | 24 |
| 9-30 | | 0.001 | | | 10000 | 78 | 82 | 10 |

Even though the ratio D/C was changed, a high cycle retention ratio and a high storage retention ratio were obtained when the electrolytic solution included the methylene cyclic carbonate. In particular, when three conditions: that C be equal to 0.01 wt % to 30 wt % both inclusive; that D be equal to 0.01 wt % to 5 wt % both inclusive; and that the ratio D/C be equal to 1/3000 to 500 both inclusive were concurrently satisfied, a high load retention ratio was obtained.

Experimental Examples 10-1 to 10-42

Secondary batteries were formed by steps similar to those in Experimental Examples 1-1 to 1-7, except that the mixture ratio of cyclic carbonates EC and PC was changed as illustrated in Tables 17 and 18, and various characteristics of the secondary batteries were determined. It is to be noted that "unmeasurable" in the tables indicates that the discharge capacity and the thickness were not measured due to breakage of the secondary battery or the like.

TABLE 17

| Experimental Example | Cyclic Carbonate Kind | Cyclic Carbonate Mixture Ratio (Weight Ratio) | Methylene Cyclic Carbonate Kind | Methylene Cyclic Carbonate Content (wt %) | Initial Efficiency (%) | Initial Swelling mm (%) | Swelling during Storage (mm) | Load Retention Ratio (%) |
|---|---|---|---|---|---|---|---|---|
| 10-1 | EC:PC | 90:10 | Expression (1-1) | 0.01 | 89.5 | 0.55 | 0.52 | 30 |
| 10-2 | | 75:25 | | | 89 | 0.6 | 0.43 | 45 |
| 10-3 | | 50:50 | | | 88.4 | 0.85 | 0.4 | 50 |
| 10-4 | | 40:60 | | | 88 | 0.98 | 0.33 | 53 |
| 10-5 | | 25:75 | | | 86 | 1.2 | 0.2 | 40 |
| 10-6 | | 0:100 | | | 82 | 2.82 | 0.18 | 20 |
| 10-7 | EC:PC | 90:10 | Expression (1-1) | 0.1 | 91 | 0.25 | 0.52 | 32 |
| 10-8 | | 75:25 | | | 90.5 | 0.3 | 0.45 | 48 |
| 10-9 | | 50:50 | | | 90.2 | 0.35 | 0.42 | 53 |
| 10-10 | | 40:60 | | | 90 | 0.46 | 0.36 | 58 |
| 10-11 | | 25:75 | | | 89.5 | 0.5 | 0.22 | 50 |
| 10-12 | | 0:100 | | | 86 | 1.22 | 0.18 | 30 |
| 10-13 | EC:PC | 90:10 | Expression (1-1) | 1 | 91.7 | 0.2 | 0.62 | 30 |
| 10-14 | | 75:25 | | | 91.5 | 0.22 | 0.55 | 50 |
| 10-15 | | 50:50 | | | 91.3 | 0.22 | 0.5 | 64 |
| 10-16 | | 40:60 | | | 91.3 | 0.22 | 0.4 | 62 |
| 10-17 | | 25:75 | | | 91.3 | 0.22 | 0.17 | 45 |
| 10-18 | | 0:100 | | | 89.3 | 0.52 | 0.15 | 32 |
| 10-19 | EC:PC | 90:10 | Expression (1-1) | 3 | 92 | 0.2 | 0.65 | 28 |
| 10-20 | | 75:25 | | | 91.7 | 0.22 | 0.6 | 45 |
| 10-21 | | 50:50 | | | 91.5 | 0.22 | 0.55 | 55 |
| 10-22 | | 40:60 | | | 91.5 | 0.22 | 0.45 | 52 |
| 10-23 | | 25:75 | | | 91.5 | 0.22 | 0.2 | 43 |
| 10-24 | | 0:100 | | | 91 | 0.24 | 0.18 | 25 |

TABLE 18

| Experimental Example | Cyclic Carbonate Kind | Cyclic Carbonate Mixture Ratio (Weight Ratio) | Methylene Cyclic Carbonate Kind | Methylene Cyclic Carbonate Content (wt %) | Initial Efficiency (%) | Initial Swelling (mm) | Swelling During Storage (mm) | Load Retention Ratio (%) |
|---|---|---|---|---|---|---|---|---|
| 10-25 | EC:PC | 90:10 | Expression (1-1) | 5 | 92 | 0.2 | 0.75 | 30 |
| 10-26 | | 75:25 | | | 92 | 0.2 | 0.7 | 42 |
| 10-27 | | 50:50 | | | 92 | 0.2 | 0.62 | 50 |
| 10-28 | | 40:60 | | | 92 | 0.2 | 0.5 | 48 |
| 10-29 | | 25:75 | | | 92 | 0.2 | 0.44 | 45 |
| 10-30 | | 0:100 | | | 92 | 0.2 | 0.36 | 20 |
| 10-31 | EC:PC | 90:10 | Expression (1-1) | 10 | 92 | 0.2 | 0.95 | 15 |
| 10-32 | | 75:25 | | | 92 | 0.2 | 0.88 | 30 |
| 10-33 | | 50:50 | | | 92 | 0.2 | 0.72 | 45 |
| 10-34 | | 40:60 | | | 92 | 0.2 | 0.62 | 40 |
| 10-35 | | 25:75 | | | 92 | 0.2 | 0.55 | 38 |
| 10-36 | | 0:100 | | | 92 | 0.2 | 0.5 | 20 |
| 10-37 | EC:PC | 90:10 | — | — | 42.3 | 6.72 | unmeasurable | 25 |
| 10-38 | | 75:25 | | | 30.5 | 7.52 | unmeasurable | 30 |
| 10-39 | | 50:50 | | | 21 | 9.25 | unmeasurable | 35 |
| 10-40 | | 40:60 | | | unmeasurable | unmeasurable | unmeasurable | unmeasurable |
| 10-41 | | 25:75 | | | unmeasurable | unmeasurable | unmeasurable | unmeasurable |
| 10-42 | | 0:100 | | | unmeasurable | unmeasurable | unmeasurable | unmeasurable |

Even though the mixture ratio of EC and PC was changed, high initial efficiency was obtained, and initial swelling and swelling during storage were kept low when the electrolytic solution included the methylene cyclic carbonate. In particular, when two conditions: that the mixture ratio EC:PC be equal to 75:25 to 25:75 both inclusive; and that the content of the methylene cyclic carbonate be equal to 0.01 wt % to 10 wt % both inclusive were concurrently satisfied, a high load retention ratio was obtained.

It is to be noted that, even in the case where the electrolytic solution includes the halogenated carbonate in the secondary batteries according to the second to fifth embodiments, when the contents C and D and the ratio D/C are appropriately adjusted in the above-described manner, similar results as those in Tables 15 and 16 are supposed to be obtained. Moreover, even in the case where the electrolytic solution includes both of EC and PC in the secondary batteries according to the second to fifth embodiments, when the mixture ratio of EC and PC and the content of the methylene cyclic carbonate are appropriately adjusted in the above-described manner, similar results as those in Tables 17 and 18 are supposed to be obtained.

The following are found out from the results in Tables 1 to 18. In this technology, firstly, in the secondary battery using a package member with a flat external surface, when the electrolytic solution includes the methylene cyclic carbonate represented by the expression (1), initial charge-discharge characteristics and swelling characteristics are improved, thereby obtaining good battery characteristics. Secondly, when the electrolytic solution includes the methylene cyclic carbonate represented by the expression (11) and the auxiliary compound, the cycle characteristics and the storage characteristics are improved, thereby obtaining good battery characteristics. Thirdly, when the electrolytic solution includes the methylene cyclic carbonate represented by the expression (17) and the halogenated carbonate, cycle characteristics and storage characteristics are improved, thereby obtaining good battery characteristics. Fourthly, when the electrolytic solution includes the methylene cyclic carbonates represented by the expressions (20) to (22), initial charge-discharge characteristics, cycle characteristics and storage characteristics are improved, thereby obtaining good battery characteristics. Moreover, the above-described results are obtainable without relying on the composition of the nonaqueous solvent, the composition of the electrolytic salt, or the like.

Although the present application is described referring to the embodiments and the examples, the technology is not limited thereto, and may be variously modified. For example, as the kind of secondary battery, the lithium-ion secondary battery and the lithium metal secondary battery are described; however, the technology is not limited thereto. The technology is also applicable to a secondary battery in which the capacity of an anode includes a capacity by insertion and extraction of lithium ions and a capacity associated with deposition and dissolution of lithium metal and its battery capacity is represented by the sum of them. In this case, an anode material capable of inserting and extracting lithium ions is used, and a chargeable capacity of the anode material is set to be smaller than the discharge capacity of a cathode.

Moreover, in the embodiments and the examples, the case where the battery configuration is the prismatic type, the cylindrical type, or the laminate film type, and the case where the battery device has a spirally wound configuration are described; however, the technology is not limited thereto. The technology is also applicable, in a similar manner, to the case where the secondary battery has any other battery configuration such as a coin type, or a button type, or the case where the battery device has any other configuration such as a laminate configuration.

Further, in the embodiments and the examples, the case where lithium is used as an electrode reactant is described; however, any other Group 1 element such as sodium (Na) or potassium (K), a Group 2 element such as magnesium (Mg) or calcium (Ca), or any other light metal such as aluminum may be used. As the effects of the technology is supposed to be obtained without relying on the kind of the electrode reactant, similar effects are obtainable even if the kind of the electrode reactant is changed.

In the embodiments and the examples, an appropriate range, which is derived from the results of the examples, of the content of the methylene cyclic carbonate is described; however, the description does not exclude the possibility that the content is out of the above-described range. More specifically, the above-described appropriate range is a specifically preferable range to obtain the effects of the technology, and as long as the effects of the technology are obtained, the content may be deviated from the above-described range to some extent. The same applies to the contents of other materials.

It is to be noted that the technology is allowed to have the following configurations.

(1) A secondary battery including:
a cathode, an anode, and a nonaqueous electrolytic solution in a package member having a flat surface,
in which the nonaqueous electrolytic solution includes a methylene cyclic carbonate represented by an expression (1):

[Chemical Expression 39]

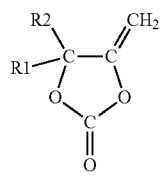

(1)

where R1 and R2 each are a hydrogen group, a halogen group, a monovalent hydrocarbon group, a monovalent halogenated hydrocarbon group, an oxygencontaining monovalent hydrocarbon group, or an oxygen-containing monovalent halogenated hydrocarbon group, and R1 and R2 may be bonded to each other.

(2) The secondary battery according to (1), in which
the halogen group is a fluorine group, a chlorine group, a bromine group, or an iodine group,
the monovalent hydrocarbon group or the monovalent halogenated hydrocarbon group is an alkyl group having 1 to 12 carbon atoms, an alkenyl group having 2 to 12 carbon atoms, an alkynyl group having 2 to 12 carbon atoms, an aryl group having 6 to 18 carbon atoms, a cycloalkyl group having 3 to 18 carbon atoms, or a group in which one or more of hydrogen groups in any of the groups is substituted with a halogen group, and
the oxygen-containing monovalent hydrocarbon group or the oxygencontaining monovalent halogenated hydrocarbon group is an alkoxy group having 1 to 12 carbon atoms, or a group in which one or more of hydrogen groups in the alkoxy group is substituted with a halogen group.

(3) The secondary battery according to (1) or (2), in which the content of the methylene cyclic carbonate in the nonaqueous electrolytic solution is within a range of approximately 0.01 wt % to 10 wt % both inclusive.

(4) The secondary battery according to any one of (1) to (3), in which the package member is a battery can or a laminate film.

(5) The secondary battery according to any one of (1) to (4), in which the secondary battery is a lithium secondary battery.

(6) The secondary battery according to any one of (1) to (5), in which the nonaqueous electrolytic solution includes an unsaturated cyclic carbonate represented by an expression (2), and
conditions: that A be approximately 0.01 wt % to 5 wt % both inclusive; B be equal to approximately 0.01 wt % to 5 wt % both inclusive; and that B/A be equal to approximately 0.002 to 500 both inclusive are all satisfied, where the content of the unsaturated cyclic carbonate in the nonaqueous electrolytic solution is A (wt %), and the content of the methylene cyclic carbonate in the nonaqueous electrolytic solution is B (wt %):

[Chemical Expression 40]

(2)

where R11 and R12 each are a hydrogen group or an alkyl group.

(7) The secondary battery according to (6), in which the unsaturated cyclic carbonate is vinylene carbonate (1,3-dioxol-2-one) or methyl vinylene carbonate (4-methyl-1,3-dioxol-2-one).

(8) The secondary battery according to any one of (1) to (5), in which the nonaqueous electrolytic solution includes a halogenated carbonate, the halogenated carbonate includes one or both of a halogenated cyclic carbonate represented by an expression (4) and a halogenated chain carbonate represented by an expression (5),
conditions: that C be equal to approximately 0.01 wt % to 30 wt % both inclusive; that D be equal to approximately 0.01 wt % to 5 wt % both inclusive; and that D/C be equal to approximately 1/3000 to 500 both inclusive are all satisfied, where the content of the halogenated carbonate in the nonaqueous electrolytic solution is C (wt %), and the content of the methylene cyclic carbonate in the nonaqueous electrolytic solution is D (wt %):

[Chemical Expression 41]

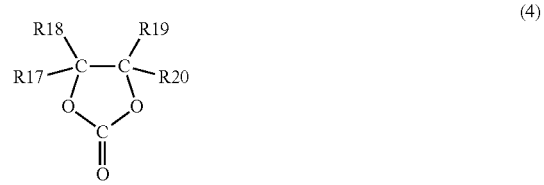

(4)

where R17 to R20 each are a hydrogen group, a halogen group, a monovalent hydrocarbon group, or a monovalent halogenated hydrocarbon group, and one or more of R17 to R20 is a halogen group or a monovalent halogenated hydrocarbon group, and

[Chemical Expression 42]

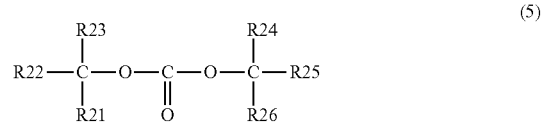

(5)

where R21 to R26 each are a hydrogen group, a halogen group, a monovalent hydrocarbon group, or a monovalent halogenated hydrocarbon group, and one or more of R21 to R26 is a halogen group or a monovalent halogenated hydrocarbon group.

(9) The secondary battery according to (8), in which the halogenated carbonate is 4-fluoro-1,3-dioxolane-2-one.

(10) The secondary battery according to any one of (1) to (5), in which the nonaqueous electrolytic solution includes ethylene carbonate (1,3-dioxolane-2-one) and propylene carbonate (4-methyl-1,3-dioxolane-2-one), a mixture ratio of the ethylene carbonate and the propylene carbonate in weight ratio is within a range of approximately 75:25 to 25:75 both inclusive, and the content of the methylene cyclic carbonate in the nonaqueous electrolytic solution is within a range of approximately 0.01 wt % to 10 wt % both inclusive.

Moreover, the technology is allowed to have the following configurations.

(11) A secondary battery including:

a cathode;

an anode; and a nonaqueous electrolytic solution, the nonaqueous electrolytic solution including a methylene cyclic carbonate represented by an expression (11) and one or more kinds selected from compounds represented by expressions (12) to (16):

[Chemical expression 43]

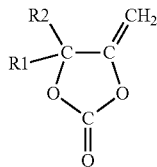

(11)

where R1 and R2 each are a hydrogen group, a halogen group, a monovalent hydrocarbon group, a monovalent halogenated hydrocarbon group, an oxygencontaining monovalent hydrocarbon group, or an oxygen-containing monovalent halogenated hydrocarbon group, and R1 and R2 may be bonded to each other,

[Chemical Expression 44]

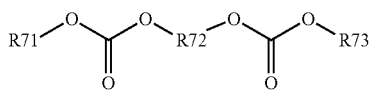

(12)

where R71 and R73 each are a monovalent hydrocarbon group, a monovalent halogenated hydrocarbon group, an oxygen-containing monovalent hydrocarbon group, or an oxygen-containing monovalent halogenated hydrocarbon group, R72 is a divalent hydrocarbon group, a divalent halogenated hydrocarbon group, an oxygen-containing divalent hydrocarbon group, or an oxygen-containing divalent halogenated hydrocarbon group,

[Chemical Expression 45]

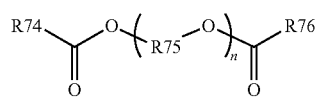

(13)

where R74 and R76 each are a monovalent hydrocarbon group, a monovalent halogenated hydrocarbon group, an oxygen-containing monovalent hydrocarbon group, or an oxygen-containing monovalent halogenated hydrocarbon group, R75 is a divalent hydrocarbon group, a divalent halogenated hydrocarbon group, an oxygen-containing divalent hydrocarbon group, or an oxygen-containing divalent halogenated hydrocarbon group, and n is an integer of 1 or more,

[Chemical Expression 46]

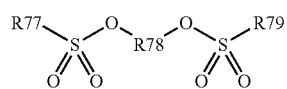

(14)

where R77 and R79 each are a monovalent hydrocarbon group, a monovalent halogenated hydrocarbon group, an oxygen-containing monovalent hydrocarbon group, or an oxygen-containing monovalent halogenated hydrocarbon group, and R78 is a divalent hydrocarbon group, a divalent halogenated hydrocarbon group, an oxygencontaining divalent hydrocarbon group, an oxygen-containing divalent halogenated hydrocarbon group, $Li_2PFO_3$ (15), and $LiPF_2O_2$ (16)

(12) The secondary battery according to (11), in which in R1 and R2, the halogen group is a fluorine group, a chlorine group, a bromine group, or an iodine group, the monovalent hydrocarbon group or the monovalent halogenated hydrocarbon group is an alkyl group having 1 to 12 carbon atoms, an alkenyl group having 2 to 12 carbon atoms, an alkynyl group having 2 to 12 carbon atoms, an aryl group having 6 to 18 carbon atoms, a cycloalkyl group having 3 to 18 carbon atoms, and a group in which one or more of hydrogen groups in any of the groups is substituted with a halogen group, the oxygen-containing monovalent hydrocarbon group or the oxygencontaining monovalent halogenated hydrocarbon group is an alkoxy group having 1 to 12 carbon atoms, or a group in which one or more of hydrogen groups in the alkoxy group is substituted with a halogen group, in R71 to R79, the monovalent hydrocarbon group or the monovalent halogenated hydrocarbon group is an alkyl group having 1 to 12 carbon atoms, an alkenyl group having 2 to 12 carbon atoms, an alkynyl group having 2 to 12 carbon atoms, an aryl group having 6 to 18 carbon atoms, a cycloalkyl group having 6 to 18 carbon atoms, or a group in which one or more of hydrogen groups in any of the groups is substituted with a halogen group, the oxygen-containing monovalent hydrocarbon group or the oxygencontaining monovalent halogenated hydrocarbon group is an alkoxy group having 1 to 12 carbon atoms, or a group in which one or more of hydrogen groups in the alkoxy group is substituted with a halogen group, the divalent hydrocarbon group or the divalent halogenated hydrogen group is an alkylene group having 1 to 12 carbon atoms, an alkenylene group having 2 to 12 carbon atoms, an alkynylene group having 2 to 12 carbon atoms, an arylene group having 6 to 18 carbon atoms, a cycloalkylene group having 3 to 18 carbon atoms, a group including an arylene group and an alkylene group, or a group in which one or more of hydrogen groups in any of the groups is substituted with a halogen group, and the oxygen-containing divalent hydrocarbon group or the oxygen-containing divalent halogenated hydrocarbon group is a group including an ether bond and an alkylene group, or a group in which one or more of hydrogen groups in the group is substituted with a halogen group.

(13) The secondary battery according to (11) or (12), in which the content of the methylene cyclic carbonate in the nonaqueous electrolytic solution is within a range of approximately 0.01 wt % to 10 wt % both inclusive, and the content of the compound in the nonaqueous electrolytic solution is within a range of approximately 0.001 wt % to 2 wt % both inclusive.

(14) The secondary battery according to any one of (11) to (13), in which the nonaqueous electrolytic solution includes an unsaturated cyclic carbonate represented by an expression (2), and conditions: that A be approximately 0.01 wt % to 5 wt % both inclusive; B be equal to approximately 0.01 wt % to 5 wt % both inclusive; and that B/A be equal to approximately 0.002 to 500 both inclusive are all satisfied, where the content of the unsaturated cyclic carbonate in the nonaqueous electrolytic solution is A (wt %), and the content of the methylene cyclic carbonate in the nonaqueous electrolytic solution is B (wt %):

[Chemical Expression 47]

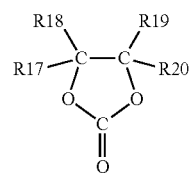

(2)

where R11 and R12 each are a hydrogen group or an alkyl group.

(15) The secondary battery according to (14), in which the unsaturated cyclic carbonate is vinylene carbonate (1,3-dioxol-2-one) or methyl vinylene carbonate (4-methyl-1,3-dioxol-2-one)

(16) The secondary battery according to any one of (11) to (13), in which the nonaqueous electrolytic solution includes a halogenated carbonate, the halogenated carbonate includes one or both of a halogenated cyclic carbonate represented by an expression (4) and a halogenated chain carbonate represented by an expression (5), conditions: that C be equal to approximately 0.01 wt % to 30 wt % both inclusive; that D be equal to approximately 0.01 wt % to 5 wt % both inclusive; and that D/C be equal to approximately 1/3000 to 500 both inclusive are all satisfied, where the content of the halogenated carbonate in the nonaqueous electrolytic solution is C (wt %), and the content of the methylene cyclic carbonate in the nonaqueous electrolytic solution is D (wt %):

[Chemical Expression 48]

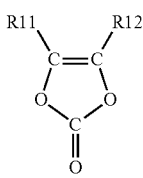

(4)

where R17 to R20 each are a hydrogen group, a halogen group, a monovalent hydrocarbon group, or a monovalent halogenated hydrocarbon group, and one or more of R17 to R20 is a halogen group or a monovalent halogenated hydrocarbon group, and

[Chemical Expression 49]

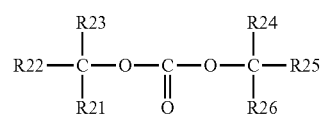

(5)

where R21 to R26 each are a hydrogen group, a halogen group, a monovalent hydrocarbon group, or a monovalent halogenated hydrocarbon group, and one or more of R21 to R26 is a halogen group or a monovalent halogenated hydrocarbon group.

(17) The secondary battery according to (16), in which the halogenated carbonate is 4-fluoro-1,3-dioxolane-2-one.

(18) The secondary battery according to any one of (11) to (13), in which the nonaqueous electrolytic solution includes ethylene carbonate (1,3-dioxolane-2-one) and propylene carbonate (4-methyl-1,3-dioxolane-2-one), a mixture ratio of the ethylene carbonate and the propylene carbonate in weight ratio is within a range of approximately 75:25 to 25:75 both inclusive, and the content of the methylene cyclic carbonate in the nonaqueous electrolytic solution is within a range of approximately 0.01 wt % to 10 wt % both inclusive.

Further, the technology is allowed to have the following configurations.

(19) A secondary battery including:

a cathode;

an anode; and a nonaqueous electrolytic solution, the nonaqueous electrolytic solution including a methylene cyclic carbonate represented by an expression (17), and one or both of halogenated carbonates represented by expressions (18) and (19):

[Chemical Expression 50]

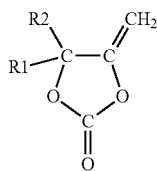
(17)

where R1 and R2 each are a hydrogen group, a halogen group, a monovalent hydrocarbon group, a monovalent halogenated hydrocarbon group, an oxygencontaining monovalent hydrocarbon group, or an oxygen-containing monovalent halogenated hydrocarbon group, and R1 and R2 may be bonded to each other,

[Chemical Expression 51]

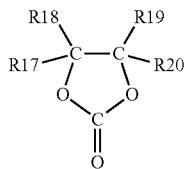
(18)

where R17 to R20 each are a hydrogen group, a halogen group, a monovalent hydrocarbon group, or a monovalent halogenated hydrocarbon group, and one or more of R17 to R20 is a halogen group or a monovalent halogenated hydrocarbon group, and

[Chemical Expression 52]

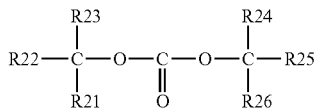
(19)

where R21 to R26 each are a hydrogen group, a halogen group, a monovalent hydrocarbon group, or a monovalent halogenated hydrocarbon group, and one or more of R21 to R26 is a halogen group or a monovalent halogenated hydrocarbon group.

(20) The secondary battery according to (19), in which in R1 and R2,
the halogen group is a fluorine group, a chlorine group, a bromine group, or an iodine group,
the monovalent hydrocarbon group or the monovalent halogenated hydrocarbon group is an alkyl group having 1 to 12 carbon atoms, an alkenyl group having 2 to 12 carbon atoms, an alkynyl group having 2 to 12 carbon atoms, an aryl group having 6 to 18 carbon atoms, a cycloalkyl group having 3 to 18 carbon atoms, and a group in which one or more of hydrogen groups in any of the groups is substituted with a halogen group,
the oxygen-containing monovalent hydrocarbon group or the oxygencontaining monovalent halogenated hydrocarbon group is an alkoxy group having 1 to 12 carbon atoms, or a group in which one or more of hydrogen groups in the alkoxy group is substituted with a halogen group, in R17 to R26,
the halogen group is a fluorine group, a chlorine group, a bromine group, or an iodine group, and the monovalent hydrocarbon group or the monovalent halogenated hydrocarbon group is an alkyl group having 1 to 12 carbon atoms, or a group in which one or more of hydrogen groups in the alkyl group is substituted with a halogen group.

(21) The secondary battery according to (19) or (20), in which
the content of the methylene cyclic carbonate in the nonaqueous electrolytic solution is within a range of approximately 0.01 wt % to 10 wt % both inclusive, and the content of the halogenated carbonate in the nonaqueous electrolytic solution is within a range of approximately 0.1 wt % to 20 wt % both inclusive.

(22) The secondary battery according to any one of (19) to (21), in which
the nonaqueous electrolytic solution includes an unsaturated cyclic carbonate represented by an expression (2), and
conditions: that A be approximately 0.01 wt % to 5 wt % both inclusive; B be equal to approximately 0.01 wt % to 5 wt % both inclusive; and that B/A be equal to approximately 0.002 to 500 both inclusive are all satisfied, where the content of the unsaturated cyclic carbonate in the nonaqueous electrolytic solution is A (wt %), and the content of the methylene cyclic carbonate in the nonaqueous electrolytic solution is B (wt %):

[Chemical Expression 53]

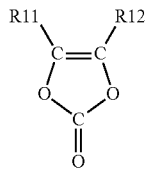
(2)

where R11 and R12 each are a hydrogen group or an alkyl group.

(23) The secondary battery according to (22), in which
the unsaturated cyclic carbonate is vinylene carbonate (1,3-dioxol-2-one) or methyl vinylene carbonate (4-methyl-1,3-dioxol-2-one).

(24) The secondary battery according to any one of (19) to (22), in which
conditions: that C be equal to approximately 0.01 wt % to 30 wt % both inclusive; that D be equal to approximately 0.01 wt % to 5 wt % both inclusive; and that D/C be equal to approximately 1/3000 to 500 both inclusive are all satisfied, where the content of the halogenated carbonate in the nonaqueous electrolytic solution is C (wt %), and the content of the methylene cyclic carbonate in the nonaqueous electrolytic solution is D (wt %).

(25) The secondary battery according to (24), in which
the halogenated carbonate is 4-fluoro-1,3-dioxolane-2-one.

(26) The secondary battery according to any one of (19) to (21), in which
the nonaqueous electrolytic solution includes ethylene carbonate (1,3-dioxolane-2-one) and propylene carbonate (4-methyl-1,3-dioxolane-2-one), a mixture ratio of the ethylene carbonate and the propylene carbonate in weight ratio is within a range of approximately 75:25 to 25:75 both inclusive, and the content of the methylene cyclic carbonate in the nonaqueous electrolytic solution is within a range of approximately 0.01 wt % to 10 wt % both inclusive.

Moreover, the technology is allowed to have the following configurations.

(27) A secondary battery including:
a cathode;
an anode; and
a nonaqueous electrolytic solution, the nonaqueous electrolytic solution including one or more kinds of methylene cyclic carbonates represented by expressions (20) to (22):

[Chemical Expression 54]

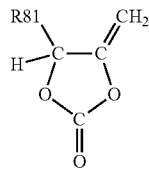
(20)

where R81 is a monovalent chain unsaturated hydrocarbon group, a monovalent chain halogenated unsaturated hydrocarbon group, a halogen group, or a monovalent chain halogenated saturated hydrocarbon group,

[Chemical Expression 55]

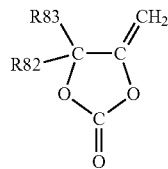
(21)

where R82 and R83 each are a hydrogen group, a halogen group, a monovalent hydrocarbon group, a monovalent halogenated hydrocarbon group, an oxygen-containing monovalent hydrocarbon group, or an oxygen-containing monovalent halogenated hydrocarbon group, and one or both of R82 and R83 are a monovalent cyclic hydrocarbon group or a monovalent halogenated cyclic hydrocarbon group, and

[Chemical Expression 56]

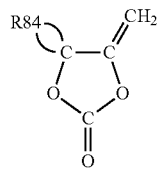
(22)

where R84 is a divalent hydrocarbon group or a divalent halogenated hydrocarbon group.

(28) The secondary battery according to (27), in which
in R81,
the monovalent chain unsaturated hydrocarbon group or the monovalent chain halogenated unsaturated hydrocarbon group is an alkenyl group having 2 to 12 carbon atoms, an alkynyl group having 2 to 12 carbon atoms, an aryl group having 6 to 18 carbon atoms, a group in which an aryl group having 6 to 18 carbon atoms and an alkylene group having 1 to 12 carbon atoms are bonded to each other, a group in which a hydrogen group in the middle of an alkyl group having 1 to 12 carbon atoms is substituted with an aryl group having 6 to 18 carbon atoms, or a group in which one or more of hydrogen groups in any of the groups is substituted with a halogen group, the halogen group is a fluorine group, a chlorine group, a bromine group, or an iodine group, the monovalent chain halogenated saturated hydrocarbon group is an alkyl group having 1 to 12 carbon atoms, an alkenyl group having 2 to 12 carbon atoms, or a group in which one or more of hydrogen groups in an alkynyl group having 2 to 12 carbon atoms is substituted with a halogen group, in R82 and R83, the halogen group is a fluorine group, a chlorine group, a bromine group, or an iodine group, the monovalent hydrocarbon group or the monovalent halogenated hydrocarbon group is an alkyl group having 1 to 12 carbon atoms, an alkenyl group having 2 to 12 carbon atoms, an alkynyl group having 2 to 12 carbon atoms, an aryl group having 6 to 18 carbon atoms, a cycloalkyl group having 3 to 18 carbon atoms, or a group in which one or more of hydrogen groups in any of the groups is substituted with a halogen group, the oxygen-containing monovalent hydrocarbon group or the oxygencontaining monovalent halogenated hydrocarbon group is an alkoxy group having 1 to 12 carbon atoms, or a group in which one or more of hydrogen groups in the alkoxy group is substituted with a halogen group, the monovalent cyclic hydrocarbon group or the monovalent halogenated cyclic hydrocarbon group is an aryl group having 6 to 18 carbon atoms, a group in which an aryl group having 6 to 18 carbon atoms and an alkylene group having 1 to 12 carbon atoms are bonded to each other, a cycloalkyl group having 6 to 18 carbon atoms, a group in which a cycloalkyl group having 6 to 18 carbon atoms and an alkylene group having 1 to 12 carbon atoms are bonded to each other, or a group in which one or more of hydrogen groups in any of the groups is substituted with a halogen group, and in R84, the divalent hydrocarbon group or the divalent halogenated hydrogen group is an alkylene group having 1 to 12 carbon atoms, or a group in which one or more of hydrogen groups in the alkylene group is substituted with a halogen group.

(29) The secondary battery according to (27) or (28), in which
the content of the methylene cyclic carbonate in the nonaqueous electrolytic solution is within a range of approximately 0.01 wt % to 10 wt % both inclusive.

(30) The secondary battery according to any one of (27) to (29), in which
the nonaqueous electrolytic solution includes an unsaturated cyclic carbonate represented by an expression (2), and conditions: that A be approximately 0.01 wt % to 5 wt % both inclusive; B be equal to approximately 0.01 wt % to 5 wt % both inclusive; and that B/A be equal to approximately 0.002 to 500 both inclusive are all satisfied, where the content of the unsaturated cyclic carbonate in the nonaqueous electrolytic solution is A (wt %), and the content of the methylene cyclic carbonate in the nonaqueous electrolytic solution is B (wt %):

[Chemical Expression 57]

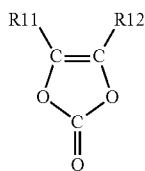

(2)

where R11 and R12 each are a hydrogen group or an alkyl group.

(31) The secondary battery according to (30), in which the unsaturated cyclic carbonate is vinylene carbonate (1,3-dioxol-2-one) or methyl vinylene carbonate (4-methyl-1,3-dioxol-2-one).

(32) The secondary battery according to any one of (27) to (29), in which the nonaqueous electrolytic solution includes a halogenated carbonate, the halogenated carbonate includes one or both of a halogenated cyclic carbonate represented by an expression (4) and a halogenated chain carbonate represented by an expression (5), conditions: that C be equal to approximately 0.01 wt % to 30 wt % both inclusive; that D be equal to approximately 0.01 wt % to 5 wt % both inclusive; and that D/C be equal to approximately 1/3000 to 500 both inclusive are all satisfied, where the content of the halogenated carbonate in the nonaqueous electrolytic solution is C (wt %), and the content of the methylene cyclic carbonate in the nonaqueous electrolytic solution is D (wt %):

[Chemical Expression 58]

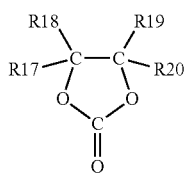

(4)

where R17 to R20 each are a hydrogen group, a halogen group, a monovalent hydrocarbon group, or a monovalent halogenated hydrocarbon group, and one or more of R17 to R20 is a halogen group or a monovalent halogenated hydrocarbon group, and

[Chemical Expression 59]

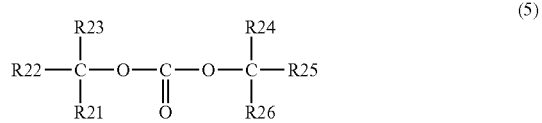

(5)

where R21 to R26 each are a hydrogen group, a halogen group, a monovalent hydrocarbon group, or a monovalent halogenated hydrocarbon group, and one or more of R21 to R26 is a halogen group or a monovalent halogenated hydrocarbon group.

(33) The secondary battery according to (32), in which the halogenated carbonate is 4-fluoro-1,3-dioxolane-2-one.

(34) The secondary battery according to any one of (27) to (29), in which the nonaqueous electrolytic solution includes ethylene carbonate (1,3-dioxolane-2-one) and propylene carbonate (4-methyl-1,3-dioxolane-2-one), a mixture ratio of the ethylene carbonate and the propylene carbonate in weight ratio is within a range of approximately 75:25 to 25:75 both inclusive, and the content of the methylene cyclic carbonate in the nonaqueous electrolytic solution is within a range of approximately 0.01 wt % to 10 wt % both inclusive.

Further, the technology is allowed to have the following configurations.

(35) A secondary battery including:

a cathode, an anode, and a nonaqueous electrolytic solution, the nonaqueous electrolytic solution including a methylene cyclic carbonate represented by an expression (23) and an unsaturated cyclic carbonate represented by an expression (24), in which conditions: that A be approximately 0.01 wt % to 5 wt % both inclusive; B be equal to approximately 0.01 wt % to 5 wt % both inclusive; and that B/A be equal to approximately 0.002 to 500 both inclusive are all satisfied, where the content of the unsaturated cyclic carbonate in the nonaqueous electrolytic solution is A (wt %), and the content of the methylene cyclic carbonate in the nonaqueous electrolytic solution is B (wt %):

[Chemical Expression 60]

(23)

where R1 and R2 each are a hydrogen group, a halogen group, a monovalent hydrocarbon group, a monovalent halogenated hydrocarbon group, an oxygencontaining monovalent hydrocarbon group, or an oxygen-containing monovalent halogenated hydrocarbon group, and R1 and R2 may be bonded to each other, and

[Chemical Expression 61]

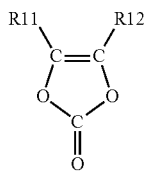

(24)

where R11 and R12 each are a hydrogen group or an alkyl group.

(36) The secondary battery according to (35), in which the halogen group is a fluorine group, a chlorine group, a bromine group, or an iodine group,
the monovalent hydrocarbon group or the monovalent halogenated hydrocarbon group is an alkyl group having 1 to 12 carbon atoms, an alkenyl group having 2 to 12 carbon atoms, an alkynyl group having 2 to 12 carbon atoms, an aryl group having 6 to 18 carbon atoms, a cycloalkyl group having 3 to 18 carbon atoms, or a group in which one or more of hydrogen groups in any of the groups is substituted with a halogen group, and the oxygen-containing monovalent hydrocarbon group or the oxygencontaining monovalent halogenated hydrocarbon group is an alkoxy group having 1 to 12 carbon atoms, or a group in which one or more of hydrogen groups in the alkoxy group is substituted with a halogen group.

(37) The secondary battery according to (35) or (36), in which the unsaturated cyclic carbonate is vinylene carbonate (1,3-dioxol-2-one) or methyl vinylene carbonate (4-methyl-1,3-dioxol-2-one).

(38) The secondary battery according to any one of (35) to (37), in which the nonaqueous electrolytic solution includes a halogenated carbonate, the halogenated carbonate includes one or both of a halogenated cyclic carbonate represented by an expression (4) and a halogenated chain carbonate represented by an expression (5),
conditions: that C be equal to approximately 0.01 wt % to 30 wt % both inclusive; that D be equal to approximately 0.01 wt % to 5 wt % both inclusive; and that D/C be equal to approximately 1/3000 to 500 both inclusive are all satisfied, where the content of the halogenated carbonate in the nonaqueous electrolytic solution is C (wt %), and the content of the methylene cyclic carbonate in the nonaqueous electrolytic solution is D (wt %):

[Chemical Expression 62]

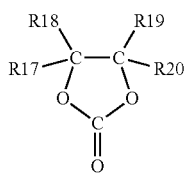

(4)

where R17 to R20 each are a hydrogen group, a halogen group, a monovalent hydrocarbon group, or a monovalent halogenated hydrocarbon group, and one or more of R17 to R20 is a halogen group or a monovalent halogenated hydrocarbon group, and

[Chemical Expression 63]

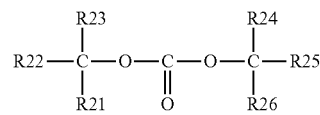

(5)

where R21 to R26 each are a hydrogen group, a halogen group, a monovalent hydrocarbon group, or a monovalent halogenated hydrocarbon group, and one or more of R21 to R26 is a halogen group or a monovalent halogenated hydrocarbon group.

(39) The secondary battery according to (38), in which the halogenated carbonate is 4-fluoro-1,3-dioxolane-2-one.

(40) The secondary battery according to any one of (35) to (37), in which the nonaqueous electrolytic solution includes ethylene carbonate (1,3-dioxolane-2-one) and propylene carbonate (4-methyl-1,3-dioxolane-2-one),
a mixture ratio of the ethylene carbonate and the propylene carbonate in weight ratio is within a range of approximately 75:25 to 25:75 both inclusive, and
the content of the methylene cyclic carbonate in the nonaqueous electrolytic solution is within a range of approximately 0.01 wt % to 10 wt % both inclusive.

Moreover, the technology is allowed to have the following configurations.

(41) A nonaqueous electrolytic solution including:
a methylene cyclic carbonate represented by an expression (11); and
one or more kinds selected from compounds represented by expressions (12) to (16):

[Chemical Expression 64]

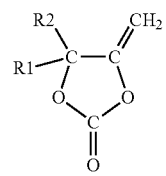

(11)

where R1 and R2 each are a hydrogen group, a halogen group, a monovalent hydrocarbon group, a monovalent halogenated hydrocarbon group, an oxygencontaining monovalent hydrocarbon group, or an oxygen-containing monovalent halogenated hydrocarbon group, and R1 and R2 may be bonded to each other,

[Chemical Expression 65]

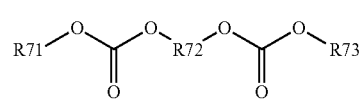

(12)

where R71 and R73 each are a monovalent hydrocarbon group, a monovalent halogenated hydrocarbon group, an oxygen-containing monovalent hydrocarbon group, or an oxygen-containing monovalent halogenated hydrocarbon group, R72 is a divalent hydrocarbon group, a divalent halogenated hydrocarbon group, an oxygen-containing divalent hydrocarbon group, or an oxygen-containing divalent halogenated hydrocarbon group,

[Chemical Expression 66]

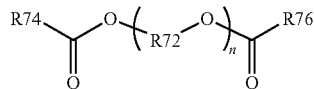

(13)

where R74 and R76 each are a monovalent hydrocarbon group, a monovalent halogenated hydrocarbon group, an oxygen-containing monovalent hydrocarbon group, or an oxygen-containing monovalent halogenated hydrocarbon group, R75 is a divalent hydrocarbon group, a divalent halogenated hydrocarbon group, an oxygen-containing divalent hydrocarbon group, or an oxygen-containing divalent halogenated hydrocarbon group, and n is an integer of 1 or more,

[Chemical Expression 67]

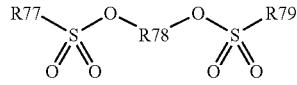

(14)

where R77 and R79 each are a monovalent hydrocarbon group, a monovalent halogenated hydrocarbon group, an oxygen-containing monovalent hydrocarbon group, or an oxygen-containing monovalent halogenated hydrocarbon group, and R78 is a divalent hydrocarbon group, a divalent halogenated hydrocarbon group, an oxygencontaining divalent hydrocarbon group, or an oxygen-containing divalent halogenated hydrocarbon group, $Li_2PFO_3$ (15), and $LiPF_2O_2$ (16)

(42) A nonaqueous electrolytic solution including:
a methylene cyclic carbonate represented by an expression (17); and
one or both of halogenated carbonates represented by expressions (18) and (19):

[Chemical Expression 68]

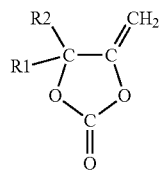

(17)

where R1 and R2 each are a hydrogen group, a halogen group, a monovalent hydrocarbon group, a monovalent halogenated hydrocarbon group, an oxygencontaining monovalent hydrocarbon group, or an oxygen-containing monovalent halogenated hydrocarbon group, and R1 and R2 may be bonded to each other,

[Chemical Expression 69]

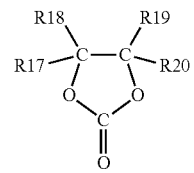

(18)

where R17 to R20 each are a hydrogen group, a halogen group, a monovalent hydrocarbon group, or a monovalent halogenated hydrocarbon group, and one or more of R17 to R20 is a halogen group or a monovalent halogenated hydrocarbon group, and

[Chemical Expression 70]

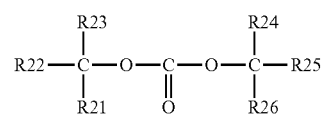

(19)

where R21 to R26 each are a hydrogen group, a halogen group, a monovalent hydrocarbon group, or a monovalent halogenated hydrocarbon group, and one or more of R21 to R26 is a halogen group or a monovalent halogenated hydrocarbon group.

(43) A nonaqueous electrolytic solution including one or more kinds selected from methylene cyclic carbonates represented by expressions (20) to (22):

[Chemical Expression 71]

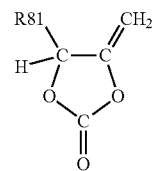

(20)

where R81 is a monovalent chain unsaturated hydrocarbon group, a monovalent chain halogenated unsaturated hydrocarbon group, a halogen group, or a monovalent chain halogenated saturated hydrocarbon group,

[Chemical Expression 72]

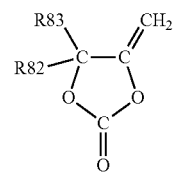

(21)

where R82 and R83 each are a hydrogen group, a halogen group, a monovalent hydrocarbon group, a monovalent halogenated hydrocarbon group, an oxygen-containing monovalent hydrocarbon group, or an oxygen-containing monovalent halogenated hydrocarbon group, and one or both of R82 and R83 are a monovalent cyclic hydrocarbon group or a monovalent halogenated cyclic hydrocarbon group, and

[Chemical Expression 73]

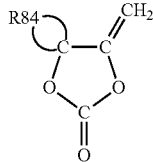
(22)

where R84 is a divalent hydrocarbon group or a divalent halogenated hydrocarbon group.

(44) A nonaqueous electrolytic solution including:
a methylene cyclic carbonate represented by an expression (23) and an unsaturated cyclic carbonate represented by an expression (24),
in which conditions: that A be approximately 0.01 wt % to 5 wt % both inclusive; B be equal to approximately 0.01 wt % to 5 wt % both inclusive; and that B/A be equal to approximately 0.002 to 500 both inclusive are all satisfied, where the content of the unsaturated cyclic carbonate in the nonaqueous electrolytic solution is A (wt %), and the content of the methylene cyclic carbonate in the nonaqueous electrolytic solution is B (wt %):

[Chemical Expression 74]

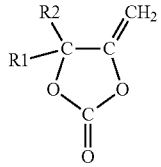
(23)

where R1 and R2 each are a hydrogen group, a halogen group, a monovalent hydrocarbon group, a monovalent halogenated hydrocarbon group, an oxygencontaining monovalent hydrocarbon group, or an oxygen-containing monovalent halogenated hydrocarbon group, and R1 and R2 may be bonded to each other, and

[Chemical Expression 75]

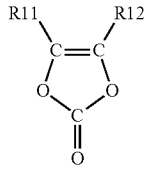
(24)

where R11 and R12 each are a hydrogen group or an alkyl group.

Further, the technology is allowed to have the following configurations.

(45) A battery pack including:
the secondary battery according to any one of (1) to (40);
a control section controlling a usage state of the secondary battery; and
a switch section switching the usage state of the secondary battery according to an instruction from the control section.

(46) An electric vehicle including:
the secondary battery according to any one of (1) to (40);
a conversion section converting power supplied from the secondary battery into driving force;
a drive section driven by the driving force; and
a control section controlling a usage state of the secondary battery.

(47) An energy storage system including:
the secondary battery according to any one of (1) to (40);
one or two or more electrical units receiving power from the secondary battery; and
a control section controlling power supply from the secondary battery to the electrical unit.

(48) An electric power tool including:
the secondary battery according to any one of (1) to (40); and
a movable section receiving power from the secondary battery.

(49) An electronic unit including the secondary battery according to any one of (1) to (40) as a power supply.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. A secondary battery comprising:
a cathode, an anode, and a nonaqueous electrolytic solution in a package member having a flat surface,
wherein the nonaqueous electrolytic solution includes a methylene cyclic carbonate represented by an expression (1):

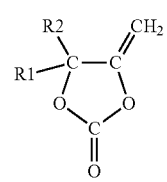
(1)

where each of R1 and R2 corresponds to an oxygen-containing monovalent halogented hydrocarbon group, and R1 and R2 are bonded to each other.

2. The secondary battery according to claim 1, wherein the oxygen-containing monovalent halogenated hydrocarbon group is an alkoxy group having 1 to 12 carbon atoms, or a group in which one or more of hydrogen groups in the alkoxy group is substituted with a halogen group.

3. The secondary battery according to claim 1, wherein a content of the methylene cyclic carbonate in the nonaqueous electrolytic solution is within a range of approximately 0.01 wt % to 10 wt % both inclusive.

4. The secondary battery according to claim 1, wherein the package member is a battery can or a laminate film.

5. The secondary battery according to claim 1, wherein the secondary battery is a lithium secondary battery.

6. The secondary battery according to claim 1, wherein the nonaqueous electrolytic solution includes an unsaturated cyclic carbonate represented by an expression (2), and conditions: that A be approximately 0.01 wt % to 5 wt % both inclusive; B be equal to approximately 0.01 wt % to 5 wt % both inclusive; and that B/A be equal to approximately 0.002 to 500 both inclusive are all satisfied, where a content of the unsaturated cyclic carbonate in the nonaqueous electrolytic solution is A (wt %), and a content of the methylene cyclic carbonate in the nonaqueous electrolytic solution is B (wt %):

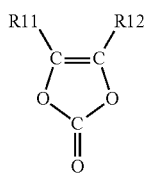
(2)

where R11 and R12 each are a hydrogen group or an alkyl group.

7. The secondary battery according to claim 6, wherein the unsaturated cyclic carbonate is vinylene carbonate (1,3-dioxol-2-one) or methyl vinylene carbonate (4-methyl-1,3-dioxol-2-one).

8. The secondary battery according to claim 1, wherein the nonaqueous electrolytic solution includes a halogenated carbonate, the halogenated carbonate includes one or both of a halogenated cyclic carbonate represented by an expression (4) and a halogenated chain carbonate represented by an expression (5), conditions: that C be equal to approximately 0.01 wt % to 30 wt % both inclusive; that D be equal to approximately 0.01 wt % to 5 wt % both inclusive; and that D/C be equal to approximately 1/3000 to 500 both inclusive are all satisfied, where a content of the halogenated carbonate in the nonaqueous electrolytic solution is C (wt %), and a content of the methylene cyclic carbonate in the nonaqueous electrolytic solution is D (wt %):

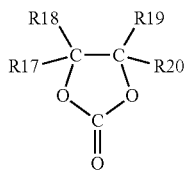
(4)

where R17 to R20 each are a hydrogen group, a halogen group, a monovalent hydrocarbon group, or a monovalent halogenated hydrocarbon group, and one or more of R17 to R20 is a halogen group or a monovalent halogenated hydrocarbon group, and

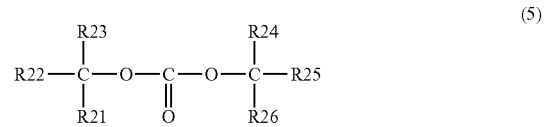

where R21 to R26 each are a hydrogen group, a halogen group, a monovalent hydrocarbon group, or a monovalent halogenated hydrocarbon group, and one or more of R21 to R26 is a halogen group or a monovalent halogenated hydrocarbon group.

9. The secondary battery according to claim 8, wherein the halogenated carbonate is 4-fluoro-1, 3-dioxolane-2-one.

10. The secondary battery according to claim 1, wherein the nonaqueous electrolytic solution includes ethylene carbonate (1,3-dioxolane-2-one) and propylene carbonate (4-methyl-1,3-dioxolane-2-one), a mixture ratio of the ethylene carbonate and the propylene carbonate in weight ratio is within a range of approximately 75:25 to 25:75 both inclusive, and a content of the methylene cyclic carbonate in the nonaqueous electrolytic solution is within a range of approximately 0.01 wt % to 10 wt % both inclusive.

11. A battery pack comprising:

a secondary battery;

a control section configured to control a usage state of the secondary battery; and a switch section configured to switch the usage state of the secondary battery according to an instruction from the control section, wherein the secondary battery includes a cathode, an anode, and a nonaqueous electrolytic solution in a package member having a flat surface, and the nonaqueous electrolytic solution includes a methylene cyclic carbonate represented by an expression (1):

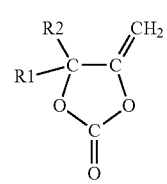
(1)

where each of R1 and R2 corresponds to an oxygen-containing monovalent halogenated hydrocarbon group, and R1 and R2 are bonded to each other.

12. An electric vehicle comprising:

a secondary battery;

a conversion section configured to convert power supplied from the secondary battery into driving force;

a drive section configured to drive by the driving force; and a control section configured to control a usage state of the secondary battery, wherein the secondary battery includes a cathode, an anode, and a nonaqueous electrolytic solution in a package member having a flat surface, and the nonaqueous electrolytic solution includes a methylene cyclic carbonate represented by an expression (1):

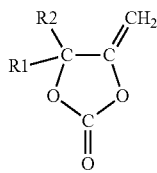

(1)

where each of R1 and R2 corresponds to an oxygen-containing monovalent halogenated hydrocarbon group, and R1 and R2 are bonded to each other.

13. An energy storage system comprising:
a secondary battery;
one or two or more electrical units configured to receive power from the secondary battery; and
a control section configured to control power supply from the secondary battery to the electrical unit,
wherein the secondary battery includes a cathode, an anode, and a nonaqueous electrolytic solution in a package member having a flat surface, and the nonaqueous electrolytic solution includes a methylene cyclic carbonate represented by an expression (1):

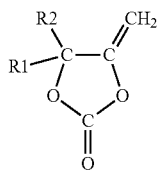

(1)

where each of R1 and R2 corresponds to an oxygen-containing monovalent halogenated hydrocarbon group, and R1 and R2 are bonded to each other.

14. An electric power tool comprising:
a secondary battery; and
a movable section configured to receive power from the secondary battery,
wherein the secondary battery includes a cathode, an anode, and a nonaqueous electrolytic solution in a package member having a flat surface, and the nonaqueous electrolytic solution includes a methylene cyclic carbonate represented by an expression (1):

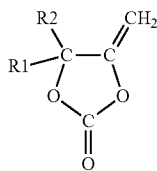

(1)

where each of R1 and R2 corresponds to an oxygen-containing monovalent halogenated hydrocarbon group, and R1 and R2 are bonded to each other.

15. An electronic unit comprising a secondary battery as a power supply, the secondary battery including a cathode, an anode, and a nonaqueous electrolytic solution in a package member having a flat surface,
wherein the nonaqueous electrolytic solution includes a methylene cyclic carbonate represented by an expression (1):

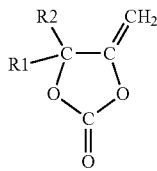

(1)

where each of R1 and R2 corresponds to an oxygen-containing monovalent halogenated hydrocarbon group, and R1 and R2 are bonded to each other.

16. The secondary battery according to claim 1, further comprising a separator, the separator including a base layer made of a porous film and a polymer compound layer disposed on at least one of a first surface and a second surface of the base layer.

* * * * *